(12) United States Patent
Edge et al.

(10) Patent No.: US 12,392,858 B2
(45) Date of Patent: Aug. 19, 2025

(54) METHOD AND APPARATUS FOR LOCATION OF A USER EQUIPMENT IN AN INACTIVE STATE

(71) Applicant: QUALCOMM Incorporated, San Diego, CA (US)

(72) Inventors: Stephen William Edge, Escondido, CA (US); Sven Fischer, Nuremberg (DE); Alexandros Manolakos, Escondido, CA (US); Sony Akkarakaran, Poway, CA (US); Guttorm Ringstad Opshaug, Redwood City, CA (US)

(73) Assignee: QUALCOMM Incorporated, San Diego, CA (US)

( * ) Notice: Subject to any disclaimer, the term of this patent is extended or adjusted under 35 U.S.C. 154(b) by 176 days.

(21) Appl. No.: 17/499,475

(22) Filed: Oct. 12, 2021

(65) Prior Publication Data

US 2022/0120842 A1     Apr. 21, 2022

Related U.S. Application Data

(60) Provisional application No. 63/137,708, filed on Jan. 14, 2021, provisional application No. 63/092,488, filed on Oct. 15, 2020.

(51) Int. Cl.
*H04W 76/30*     (2018.01)
*G01S 5/00*     (2006.01)
(Continued)

(52) U.S. Cl.
CPC .......... *G01S 5/0036* (2013.01); *H04L 5/0051* (2013.01); *H04W 60/04* (2013.01); *H04W 76/19* (2018.02); *H04W 76/30* (2018.02)

(58) Field of Classification Search
CPC ..... G01S 5/0036; H04W 76/19; H04W 60/04; H04W 76/30; H04L 5/0051
See application file for complete search history.

(56) References Cited

U.S. PATENT DOCUMENTS

2016/0219475 A1 *   7/2016   Kim .................. H04W 76/15
2019/0069210 A1     2/2019   Lee et al.
(Continued)

FOREIGN PATENT DOCUMENTS

CN     113973260 A     1/2022
CN     114245484 A *   3/2022
(Continued)

OTHER PUBLICATIONS

3GPP TS 23.273: "3rd Generation Partnership Project; Technical Specification Group Services and System Aspects; 5G System (5GS) Location Services (LCS); Stage 2 (Release 16)", V16.4.0 (Jul. 2020), 3GPP Draft, 23273-G40, 3rd Generation Partnership Project (3GPP), Mobile Competence Centre, 650, Route Des Lucioles, F-06921, Sophia-Antipolis Cedex, France, Jul. 9, 2020 (Jul. 9, 20209), XP051907971, pp. 1-95, Retrieved from the Internet: URL: https://ftp.3gpp.org/3guinternal/3GPP_ultimate_versions_to_be_transposed/sentToDpc/23273-g40.zip 23273-g40.docx [retrieved on Jul. 9, 2020] paragraph [d.8.10.4] figures 8.10.4-1.
(Continued)

*Primary Examiner* — Muthuswamy G Manoharan
(74) *Attorney, Agent, or Firm* — Thien T. Nguyen

(57) ABSTRACT

Positioning of a UE is supported in a Radio Resource Control (RRC) Inactive state. The UE receives a request for periodic or triggered location and enters the RRC Inactive state. When an event is detected, the UE sends an RRC Resume Request to a gNB that includes an indication of the event. The indication may be an event report that may include downlink positioning measurements. The gNB forwards the event report to a location server, and may later
(Continued)

receive and return an event report acknowledgement to the UE in an RRC Release. The indication may instead trigger uplink positioning, with the base station sending an uplink Sounding Reference Signal (SRS) configuration to the UE in an RRC Release, causing the UE to transmit uplink SRS signals to be measured by gNBs. For uplink related position methods like RTT, the gNB can receive both types of indication.

50 Claims, 11 Drawing Sheets

(51) Int. Cl.
  *H04L 5/00* (2006.01)
  *H04W 60/04* (2009.01)
  *H04W 76/19* (2018.01)

(56) References Cited

U.S. PATENT DOCUMENTS

| | | | |
|---|---|---|---|
| 2019/0349881 | A1 | 11/2019 | Choi et al. |
| 2022/0015131 | A1* | 1/2022 | Cheng ............... H04W 72/1268 |
| 2022/0286999 | A1* | 9/2022 | Yu ......................... G01S 5/0036 |
| 2022/0299589 | A1* | 9/2022 | Säily ..................... H04W 64/00 |
| 2023/0007623 | A1* | 1/2023 | Da Silva ............... H04W 24/08 |

FOREIGN PATENT DOCUMENTS

| | | | | |
|---|---|---|---|---|
| EP | 4187964 | A1 * | 5/2023 | |
| WO | WO-2020197829 | A1 * | 10/2020 | ............. G01S 19/01 |
| WO | WO-2021047454 | A1 * | 3/2021 | |
| WO | WO 2022031545 | A1 | 2/2022 | |

OTHER PUBLICATIONS

"3rd Generation Partnership Project, Technical Specification Group Radio Access Network, NG Radio Access Network (NG-RAN), Stage 2 Functional Specification of User Equipment (UE) Positioning in NG-RAN (Release 16)", 3GPP Standard, Technical Specification, 3GPP TS 38.305, 3rd Generation Partnership Project (3GPP), Mobile Competence Centre, 650, Route Des Lucioles, F-06921 Sophia-Antipolis Cedex, France, vol. RAN WG2, No. V16.2.0, Oct. 2, 2020 (Oct. 2, 2020), pp. 1-117, XP051961363, Retrieved from the Internet: URL: ftp://ftp.3gpp.org/Specs/archive/38_series/38.305/38305-g20.zip 38305-g20.docx [Retrieved on Oct. 2, 2020] the Whole Document.

Huawei, et al., "[AT115-e] [615] [POS] UL and UL DL Positioning in RRC_Inactive", 3GPP Draft, R2-2108946, 3rd Generation Partnership Project (3GPP), Mobile Competence Centre, 650, Route Des Lucioles, F-06921 Sophia-Antipolis Cedex, France, vol. RAN WG2, No. Electronic, Aug. 9, 2021-Aug. 27, 2021, Aug. 24, 2021 (Aug. 24, 2021), XP052043011, 29 Pages, Retrieved from the Internet: URL: https://ftp.3gpp.org/tsg_ran/WG2_RL2/TSGR2_115-e/Inbox/R2-2108946.zip R2-2108946 Summary of [Offline-615] [POS] UL and UL DL positioning in RRC_Inactive (Huawei).docx [retrieved on Aug. 24, 2021] section 3 and 4-4.3.2.

Huawei, et al., "Way-Forward for Inactive Positioning", 3GPP Draft, 3GPP TSG-RAN WG2 Meeting #115-e, R2-2108605, 3rd Generation Partnership Project (3GPP), Mobile Competence Centre, 650, Route Des Lucioles, F-06921 Sophia-Antipolis Cedex, France, vol. RAN WG2, No. Electronic, Aug. 9, 2021-Aug. 27, 2021, Aug. 13, 2021 (Aug. 13, 2021), XP052042915, 20 Pages, Retrieved from the Internet: URL: https://ftp.3gpp.org/tsg_ran/WG2_RL2/TSGR2_115-e/Docs/R2-2108605.zip R2-2108605 Way-Forward on Inactive Positioning_v06.docx [Retrieved on Aug. 13, 2021] Sections 2.1-2.1.2.

International Search Report and Written Opinion—PCT/US2021/054685—ISA/EPO—Jul. 6, 2022.

Qualcomm Incorporated (Moderator): "Summary of [Post114-e] [602] [POS] Stage 2 Procedure for Deferred MT-LR in RRC_Inactive", 3GPP Draft, 3GPP TSG-RAN WG2 Meeting #115-e, R2-2108383, 3rd Generation Partnership Project (3GPP), Mobile Competence Centre, 650, Route Des Lucioles, F-06921 Sophia-Antipolis Cedex, France, vol. RAN WG2, No. Electronic, Aug. 16, 2021-Aug. 27, 2021, Aug. 11, 2021 (Aug. 11, 2021), XP052042910, 71 Pages, Retrieved from the Internet: URL: https://ftp.3gpp.org/tsg_ran/WG2_RL2/TSGR2_115-e/Docs/R2-2108383.zip R2-2108383_([Post114-e] [602] [POS] Inactive)_Summary.doc [Retrieved on Aug. 11, 2021] Sections 6.4.2, 6.4.3 and Annexes A and E.

Qualcomm Incorporated: "Positioning of UEs in RRC Idle/Inactive State", 3GPP Draft, 3GPP TSG-RAN WG2 Meeting #113-e, R2-2101470, 3rd Generation Partnership Project (3GPP), Mobile Competence Centre, 650, Route Des Lucioles, F-06921 Sophia-Antipolis Cedex, France, vol. RAN WG2, No. Electronic, Jan. 25, 2021-Feb. 5, 2021, Jan. 15, 2021 (Jan. 15, 2021), XP051974351, 10 Pages, Retrieved from the Internet: URL: https://ftp.3gpp.org/tsg_ran/WG2_RL2/TSGR2_113-e/Docs/R2-2101470.zip R2-2101470_(Inactive Mode Positioning).docx [Retrieved on Jan. 15, 2021] Sections 3-3.2.

Qualcomm Incorporated: "Positioning of UEs in RRC Inactive State", 3GPP Draft, 3GPP TSG-RAN WG2 Meeting #114-e, R2-2106083, 3rd Generation Partnership Project (3GPP), Mobile Competence Centre, 650, Route Des Lucioles, F-06921 Sophia-Antipolis Cedex, France, vol. RAN WG2, No. Electronic, May 19, 2021-May 27, 2021, May 11, 2021 (May 11, 2021), XP052007453, 9 Pages, Retrieved from the Internet: URL: https://ftp.3gpp.org/tsg_ran/WG2_RL2/TSGR2_114-e/Docs/R2-2106083.zip R2-2106083 (Positioning in Inactive State).docx [Retrieved on May 11, 2021] Section 3.

* cited by examiner

METHOD AND APPARATUS FOR LOCATION OF A USER EQUIPMENT IN AN INACTIVE STATE

CLAIM OF PRIORITY UNDER 35 U.S.C. § 119

This application claims under 35 USC § 119 the benefit of and priority to U.S. Provisional Application No. 63/092,488, filed Oct. 15, 2020, and entitled "5G LOCATION OF A UE IN RRC INACTIVE STATE," and U.S. Provisional Application No. 63/137,708, filed Jan. 14, 2021, and entitled "5G LOCATION OF A UE IN RRC INACTIVE STATE," both of which are assigned to the assignee hereof and are incorporated herein by reference in their entireties.

BACKGROUND OF THE DISCLOSURE

Field of the Disclosure

The present disclosure relates generally to communication, and more specifically to techniques for supporting location services for user equipments (UEs).

Relevant Background

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., LTE or WiMax). A fifth generation (5G) New Radio (NR) standard calls for higher data transfer speeds, greater numbers of connections, and better coverage, among other improvements. The 5G NR, according to the Next Generation Mobile Networks Alliance, is designed to provide data rates of several tens of megabits per second to each of tens of thousands of users, with 1 gigabit per second to tens of workers on an office floor.

For some applications, it may be useful or essential to be able to obtain a location of a mobile device through a wireless communication system. For example, locating a mobile device may be needed for such applications as navigation assistance, public safety support, asset tracking, and management of moving objects in a factory or warehouse. For some applications and/or for certain types of mobile device, it may be desirable to locate a mobile device with reduced power consumption by the mobile device and/or with reduced latency. Methods and systems to achieve reduced power consumption and/or reduced latency may thus be preferred.

SUMMARY

Positioning of a User Equipment (UE) is supported while the UE is in a Radio Resource Control (RRC) Inactive state. The UE may receive a request for periodic or triggered location and enter an RRC Inactive state. When an event is detected, the UE may send an RRC Resume Request message to a base station, e.g., gNB, that includes an indication of the event. The indication of the event may be an event report, which may include downlink positioning reference signal measurements. The base station may return an RRC Release message to the UE and the UE remains in the RRC Inactive state. The base station may send an event report to the location server, and returns an event report acknowledgement to the UE in an RRC Release message. The UE may further receive uplink Sounding Reference Signal (SRS) configuration in an RRC Release message.

In one implementation, a method performed by a User Equipment (UE) for supporting location of the UE in a Radio Resource Control (RRC) Inactive state, includes receiving a request to perform periodic or triggered location from a Location Management Function (LMF); entering the RRC Inactive state; detecting an event; sending an RRC Resume Request message to a gNodeB (gNB), the RRC Resume Request including an indication of the event; receiving an RRC Release from the gNB; and remaining in the RRC Inactive state.

In one implementation, a User Equipment (UE) configured for supporting location in a Radio Resource Control (RRC) Inactive state, includes a wireless transceiver configured to wirelessly communicate with entities in a wireless network; at least one memory; at least one processor coupled to the wireless transceiver and the at least one memory, wherein the at least one processor is configured to: receive, via the wireless transceiver, a request to perform periodic or triggered location from a Location Management Function (LMF); enter the RRC Inactive state; detect an event; send, via the wireless transceiver, an RRC Resume Request message to a gNodeB (gNB), the RRC Resume Request including an indication of the event; receive, via the wireless transceiver, an RRC Release from the gNB; and remain in the RRC Inactive state.

In one implementation, a User Equipment (UE) configured for supporting location of the UE in a Radio Resource Control (RRC) Inactive state, includes means for receiving a request to perform periodic or triggered location from a Location Management Function (LMF); means for entering the RRC Inactive state; means for detecting an event; means for sending an RRC Resume Request message to a gNodeB (gNB), the RRC Resume Request including an indication of the event; means for receiving an RRC Release from the gNB; and means for remaining in the RRC Inactive state.

In one implementation, a non-transitory storage medium including program code stored thereon, the program code is operable to configure at least one processor in a User Equipment (UE) configured for supporting location in a Radio Resource Control (RRC) Inactive state, the program code comprising instructions to: receive a request to perform periodic or triggered location from a Location Management Function (LMF); enter the RRC Inactive state; detect an event; send an RRC Resume Request message to a gNodeB (gNB), the RRC Resume Request including an indication of the event; receive an RRC Release from the gNB; and remain in the RRC Inactive state.

In one implementation, a method performed by a gNodeB (gNB) for supporting location of a User Equipment (UE) in a Radio Resource Control (RRC) Inactive state, includes receiving an RRC Resume Request message from the UE, the UE in the RRC Inactive state, the RRC Resume Request including a first indication of an event detected by the UE; sending a second indication of the event to a Location Management Function (LMF); and sending an RRC Release to the UE, wherein the UE remains in the RRC Inactive state.

In one implementation, a gNodeB (gNB) configured for supporting location of a User Equipment (UE) in a Radio Resource Control (RRC) Inactive state, includes an external interface configured to wirelessly communicate with entities in a wireless network; at least one memory; at least one processor coupled to the external interface and the at least one memory, wherein the at least one processor is configured to: receive, via the external interface, an RRC Resume Request message from the UE, the UE in the RRC Inactive state, the RRC Resume Request including a first indication of an event detected by the UE; send, via the external interface, a second indication of the event to a Location Management Function (LMF); and send, via the external interface, an RRC Release to the UE, wherein the UE remains in the RRC Inactive state.

In one implementation, a gNodeB (gNB) configured for supporting location of a User Equipment (UE) in a Radio Resource Control (RRC) Inactive state, includes means for receiving an RRC Resume Request message from the UE, the UE in the RRC Inactive state, the RRC Resume Request including a first indication of an event detected by the UE; means for sending a second indication of the event to a Location Management Function (LMF); and means for sending an RRC Release to the UE, wherein the UE remains in the RRC Inactive state.

In one implementation, a non-transitory storage medium including program code stored thereon, the program code is operable to configure at least one processor in a gNodeB (gNB) configured for supporting location of a User Equipment (UE) in a Radio Resource Control (RRC) Inactive state, the program code comprising instructions to: receive an RRC Resume Request message from the UE, the UE in the RRC Inactive state, the RRC Resume Request including a first indication of an event detected by the UE; send a second indication of the event to a Location Management Function (LMF); and send an RRC Release to the UE, wherein the UE remains in the RRC Inactive state.

In one implementation, a method performed by a Location Management Function (LMF) for supporting location of a User Equipment (UE) in a Radio Resource Control (RRC) Inactive state, includes receiving from a gNodeB (gNB) a first indication of an event detected by the UE, wherein a second indication of the event in an RRC Resume Request message from the UE is received by the gNB, the UE in the RRC Inactive state; and sending a response to the gNB, wherein an RRC Release is sent by the gNB to the UE based on the response, wherein the UE remains in the RRC Inactive state.

In one implementation, a Location Management Function (LMF) configured for supporting location of a User Equipment (UE) in a Radio Resource Control (RRC) Inactive state, includes an external interface configured to wirelessly communicate with entities in a wireless network; at least one memory; at least one processor coupled to the external interface and the at least one memory, wherein the at least one processor is configured to: receive, via the external interface, from a gNodeB (gNB) a first indication of an event detected by the UE, wherein a second indication of the event in an RRC Resume Request message from the UE is received by the gNB, the UE in the RRC Inactive state; send, via the external interface, a response to the gNB, wherein an RRC Release is sent by the gNB to the UE based on the response, wherein the UE remains in the RRC Inactive state.

In one implementation, a Location Management Function (LMF) configured for supporting location of a User Equipment (UE) in a Radio Resource Control (RRC) Inactive state, includes means for receiving from a gNodeB (gNB) a first indication of an event detected by the UE, wherein a second indication of the event in an RRC Resume Request message from the UE is received by the gNB, the UE in the RRC Inactive state; and means for sending a response to the gNB, wherein an RRC Release is sent by the gNB to the UE based on the response, wherein the UE remains in the RRC Inactive state.

In one implementation, a non-transitory storage medium including program code stored thereon, the program code is operable to configure at least one processor in a Location Management Function (LMF) for supporting location of a User Equipment (UE) in a Radio Resource Control (RRC) Inactive state, the program code comprising instructions to: receive from a gNodeB (gNB) a first indication of an event detected by the UE, wherein a second indication of the event in an RRC Resume Request message from the UE is received by the gNB, the UE in the RRC Inactive state; send a response to the gNB, wherein an RRC Release is sent by the gNB to the UE based on the response, wherein the UE remains in the RRC Inactive state.

BRIEF DESCRIPTION OF THE DRAWINGS

The accompanying drawings are presented to aid in the description of various aspects of the disclosure and are provided solely for illustration of the aspects and not limitation thereof.

Figure 1:
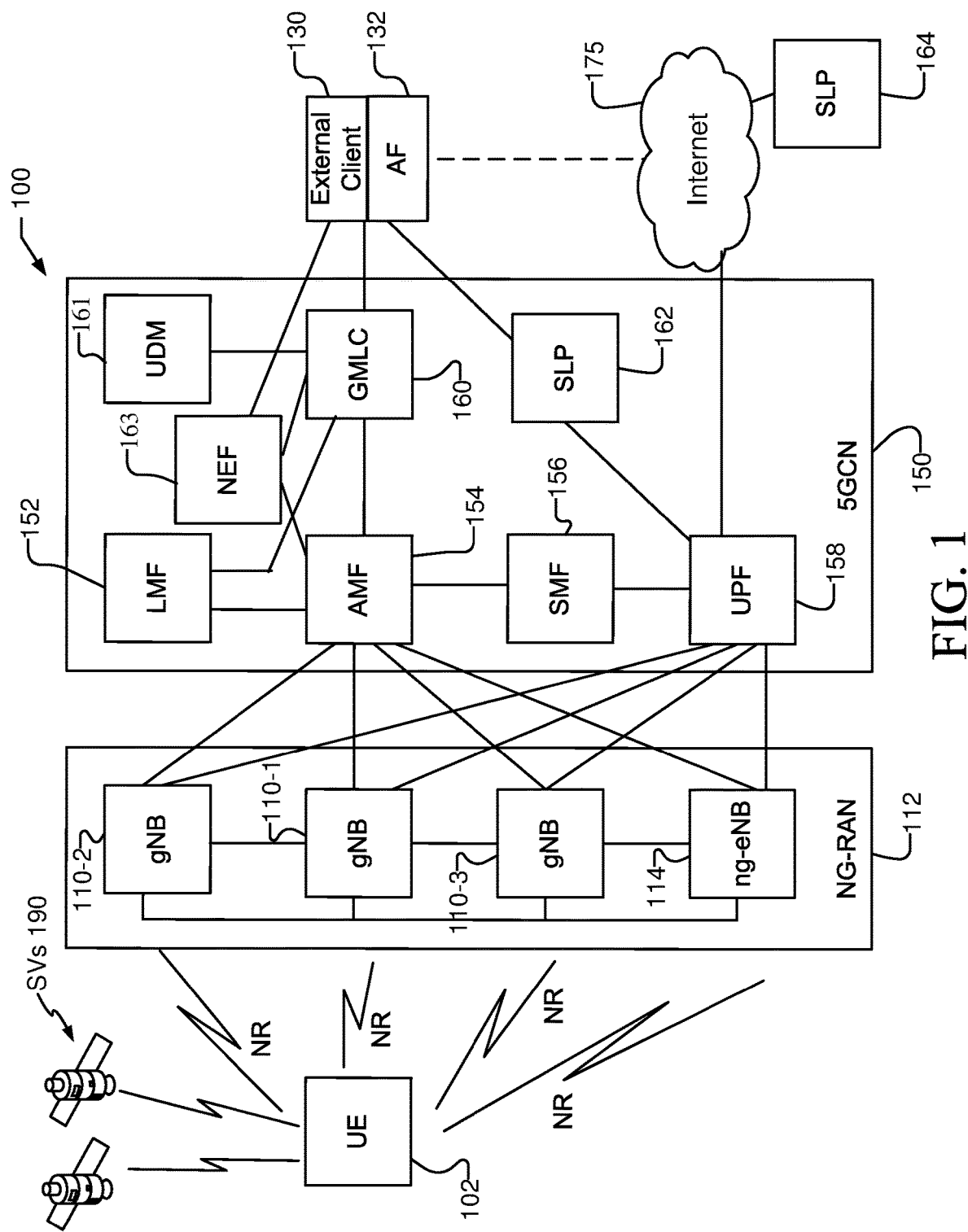
FIG. 1 illustrates a high-level system architecture of a wireless communications system in accordance with an aspect of the disclosure.

Elements, stages, steps, and/or actions with the same reference label in different drawings may correspond to one another (e.g., may be similar or identical to one another). Further, some elements in the various drawings are labelled using a numeric prefix followed by an alphabetic or numeric suffix. Elements with the same numeric prefix but different suffixes may be different instances of the same type of element. The numeric prefix without any suffix is used herein to reference any element with this numeric prefix. For example, different instances 110-1, 110-2, 110-3 of a base station are shown in FIG. 1. A reference to a base station 110 then refers to any of base stations 110-1, 110-2, 110-3.

DETAILED DESCRIPTION

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular Radio Access Technology (RAT), unless otherwise noted. In general, a UE may be any wireless communication device (e.g., a mobile phone, router, tablet computer, laptop computer, consumer tracking device for tracking consumer items, packages, assets, or entities such as individuals and pets, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," "mobile device," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a New Radio (NR) Node B (also referred to as a gNB), etc. In addition, in some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an UL/reverse or DL/forward traffic channel.

The term "base station" may refer to a single physical transmission point or to multiple physical transmission points that may or may not be co-located. For example, where the term "base station" refers to a single physical transmission point, the physical transmission point may be an antenna of the base station corresponding to a cell of the base station. Where the term "base station" refers to multiple co-located physical transmission points, the physical transmission points may be an array of antennas (e.g., as in a multiple-input multiple-output (MIMO) system or where the base station employs beamforming) of the base station. Where the term "base station" refers to multiple non-co-located physical transmission points, the physical transmission points may be a distributed antenna system (DAS) (a network of spatially separated antennas connected to a common source via a transport medium) or a remote radio head (RRH) (a remote base station connected to a serving base station). Alternatively, the non-co-located physical transmission points may be the serving base station receiving the measurement report from the UE and a neighbor base station whose reference RF signals the UE is measuring.

To support positioning of a UE, two broad classes of location solution have been defined: control plane and user plane. With control plane (CP) location, signaling related to positioning and support of positioning may be carried over existing network (and UE) interfaces and using existing protocols dedicated to the transfer of signaling. With user plane (UP) location, signaling related to positioning and support of positioning may be carried as part of other data using such protocols as the Internet Protocol (IP), Transmission Control Protocol (TCP) and User Datagram Protocol (UDP).

The Third Generation Partnership Project (3GPP) has defined control plane location solutions for UEs that use radio access according to Global System for Mobile communications GSM (2G), Universal Mobile Telecommunications System (UMTS) (3G), Long Term Evolution (LTE) for Fourth Generation (4G), and New Radio (NR) for Fifth Generation (5G). These solutions are defined in 3GPP Technical Specifications (TSs) 23.271 and 23.273 (common parts), 43.059 (GSM access), 25.305 (UMTS access), 36.305 (LTE access) and 38.305 (NR access). The Open Mobile Alliance (OMA) has similarly defined a UP location solution known as Secure User Plane Location (SUPL) which can be used to locate a UE accessing any of a number of radio interfaces that support IP packet access such as General Packet Radio Service (GPRS) with GSM, GPRS with UMTS, or IP access with LTE or NR.

Both CP and UP location solutions may employ a location server (LS) to support positioning. The location server may be part of or accessible from a serving network or a home network for a UE or may simply be accessible over the Internet or over a local Intranet. If positioning of a UE is needed, a location server may instigate a session (e.g. a location session or a SUPL session) with the UE and coordinate location measurements by the UE and determination of an estimated location of the UE. During a location session, a location server may request positioning capabilities of the UE (or the UE may provide them without a request), may provide assistance data to the UE (e.g. if requested by the UE or in the absence of a request) and may request a location estimate or location measurements from a UE, e.g. for the GNSS, DL-TDOA, AOD, multi-cell RTT, and/or Enhanced Cell ID (ECID) position methods. Assistance data may be used by a UE to acquire and measure GNSS and/or PRS signals (e.g. by providing expected characteristics of these signals such as frequency, expected time of arrival, signal coding, signal Doppler).

In a UE based mode of operation, assistance data may also or instead be used by a UE to help determine a location estimate from the resulting location measurements (e.g., if the assistance data provides satellite ephemeris data in the case of GNSS positioning or base station locations and other base station characteristics such as PRS timing in the case of terrestrial positioning using, e.g., DL-TDOA, AOD, multi-cell RTT, etc.).

In a UE assisted mode of operation, a UE may return location measurements to a location server which may determine an estimated location of the UE based on these measurements and possibly based also on other known or configured data (e.g. satellite ephemeris data for GNSS location or base station characteristics including base station locations and possibly PRS timing in the case of terrestrial positioning using, e.g., DL-TDOA, AOD, multi-cell RTT, etc.).

In another standalone mode of operation, a UE may make location related measurements without any positioning assistance data from a location server and may further compute a location or a change in location without any positioning assistance data from a location server. Position methods that may be used in a standalone mode include GPS and GNSS (e.g. if a UE obtains satellite orbital data from data broadcast by GPS and GNSS satellites themselves) as well as sensors.

Positioning methods (also referred to as position methods) can be classified as "uplink" (UL), "downlink" (DL) and "uplink and downlink" (UL-DL). A UL position method makes use of UL measurements of signals (e.g. PRS or SRS) transmitted by a target UE. Measurements are typically obtained by one or more base stations (e.g. gNBs), access points or other network entities. UL position methods include UL-AOA, UL-TDOA and ECID. A DL position method makes use of DL measurements of signals transmitted by one or more base stations, access points, SVs or other signal sources. Measurements are obtained by the target UE being positioned. DL position methods include DL-AOA, DL-TDOA, DL-AOD, A-GNSS, WLAN (also referred to as WiFi) and ECID. A UL-DL position method makes use of both DL measurements obtained by a target UE of signals transmitted by one or more base stations, access points, SVs or other signal sources and UL measurements of signals transmitted by the target UE and obtained by one or more base stations, access points or other entities. UL-DL position methods include RTT and multi-cell RTT.

In the case of 3GPP CP location, a location server may be an enhanced serving mobile location center (E-SMLC) in the case of LTE access, a standalone SMLC (SAS) in the case of UMTS access, a serving mobile location center (SMLC) in the case of GSM access, or a Location Management Function (LMF) in the case of 5G NR access. In the case of OMA SUPL location, a location server may be a SUPL Location Platform (SLP) which may act as any of: (i) a home SLP (H-SLP) if in or associated with the home network of a UE or if providing a permanent subscription to a UE for location services; (ii) a discovered SLP (D-SLP) if in or associated with some other (non-home) network or if not associated with any network; (iii) an Emergency SLP (E-SLP) if supporting location for an emergency call instigated by the UE; or (iv) a visited SLP (V-SLP) if in or associated with a serving network or a current local area for a UE.

During a location session, a location server and UE may exchange messages defined according to some positioning protocol in order to coordinate the determination of an estimated location. Possible positioning protocols may include, for example, the LTE Positioning Protocol (LPP) defined by 3GPP in 3GPP TS 37.355 and the LPP Extensions (LPPe) protocol defined by OMA in OMA TSs OMA-TS-LPPe-V1_0, OMA-TS-LPPe-V1_1 and OMA-TS-LPPe-V2_0. The LPP and LPPe protocols may be used in combination where an LPP message contains one embedded LPPe message. The combined LPP and LPPe protocols may be referred to as LPP/LPPe. LPP and LPP/LPPe may be used to help support the 3GPP control plane solution for LTE or NR access, in which case LPP or LPP/LPPe messages are exchanged between a UE and E-SMLC or between a UE and LMF. LPP or LPPe messages may be exchanged between a UE and E-SMLC via a serving Mobility Management Entity (MME) and a serving eNodeB (eNB) for the UE. LPP or LPPe messages may also be exchanged between a UE and LMF via a serving Access and Mobility Management Function (AMF) and a serving NR Node B (also referred to as gNodeB or gNB) for the UE. LPP and LPP/LPPe may also be used to help support the OMA SUPL solution for many types of wireless access that support IP messaging (such as LTE, NR and WiFi), where LPP or LPP/LPPe messages are exchanged between a SUPL Enabled Terminal (SET), which is the term used for a UE with SUPL, and an SLP, and may be transported within SUPL messages such as a SUPL POS or SUPL POS INIT message A location server and a base station (e.g. an eNodeB for LTE access or a gNodeB for NR access) may exchange messages to enable the location server to (i) obtain position measurements for a particular UE from the base station, or (ii) obtain location information from the base station not related to a particular UE such as the location coordinates of an antenna for the base station, the cells (e.g. cell identities) supported by the base station, cell timing for the base station and/or parameters for signals transmitted by the base station such as PRS signals. In the case of LTE access, the LPP A (LPPa) protocol may be used to transfer such messages between a base station that is an eNodeB and a location server that is an E-SMLC. In the case of NR access, the New Radio Position Protocol A (NRPPa) protocol may be used to transfer such messages between a base station that is a gNodeB and a location server that is an LMF.

During a positioning session, the UE may send positioning measurements to the location server infrequently. For example, the location server might not request frequent positioning measurements, e.g., a periodic trigger for positioning measurements may have a long period. In another example, there may be a relatively long period between receipt of assistance data or a request for positioning measurements and the time when positioning information is sent. The base station, e.g., the gNB, may not be aware of the timing of the positioning measurements instruction to the UE from the location server and or when the positioning measurements will be prepared or sent by the UE since the positioning related messages between the location server and the UE pass through the base station transparently as LPP messages.

A connection (e.g., an RRC Connection) between the UE and the base station may be released only by the base station. Without information related to the timing of the positioning measurements, the base station may not release the connection with the UE and, according, the UE may remain in a connected state with the base station during the entire positioning measurement session, which may result in additional resource and power consumption by the UE. Moreover, even if the base station releases the connection with the UE, if a positioning measurement is sent by the UE immediately after the release of the connection, a new connection may need to be initiated, which will consume additional power and time.

For example, a GNSS fix may take more than 15 seconds, for E911 or a position tracking application. Remaining in a connected state with a base station during such an extended period may result in extra power consumption.

As discussed herein, the positioning of a User Equipment (UE) may be supported while the UE is in a Radio Resource Control (RRC) Inactive state. The RRC Inactive state can be used to reduce latency and/or power consumption by the UE and can support faster access by the UE to a serving network or faster access by the serving network to the UE than if the UE was in an Idle state with no RRC Connection.

The UE, for example, may receive a request for periodic or triggered location from a location server (e.g. LMF) and may later enter an RRC Inactive state. When an event is detected, the UE may send an RRC Resume Request message to a base station, e.g., gNB, that includes an indication of the event. For example, the indication of the event may be an event report, which may include downlink (DL) positioning reference signal (PRS) measurements. The base station may send the indication of the event to the location server and may return an RRC Release message to the UE. The UE remains in the RRC Inactive state. The LMF may send an event report acknowledgement to the base station, which may provide the event report acknowledgement to the UE in the RRC Release message. The UE may further receive an uplink (UL) Sounding Reference Signal (SRS) configuration in an RRC Release message. The UL SRS configuration may be compressed and may be based on UL SRS configurations previously received by the UE, e.g., in the request for periodic or triggered location.

FIG. 1 shows an architecture based on a non-roaming 5G NR network to support UE positioning in an RRC Inactive state as discussed herein. FIG. 1 illustrates a communication system 100 that comprises a UE 102, which is sometimes referred to herein as a "target UE", since UE 102 may be the target of a location request. FIG. 1 also shows components of a Fifth Generation (5G) network comprising a Next Generation Radio Access Network (NG-RAN) 112, which includes base stations (BSs) sometimes referred to as New Radio (NR) NodeBs or gNBs 110-1, 110-2, 110-3, and a next-generation evolved NodeB (ng-eNB) 114, and a 5G Core Network (5GCN) 150 that is in communication with an external client 130. The architecture of a gNB 110 may be split into functional parts, e.g., including one or more of a gNB Central Unit (gNB-CU), one or more gNB Distributed Units (gNB-DUs), and one or more gNB Remote Units (gNB-RUs), any of which may be physically co-located or may be physically separate from other parts of the gNB 110. A 5G network may also be referred to as a New Radio (NR) network; NG-RAN 112 may be referred to as an NR RAN or a 5G RAN; and 5GCN 150 may be referred to as a Next Generation (NG) Core network (NGC). The communication system 100 may further utilize information from space vehicles (SVs) 190 for a Global Navigation Satellite System (GNSS) like GPS, GLONASS, Galileo or Beidou or some other local or regional Satellite Positioning System (SPS) such as IRNSS, EGNOS or WAAS. Additional components of the communication system 100 are described below. The communication system 100 may include additional or alternative components.

FIG. 1 shows a serving gNB 110-1 for the target UE 102 and neighbor gNBs 110-2, 110-3, and ng-eNB 114. A neighbor gNB 110 may be any gNB 110 which is able to receive and measure uplink (UL) signals transmitted by the target UE 102 and/or is able to transmit a downlink (DL) reference signal (RS), e.g., positioning reference signals (PRS), that can be received and measured by the target UE 102.

Entities in the NG-RAN 112 which transmit DL reference signals (RSs) to be measured by a target UE 102 for a particular location session are referred to generically as "Transmission Points" (TPs) and can include one or more of the serving gNB 110-1, and neighbor gNBs 110-2, 110-3, and ng-eNB 114.

Entities in the NG-RAN 112 which receive and measure UL signals (e.g. an RS) transmitted by a target UE 102 for a particular location session are referred to generically as "Reception Points" (RPs) and can include one or more of the serving gNB 110-1, and neighbor gNBs 110-2, 110-3, and ng-eNB 114.

It should be noted that FIG. 1 provides only a generalized illustration of various components, any or all of which may be utilized as appropriate, and each of which may be duplicated or omitted, as necessary. Specifically, although only one UE 102 is illustrated, it will be understood that many UEs (e.g., hundreds, thousands, millions, etc.) may utilize the communication system 100. Similarly, the communication system 100 may include a larger or smaller number of SVs 190, gNBs 110-1, 110-2, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), also referred to as 4G, and IEEE 802.11 WiFi etc. For example, where a Wireless Local Area Network (WLAN), e.g., IEEE 802.11 radio interface, is used, the UE 102 may communicate with an Access Network (AN), as opposed to an NG-RAN, and accordingly, component 112 is sometimes referred to herein as an AN or as a RAN, denoted by the term "RAN", "(R)AN" or "(R)AN 112". In the case of an AN (e.g. IEEE 802.11 AN), the AN may be connected to a Non-3GPP Interworking Function (N3IWF) (e.g. in 5GCN 150) (not shown in FIG. 1), with the N3IWF connected to AMF 154.

The target UE 102, as used herein, may be any electronic device and may be referred to as a device, a mobile device, a wireless device, a mobile terminal, a terminal, a mobile station (MS), a Secure User Plane Location (SUPL) Enabled Terminal (SET), or by some other name. The target UE 102 may be a stand-alone device or may be embedded in another device, e.g., a factory tool, that is to be monitored or tracked. Moreover, UE 102 may correspond to a smart watch, digital glasses, fitness monitor, smart car, smart appliance, cellphone, smartphone, laptop, tablet, PDA, consumer tracking device for tracking consumer items, packages, assets, or entities such as individuals and pets, control device or some other portable or moveable device. The UE 102 may include a single entity or may include multiple entities such as in a personal area network where a user may employ audio, video and/or data I/O devices and/or body sensors and a separate wireline or wireless modem. Typically, though not necessarily, the UE 102 may support wireless communication using one or more Radio Access Technologies (RATs) such as GSM, Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 112 and 5GCN 150), etc. The UE 102 may also support wireless communication using a Wireless Local Area Network (WLAN) which may connect to other networks (e.g. the Internet) using a Digital Subscriber Line (DSL) or packet cable for example. The use of one or more of these RATs may allow the UE 102 to communicate with an external client 130 (e.g. via elements of 5GCN 150 not shown in FIG. 1, or possibly via a Gateway Mobile Location Center (GMLC) 160), and/or allow the external client 130 to receive location information regarding the UE 102 (e.g., via the GMLC 160).

The UE 102 may enter a connected state with a wireless communication network that may include the NG-RAN 112. In one example, the UE 102 may communicate with a cellular communication network by transmitting wireless signals to, or receiving wireless signals from a cellular transceiver, in the NG-RAN 112, such as a gNB 110-1. A transceiver provides user and control planes protocol terminations toward the UE 102 and may be referred to as a base station, a base transceiver station, a radio base station, a radio transceiver, a radio network controller, a transceiver function, a base station subsystem (BSS), an extended service set (ESS), or by some other suitable terminology.

In particular implementations, the UE 102 may have circuitry and processing resources capable of obtaining location related measurements. Location related measurements obtained by UE 102 may include measurements of signals received from satellite vehicles (SVs) 190 belonging to a Satellite Positioning System (SPS) or Global Navigation Satellite System (GNSS) such as GPS, GLONASS, Galileo or Beidou and/or may include measurements of signals received from terrestrial transmitters fixed at known locations (e.g., such as gNBs 110). UE 102 or gNB 110-1 to which UE 102 may send the measurements, may then obtain a location estimate for the UE 102 based on these location related measurements using any one of several position methods such as, for example, GNSS, Assisted GNSS (A-GNSS), Advanced Forward Link Trilateration (AFLT), Angle of Departure (AOD), DL Time Difference Of Arrival (DL-TDOA), Round-Trip Time (RTT), multi-cell RTT, WLAN (also referred to as WiFi) positioning, or Enhanced Cell ID (ECID) or combinations thereof. In some of these techniques (e.g. A-GNSS, AFLT, DL-TDOA), pseudoranges or timing differences may be measured at UE 102 relative to three or more terrestrial transmitters (e.g. gNBs 110) fixed at known locations or relative to four or more SVs 190 with accurately known orbital data, or combinations thereof, based at least in part, on pilots, positioning reference signals (PRS) or other positioning related signals transmitted by the transmitters or satellites and received at the UE 102.

The location server in FIG. 1 may correspond to, e.g., Location Management Function (LMF) 152 or Secure User Plane Location (SUPL) Location Platform (SLP) 162, and may be capable of providing positioning assistance data to UE 102 including, for example, information regarding signals to be measured (e.g., expected signal timing, signal coding, signal frequencies, signal Doppler), locations and identities of terrestrial transmitters (e.g. gNBs 110) and/or signal, timing and orbital information for GNSS SVs 190 to facilitate positioning techniques such as A-GNSS, AFLT, AOD, DL-TDOA, multi-cell RTT, and ECID. The facilitation may include improving signal acquisition and measurement accuracy by UE 102 and, in some cases, enabling UE 102 to compute its estimated location based on the location measurements. For example, a location server (e.g. LMF 152 or SLP 162) may comprise an almanac, also referred to as a base station almanac (BSA), which indicates locations and identities of cellular transceivers and/or local transceivers in a particular region or regions such as a particular venue, and may provide information descriptive of signals transmitted by a cellular base station or AP (e.g. a gNB) such as transmission power and signal timing. A UE 102 may obtain measurements of signal strengths (e.g. received signal strength indication (RSSI)) for signals received from cellular transceivers and/or local transceivers and/or may obtain a signal to noise ratio (S/N), a reference signal received power (RSRP), a reference signal received quality (RSRQ), a time of arrival (TOA), an angle of arrival (AOA), an angle of departure (AOD), a receive time-transmission time difference (Rx-Tx), or a round trip signal propagation time (RTT) between UE 102 and a cellular transceiver (e.g. a gNB) or a local transceiver (e.g. a WiFi access point (AP)). A UE 102 may use these measurements together with assistance data (e.g. terrestrial almanac data or GNSS satellite data such as GNSS Almanac and/or GNSS Ephemeris information) received from a location server (e.g. LMF 152 or SLP 162) or broadcast by a base station (e.g. a gNB 110) in NG-RAN 112 to determine a location for UE 102.

In some implementations, network entities are used to assist in location of a target UE 102. For example, entities in a network such as gNBs 110-1 and 110-2 may measure UL signals transmitted by UE 102. The UL signals may include or comprise UL reference signals such as UL positioning reference signals (PRSs) or UL Sounding Reference Signals (SRSs). The entities obtaining the location measurements (e.g. gNBs 110-1 and 110-2) may then transfer the location measurements to the UE 102 or LMF 152, which may use the measurements to determine or help determine the location of the UE 102. Examples of location measurements that may use UL signals can include an RSSI, RSRP, RSRQ, TOA, Rx-Tx, AOA and RTT.

An estimate of a location of the UE 102 may be referred to as a location, location estimate, location fix, fix, position, position estimate or position fix, and may be geodetic, thus providing location coordinates for the UE 102 (e.g., latitude and longitude) which may or may not include an altitude component (e.g., height above sea level, height above or depth below ground level, floor level or basement level). Alternatively, a location of the UE 102 may be expressed as a civic location (e.g., as a postal address or the designation of some point or small area in a building such as a particular room or floor). A location of the UE 102 may also be expressed as an area or volume (defined either geodetically or in civic form) within which the UE 102 is expected to be located with some probability or confidence level (e.g., 67%, 95%, etc.). A location of the UE 102 may further be a relative location comprising, for example, a distance and direction or relative X, Y (and Z) coordinates defined relative to some origin at a known location which may be defined geodetically, in civic terms, or by reference to a point, area, or volume indicated on a map, floor plan or building plan. The location may be expressed as an absolute location estimate for the UE, such as location coordinates or address, or as a relative location estimate for the UE, such as a distance and direction from a previous location estimate or from a known absolute location. The location of the UE may include a linear velocity, an angular velocity, a linear acceleration, an angular acceleration, an angular orientation for the UE, e.g., the orientation of the UE relative to a fixed global or local coordinate system, an identification of a trigger event for locating the UE, or some combination of these. For example, trigger events may include an area event, a motion event, or a velocity event. An area event, for example, may be the UE moving into a defined area, moving out of the area and/or remaining in the area. A motion event, for example, may include movement of the UE by a threshold straight line distance or threshold distance along a UE trajectory. A velocity event, for example, may include the UE attaining a minimum or maximum velocity, a threshold increase and/or decrease of velocity, and/or a threshold change in direction. In the description contained herein, the use of the term location may comprise any of these variants unless indicated otherwise. When computing the location of a UE, it is common to solve for local x, y, and possibly z coordinates and then, if needed, convert the local coordinates into absolute ones (e.g. for latitude, longitude and altitude above or below mean sea level).

As shown in FIG. 1, pairs of gNBs 110 in NG-RAN 112 may be connected to one another, e.g., directly as shown in FIG. 1 or indirectly via other gNBs 110-1, 110-2. Access to the 5G network is provided to UE 102 via wireless communication between the UE 102 and one or more of the gNBs 110-1 and 110-2, which may provide wireless communication access to the 5GCN 150 on behalf of the UE 102 using 5G (e.g. NR). In FIG. 1, the serving gNB for UE 102 is assumed to be gNB 110-1, although other gNBs (e.g. gNB 110-2, 110-3, or ng-eNB 114) may act as a serving gNB if UE 102 moves to another location or may act as a secondary gNB to provide additional throughout and bandwidth to UE 102. Some gNBs in FIG. 1 (e.g. gNB 110-2, 110-3, or ng-eNB 114) may be configured to function as positioning-only beacons which may transmit signals (e.g. directional PRS) to assist positioning of UE 102 but may not receive signals from UE 102 or from other UEs.

As noted, while FIG. 1 depicts nodes configured to communicate according to 5G communication protocols, nodes configured to communicate according to other communication protocols, such as, for example, LTE protocols, may be used. Such nodes, configured to communicate using different protocols, may be controlled, at least in part, by the 5GCN 150. Thus, the NG-RAN 112 may include any combination of gNBs, evolved Node Bs (eNBs) supporting LTE, or other types of base stations or access points. As an example, NG-RAN 112 may include one or more ng-eNBs 114, which provide LTE wireless access to UE 102 and may connect to entities in 5GCN 150 such as AMF 154.

The gNBs 110-1, 110-2, 110-3, and ng-eNB 114 can communicate with the Access and Mobility Management Function (AMF) 154, which, for positioning functionality, may communicate with a Location Management Function (LMF) 152. The AMF 154 may support mobility of the UE 102, including cell change and handover and may participate in supporting a signaling connection to the UE 102 and possibly helping establish and release Protocol Data Unit (PDU) sessions for UE 102 supported by the UPF 158. Other functions of AMF 154 may include: termination of a control plane (CP) interface from NG-RAN 112; termination of Non-Access Stratum (NAS) signaling connections from UEs such as UE 102, NAS ciphering and integrity protection; registration management; connection management; reachability management; mobility management; access authentication and authorization.

The gNB 110-1 may support positioning of the UE 102 when UE 102 accesses the NG-RAN 112. The gNB 110-1 may also process location service requests for the UE 102, e.g., received directly or indirectly from the GMLC 160. In some embodiments, a node/system that implements the gNB 110-1 may additionally or alternatively implement other types of location-support modules, such as an Enhanced Serving Mobile Location Center (E-SMLC) or a Secure User Plane Location (SUPL) Location Platform (SLP) 162. It will be noted that in some embodiments, at least part of the positioning functionality (including derivation of UE 102's location) may be performed at the UE 102 (e.g., using signal measurements for signals transmitted by wireless nodes, and assistance data provided to the UE 102).

The GMLC 160 may support a location request for the UE 102 received from an external client 130 and may forward such a location request to a serving AMF 154 for UE 102. The AMF 154 may then forward the location request to either gNB 110-1 or LMF 152 which may obtain one or more location estimates for UE 102 (e.g. according to the request from external client 130) and may return the location estimate(s) to AMF 154, which may return the location estimate(s) to external client 130 via GMLC 160. GMLC 160 may contain subscription information for an external client 130 and may authenticate and authorize a location request for UE 102 from external client 130. GMLC 160 may further initiate a location session for UE 102 by sending a location request for UE 102 to AMF 154 and may include in the location request an identity for UE 102 and the type of location being requested (e.g. such as a current location or a sequence of periodic or triggered locations).

As illustrated, a Unified Data Management (UDM) 161 may be connected to the GMLC 160. The UDM 161 is analogous to a Home Subscriber Server (HSS) for LTE access, and if desired, the UDM 161 may be combined with an HSS. The UDM 161 is a central database that contains user-related and subscription-related information for UE 102 and may perform the following functions: UE authentication, UE identification, access authorization, registration and mobility management, subscription management and Short Message Service management.

As further illustrated in FIG. 1, an external client 130 may be connected to the core network 150 via the GMLC 160 and/or the SLP 162. The external client 130 may optionally be connected to the core network 150 and/or to an SLP 164, that is external to 5GCN 150, via the Internet 175. The external client 130 may be a server, a web server, or a user device, such as a personal computer, a UE, etc.

A Network Exposure Function (NEF) 163 may be connected to the GMLC 160 and the AMF 154. In some implementations, the NEF 163 may be connected to communicate directly with the external client 130 or with an Application Function (AF) 132. The NEF 163 may support secure exposure of capabilities and events concerning 5GCN 150 and UE 102 to an external client 130 or AF 132 and may enable secure provision of information from external client 130 or AF 132 to 5GCN 150. The NEF 163, for example, may also function to obtain a current or last known location for a UE 102, may obtain an indication of a change in location for a UE 102, or an indication of when a UE 102 becomes available (or reachable). An external client 130 or an AF 132 may access NEF 163 in order to obtain location information for UE 102.

The LMF 152 and the gNB 110-1 may communicate using a New Radio Position Protocol A (NRPPa). NRPPa may be defined in 3GPP TS 38.455, with NRPPa messages being transferred between the gNB 110-1 and the LMF 152. Further, the LMF 152 and UE 102 may communicate using the LTE Positioning Protocol (LPP) defined in 3GPP TS 37.355, where LPP messages are transferred between the UE 102 and the LMF 152 via the serving AMF 154 and the serving gNB 110-1 for UE 102. For example, LPP messages may be transferred between the AMF 154 and the UE 102 using a 5G Non-Access Stratum (NAS) protocol. The LPP protocol may be used to support positioning of UE 102 using DL and UL-DL position methods such as Assisted GNSS (A-GNSS), Real Time Kinematic (RTK), Wireless Local Area Network (WLAN), DL Time Difference of Arrival (DL-TDOA), Round-Trip Time (RTT), multi-cell RTT, and/ or Enhanced Cell Identity (ECID). The NRPPa protocol may be used to support positioning of UE 102 using UL and UL-DL position methods such as Uplink (UL) Time Difference of Arrival (UL-TDOA), Uplink (UL) angle of arrival (UL-AOA), multi-cell RTT, or ECID (when used with measurements obtained by or received from a gNB 110-1, 110-2, 110-3, or ng-eNB 114) and/or may be used by LMF 152 to obtain location related information from gNBs 110 such as parameters defining positioning reference signal (PRS) transmission from gNBs 110 for support of DL-TDOA.

GNBs 110-1, 110-2, 110-3, or ng-eNB 114 may communicate with AMF 154 using a Next Generation Application Protocol (NGAP), e.g. as defined in 3GPP Technical Specification (TS) 38.413). NGAP may enable AMF 154 to request a location of a target UE 102 from a gNB 110-1 for target UE 102 and may enable gNB 110-1 to return a location for UE 102 to the AMF 154.

GNBs 110-1, 110-2, 110-3, or ng-eNB 114 may communicate with one another using an Xn Application Protocol (XnAP), e.g. as defined in 3GPP TS 38.423. XnAP may allow one gNB 110 to request another gNB 110 to obtain UL location measurements for a target UE 102 and to return the UL location measurements. XnAP may also enable a gNB 110 to request another gNB 110 to transmit a downlink (DL) RS or PRS to enable a target UE 102 to obtain DL location measurements of the transmitted DL RS or PRS.

A gNB (e.g. gNB 110-1) may communicate with a target UE 102 using a Radio Resource Control (RRC) protocol, e.g. as defined in 3GPP TS 38.331. RRC may allow a gNB (e.g. gNB 110-1) to request location measurements from the target UE 102 of DL RS s or DL PRSs transmitted by the gNB 110-1 and/or by other gNBs 110-2, 110-3, or ng-eNB 114 and to return some or all of the location measurements. RRC may also enable a gNB (e.g. gNB 110-1) to request the target UE 102 to transmit an UL RS or PRS to enable the gNB 110-1 or other gNBs 110-2, 110-3, or ng-eNB 114 to obtain UL location measurements of the transmitted UL RS or PRS.

With a UE assisted position method, UE 102 may obtain location measurements (e.g. measurements of RSSI, Rx-Tx, RTT, AOA, RSTD, RSRP and/or RSRQ for gNBs 110-1, 110-2, 110-3, or ng-eNB 114 or WLAN APs, or measurements of GNSS pseudorange, code phase and/or carrier phase for SVs 190) and send the measurements to an entity performing a location server function, e.g., LMF 152, or SLP 162, for computation of a location estimate for UE 102. With a UE based position method, UE 102 may obtain location measurements (e.g. which may be the same as or similar to location measurements for a UE assisted position method) and may compute a location of UE 102 (e.g. with the help of assistance data received from a location server such as LMF 152 or SLP 162). With a network based position method, one or more base stations (e.g. gNBs 110-1, 110-2) or APs may obtain location measurements (e.g. measurements of RSSI, RTT, AOA, RSRP, RSRQ, Rx-Tx or TOA for signals transmitted by UE 102) and/or may receive measurements obtained by UE 102, and may send the measurements to a location server, e.g., LMF 152, for computation of a location estimate for UE 102.

Information provided by the gNBs 110-2, 110-3, or ng-eNB 114 to the gNB 110-1 using XnAP may include timing and configuration information for PRS transmission and location coordinates of the gNBs 110-2, 110-3, or ng-eNB 114. The gNB 110-1 can then provide some or all of this information to the UE 102 as assistance data in an RRC message. An RRC message sent from gNB 110-1 to UE 102 may include an embedded LPP message in some implementations.

An RRC message sent from the gNB 110-1 to the UE 102 may instruct the UE 102 to do any of a variety of things, depending on desired functionality. For example, the RRC message could contain an instruction for the UE 102 to obtain measurements for GNSS (or A-GNSS), WLAN, and/or DL-TDOA (or some other position method) or to transmit uplink (UL) signals, such as Positioning Reference Signals, Sounding Reference Signals, or both. In the case of DL-TDOA, the RRC message may instruct the UE 102 to obtain one or more measurements (e.g. RSTD measurements) of PRS signals transmitted within particular cells supported by particular gNBs 110. The UE 102 may use the measurements to determine the position of UE 102, e.g., using DL-TDOA.

A gNB 110 in NG-RAN 112 may also broadcast positioning assistance data to UEs such as UE 102.

As illustrated, a Session Management Function (SMF) 156 connects the AMF 154 and the UPF 158. SMF 156 may manage the establishment, modification, and release of PDU sessions for UE 102, perform IP address allocation and management for UE 102, act as a Dynamic Host Configuration Protocol (DHCP) server for UE 102, and select and control a UPF 158 on behalf of UE 102.

The User Plane Function (UPF) 158 may support voice and data bearers for UE 102 and may enable UE 102 voice and data access to other networks such as the Internet 175. UPF 158 functions may include: external PDU session point of interconnect to a Data Network, packet (e.g. Internet Protocol (IP)) routing and forwarding, packet inspection and user plane part of policy rule enforcement, Quality of Service (QoS) handling for user plane, downlink packet buffering and downlink data notification triggering. UPF 158 may be connected to SLP 162 to enable support of location of UE 102 using the SUPL location solution defined by the Open Mobile Alliance (OMA). SLP 162 may be further connected to or accessible from external client 130.

It should be understood that while FIG. 1 shows a network architecture for a non-roaming UE 102, with suitable, well-known, changes, a corresponding network architecture may be provided for a roaming UE 102.

In a 5G network supporting NR, a UE 102 may be in an RRC connected state (also referred to as a "connected state"), an RRC idle state (also referred to as an "idle state"), or an RRC inactive state (also referred to as an "inactive state"). The serving gNB 110-1 in the NG-RAN 112 may move the UE 102 to the inactive state (from the connected state), where a UE connection context is saved by the gNB 110-1 and the UE 102. The functionality of the UE 102 in the inactive state is primarily the same as in the idle state, where UE 102 will monitor for paging in a paging Discontinuous Reception (DRX) cycle. However, while in the inactive state, the UE 102 may also perform RAN-based notification area updates, e.g., periodically, and when moving outside a configured RAN-based notification area, may acquire system information, and may send System Information (SI) requests (if configured). When the RRC connection is resumed (i.e. when the UE 102 moves back into the connected state), since the UE connection context is already stored by the gNB 110 and the UE 102, the data activity resumption can be fast compared to establishing an RRC connection from the idle state after the RRC connection is released. Thus, with use of the inactive state, the UE 102 can move back into the connected state with reduced power consumption and lower latency than moving into the connected state from the idle state. Additionally, the UE 102 may be able to perform limited communication with the 5G network (e.g. with the AMF 154 or LMF 152) while in the inactive state without needing to transition back into the connected state. As shown further down herein, this capability can be used to support positioning of UE 105 with reduced power consumption by UE 102 and/or with reduced latency. It is noted that only the serving gNB 110 can suspend an RRC connection to move the UE 102 into the inactive state, but the resumption back into the connected state may be triggered by either the UE 102 or by a gNB 110.

Figure 2:
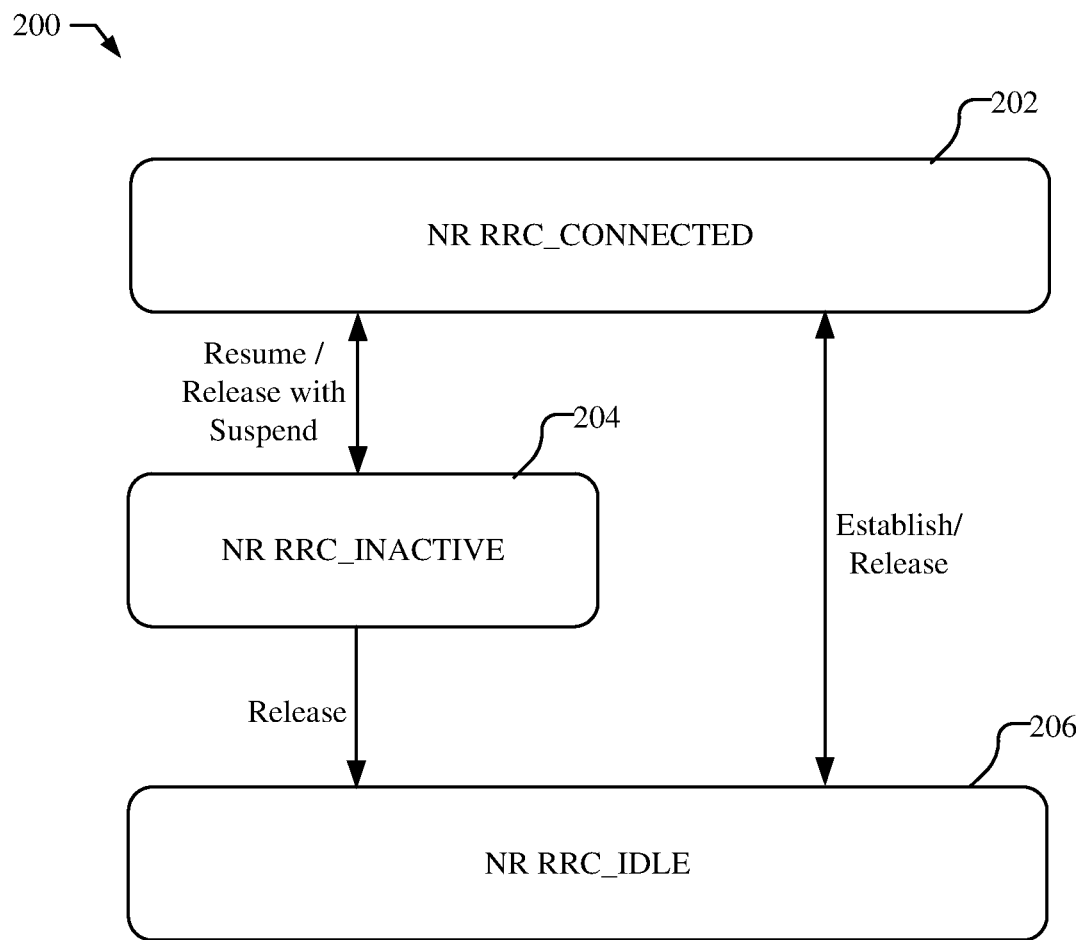
FIG. 2 illustrates a Radio Resource Control (RRC) connection state machine and state transitions.

FIG. 2, by way of example, illustrates a simple UE RRC state machine 200 and state transitions in NR, e.g., as described in 3GPP TS 38.331. A UE 102 may have only one RRC state in NR at one time. As illustrated, the UE 102 may have an NR RRC_CONNECTED state 202, an NR RRC_INACTIVE state 204, or an NR RRC_IDLE state 206. A UE 102 may be in either the RRC_CONNECTED state 202 or the RRC_INACTIVE state 204 when an RRC connection has been established. If this is not the case, i.e. no RRC connection has been established, the UE 102 is in RRC_IDLE state 206.

In the RRC_IDLE state 206, a UE specific DRX may be configured by upper layers and UE controlled mobility may be based on network configuration. While in RRC_IDLE state 206, the UE 102 may monitor Short Messages transmitted with Paging Radio Network Temporary Identifier (P-RNTI) over Downlink Control Information (DCI), monitor a Paging channel for Core Network (CN) paging using 5G-Serving Temporary Mobile Subscriber Identity (S-TMSI), performs neighboring cell measurements and cell (re-)selection, acquire system information and send SI request (if configured), and perform logging of available measurements together with location and time for logged measurement configured UEs.

In the RRC_INACTIVE state 204, a UE specific DRX may be configured by upper layers or by RRC layer, and UE controlled mobility may be based on network configuration. Additionally, the UE 102 stores the UE Inactive Access Stratum (AS) context, and a RAN-based notification area is configured by RRC layer. While in RRC_INACTIVE state 204, the UE 102 may monitor short messages transmitted with P-RNTI over DCI, monitor a Paging channel for CN paging using 5G-S-TMSI and RAN paging using full Inactive-RNTI (I-RNTI); perform neighboring cell measurements and cell (re-)selection. Additionally, the UE 102 may perform RAN-based notification area updates periodically and when moving outside a configured RAN-based notification area, acquire system information and send SI request (if configured), and performs logging of available measurements together with location and time for logged measurement configured UEs.

In the RRC_CONNECTED state 202, the UE 102 stores the AS context, is configured for transfer of unicast data to/from UE 102, and at lower layers, the UE 102 may be configured with a UE specific DRX. A UE 102 configured for supporting carrier aggregation (CA), may use of one or more SCells, aggregated with the SpCell, for increased bandwidth. A UE 102 configured for supporting Dual Connectivity (DC), may use one Secondary Cell Group (SCG), aggregated with the Master Cell Group (MCG), for increased bandwidth. Further, the RRC_Connected state 202 includes network controlled mobility within NR and to/from E-UTRA. While in RRC_CONNECTED state 202, the UE 102 may monitor short messages transmitted with P-RNTI over DCI, if configured, monitor control channels associated with the shared data channel to determine if data is scheduled for it, provide channel quality and feedback information, performs neighboring cell measurements and measurement reporting, and may acquire system information.

As illustrated in FIG. 2, from the NR RRC_CONNECTED state 202, the UE 102 may transition to the NR RRC_IDLE state 206 by being released by the gNB 110. The UE 102 may transition from the NR RRC IDLE state 206 to the NR RRC CONNECTED state 202 by establishing an RRC connection.

Additionally, from the NR RRC_CONNECTED state 202, the UE 102 may transition to the NR RRC_INACTIVE state 204 by being released with a suspend indication (sometimes referred to simply as being suspended) by the serving gNB 110. From the NR RRC_INACTIVE state 204, the UE 102 may transition back to the NR RRC CONNECTED state 202 by resuming the RRC connection. Because the serving gNB 110 (also referred to as an anchor gNB after the UE 102 enters the inactive state) and the UE 102 both store UE connection context, including the AS context, resuming the NR RRC_CONNECTED state 202 from the NR RRC_INACTIVE state 204 can be significantly faster and require less messaging than establishing the NR RRC_CONNECTED state 202 from the NR RRC_IDLE state 206. Additionally, as illustrated, while in the NR RRC_INACTIVE state 204, the UE 102 may transition to the NR RRC_IDLE state 206 by being released by a gNB 110.

Figure 3:
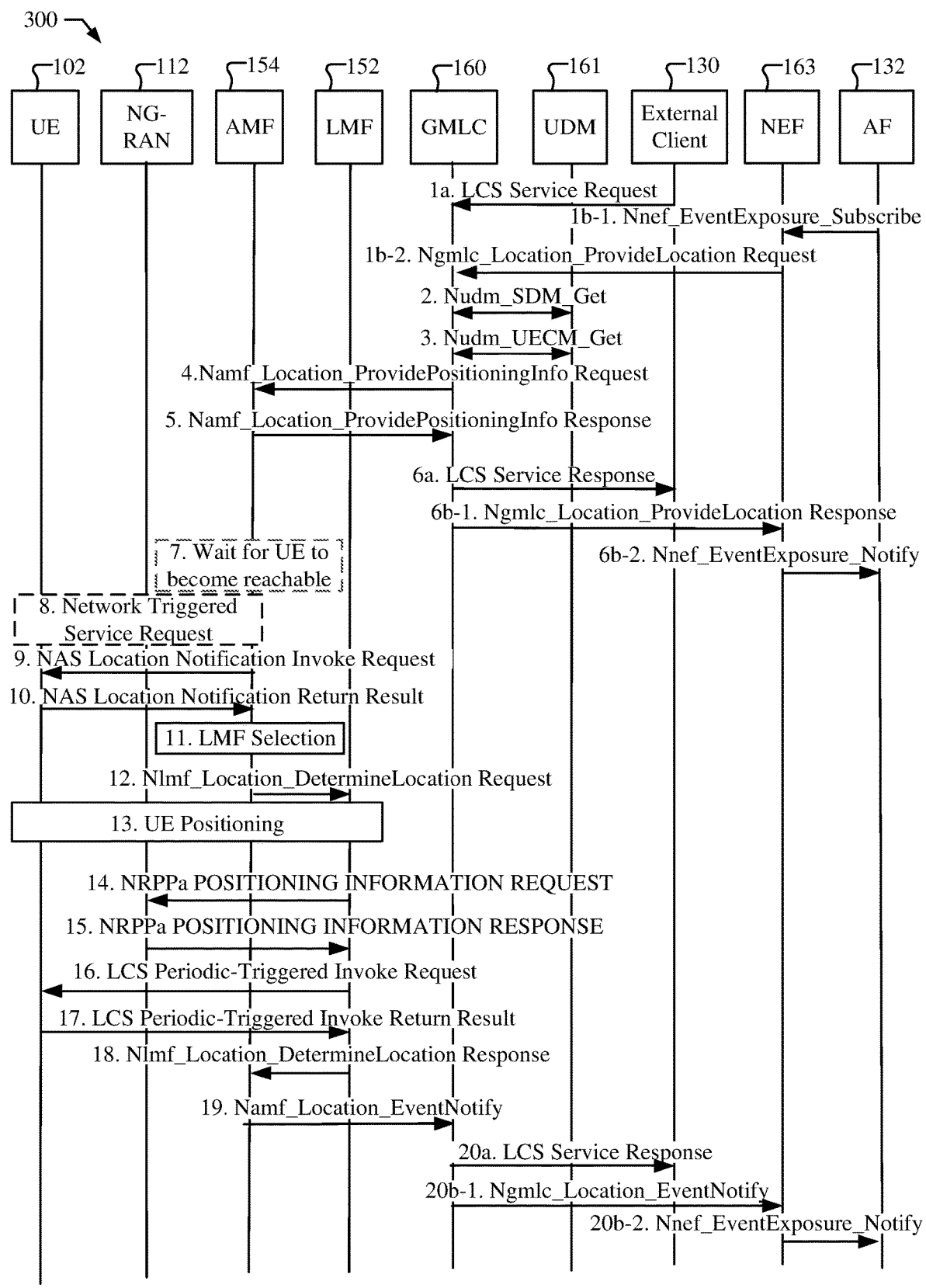
FIG. 3 shows a signaling flow that illustrates various messages sent between components of a communication system during a location preparation procedure for a deferred Mobile Terminated Location Request (MT-LR).

FIG. 3 shows a signaling flow 300 that illustrates various messages sent between components of the communication system 100 depicted in FIG. 1, during a location preparation procedure for a periodic triggered deferred location request for a Mobile Terminated Location Request (MT-LR).

At stage 1, including stages 1a, 1b-1 and 1b-2, the external LCS client 130 or the AF 132 (via NEF 163) sends a request to the (H)GMLC 160 for location reporting for periodic, triggered or UE available location events. The external LCS client 130, for example, sends an LCS Service Request message to the GMLC 160 at stage 1a, or the AF 132 sends an Nnef_EventExposure_Subscribe message to NEF 163 at stage 1b-1 and the NEF 163 sends an Ngmlc_Location_ProvideLocation Request message at stage 1b-2. The request sent at stage 1 indicates a request for either periodic location estimates for UE 102 (e.g. at fixed periodic intervals) or triggered location reports (e.g. location estimates) for UE 102 to be returned to external LCS client 130 or AF 132 whenever a trigger event occurs at UE 102. For example, a trigger event may occur when UE 102 has moved by more than a defined threshold distance from a previous location at which a location report (e.g. location estimate) was sent to external LCS client 130 or AF 132, or may occur when UE 102 moves out of or into some defined geographic area.

At stage 2, the (H)GMLC 160 may verify UE privacy requirements via Nudm_SDM_Get messages with the UDM 161.

At stage 3, the (H)GMLC 160 queries the UDM 161 for the AMF address (and, in the case of roaming, a VGMLC address) via Nudm_UECM_Get messages.

At stage 4, the GMLC 160 sends the location request to the serving AMF 154 (via the V-GMLC (not shown) in case of roaming), via an Namf_Location_ProvidePositioningInfo Request message.

At stages 5, the AMF 154 returns an acknowledgment (Namf_Location_ProvidePositioningInfo Response message) to the GMLC 160 indicating that the request was accepted.

At stage 6, including stages 6a, and 6b-1 and 6b-2, the GMLC 160 returns an acknowledgement to the external LCS client 130 or AF 132 indicating that the request was accepted. The GMLC 160, for example, sends an LCS Service Response message to the external LCS client 130 at stage 6a, or the GMLC 160 sends an Ngmlc_Location_ProvideLocation Response message to the NEF 163 at stage 6b-1 and the NEF 163 sends an Nnef_EventExposure_Notify message to AF 132 at stage 6b-2.

At stage 7, if the UE 102 is not currently reachable (e.g., is using extended discontinuous reception (eDRX) or is in power saving mode (PSM)), the AMF 154 waits for the UE 102 to become reachable.

At stage 8, if the UE 102 is then in a connection management (CM) IDLE state, the AMF 154 initiates a network triggered Service Request procedure to establish a signaling connection with the UE 102.

At stages 9 and 10, the AMF 154 may notify the UE 102 of the location request and may verify privacy requirements if required via NAS Location Notification Invoke Request and NAS Location Notification Return Result messages.

At stage 11, the AMF 154 selects an LMF 152.

At stage 12, the AMF 154 initiates a request for deferred UE location (periodic or triggered location) with the LMF 152, via an Nlmf_Location_DetermineLocation Request message. The request sent by AMF 154 to LMF 152 can include all or at least some of the information included in the original request at stage 1, including information for the periodic or triggered location request and may further include an identity of UE 102, an identity or address for GMLC 160 and some label or reference for the location session being established by signaling flow 300.

At stage 13, the LMF 152 may perform a positioning procedure with the UE 102. During this stage, the LMF 152 may obtain the UE 102 positioning capabilities and may also obtain an (initial) UE 102 location, e.g. by exchanging LPP messages with UE 102. The UE 102 positioning capabilities may indicate UE 102 support for at least one of uplink positioning, downlink positioning, uplink and downlink positioning, or a combination thereof while in an RRC Inactive state. The LMF 152 may then determine whether to enable, at stages 14 and 16, uplink positioning, downlink positioning and/or uplink and downlink positioning in an RRC Inactive, based on the UE 102 positioning capabilities.

At stage 14, if UL positioning (e.g. Ul-TDOA or UL-AOA) or UL-DL positioning (e.g. multi-cell RTT) will be used while the UE 102 is in RRC Inactive state, the LMF 152 may either (i) provide an UL SRS configuration, in a variant referred to here as "Option A", or (ii) may provide a set of alternative UL SRS configurations, e.g., in a priority order, in a variant referred to here as "Option B", to the serving gNB 110 in the NG-RAN 112, e.g., via an NRPPa Positioning Information Request message. An UL SRS configuration may define parameters for transmission of UL SRS by UE 102 at a later time, such as parameters defining a bandwidth, duration, periodicity, frequency and/or a direction or directions of UL SRS transmission. The LMF 152 may determine the UL SRS configuration(s) based on determining one or more UL or UL-DL position methods to be used to locate UE 102 for each periodic or triggered location estimate. Both the UL SRS configuration(s) and the one or more UL or UL-DL position methods may be determined by LMF 152 based on the UE 102 positioning capabilities obtained at stage 13. For example, the LMF 152 may use the UE 102 positioning capabilities to ensure that UE 102 can support the UL SRS configuration(s) and the one or more UL or UL-DL position methods.

If stage 14 occurs, the serving gNB 110 may send a response, e.g., via an NRPPa Positioning Information Response message (stage 15), that indicates if UL (and/or UL-DL) positioning can be supported in RRC Inactive state. For a subsequent change of anchor gNB 110 for UE 102 (for all options), the UL SRS configuration(s) can be sent to the new anchor gNB 110 by the previous anchor gNB 110 as part of the transfer of a UE 102 context to the new anchor gNB 110. The serving gNB 110 does not assign an UL SRS configuration to the UE 102 at this time. In another variant (referred to here as "Option C"), stages 14 and 15 are not performed. Instead, an UL SRS configuration for UE 102 is sent to the serving gNB 110 by the LMF 152 (e.g. in an NRPPa Positioning Information Request message) as part of positioning of the UE 102 (e.g. at stage 13 or at a later time for the first event report from the UE 102) using NRPPa procedures described in 3GPP TS 38.305. The LMF 152 may further include an indication (when sending an UL SRS configuration to the serving gNB 110 at stage 14, stage 13 or at a later time) that the serving gNB 110 should store the UL SRS configuration or the serving gNB may decide this itself. The serving gNB 110 (which may later become an anchor gNB 110 for RRC Inactive state for UE 102) then stores the UL SRS Configuration for future use in stage 22, shown in FIG. 4A.

At stages 16, if periodic or triggered location was requested, the LMF 152 sends a Supplementary Services (SS) LCS Periodic-Triggered Invoke Request message to the UE 102 including the location request information which may include information about the requested periodic or triggered location, an identity or address for the GMLC 160, a label or reference to the location session being established by signaling flow 300, and/or an embedded LPP Packet Data Unit (PDU) which indicates certain allowed or required location measurements. The LMF 152 may indicate that the UE 102 may send an event report in an RRC Inactive state (e.g. as in stages 22 and 23 of FIG. 4A). The LMF 152 may optionally provide the UL SRS configuration(s) sent to the gNB 110 at stage 14, e.g., by providing an UL SRS configuration for Option A, or a set of alternative UL SRS configurations, e.g., in a priority order, for Option B. If the request at stage 16 can be supported, the UE 102 returns an acknowledgment to the LMF 152 in an SS LCS Periodic-Triggered Invoke Return Result message (stage 17).

At stages 18-20, the LMF 152 provides a response to the external LCS client 130 or AF 132 (via the NEF 163), via intermediate network entities. For example, at stage 18, the LMF 152 provides the response in an Nlmf_Location_DetermineLocation Response message to the AMF 154. At stage 19, the AMF 154 provides the response in an Namf_Location_EventNotify message to the GMLC 160. At stage 20, including stages 20a, and 20b-1 and 20-2, the GMLC 160 sends the response to the external LCS client 130 or AF 132. The GMLC 160, for example, sends an LCS Service Response message to the external LCS client 130 at stage 20, or the GMLC 160 sends an Ngmlc_Location_EventNotify message to the NEF 163 at stage 20b-1 and the NEF 163 sends an Nnef_EventExposure_Notify message to AF 132 at stage 20b-2. The response indicates whether periodic or triggered location was successfully activated in the UE 102.

Figure 4A:
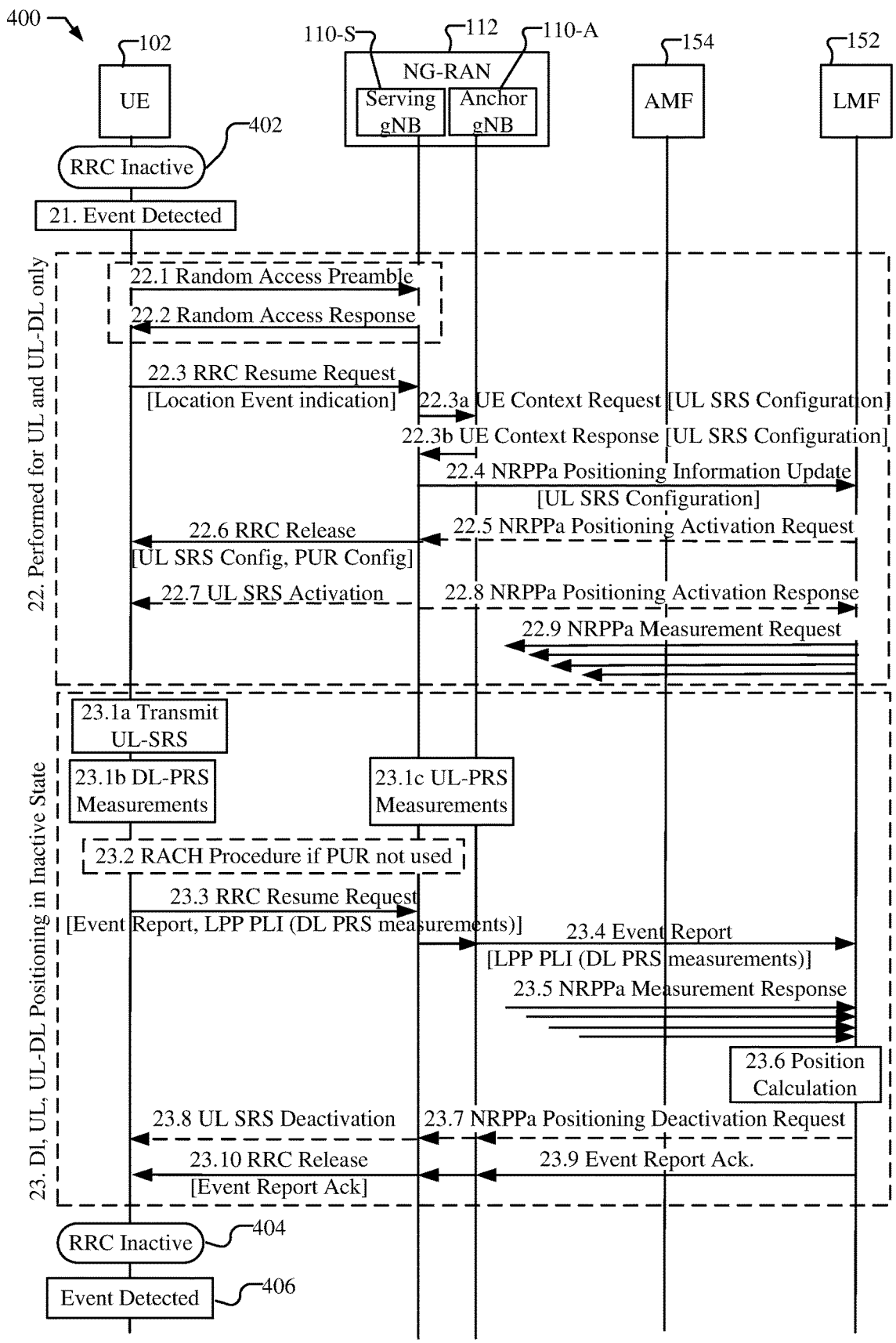
FIG. 4A shows a signaling flow that illustrates various messages sent between components of a communication system for event reporting for a deferred MT-LR request while a UE is in an RRC Inactive state.

FIG. 4A shows a signaling flow 400 that illustrates various messages sent between components of the communication system 100 depicted in FIG. 1, for event reporting for a periodic triggered deferred MT-LR for the UE 102 while the UE 102 is in an RRC Inactive state. Signaling flow 400 may be a continuation of the signaling flow 300 shown in FIG. 3, and hence stages in FIG. 4A are show as continuing the numbering shown in FIG. 3. Thus, stages 1-20 in FIG. 3 may have occurred prior to the events and stages described for FIG. 4A. Note that this would normally be the case except where a location server located in the NG-RAN 112 is used, in which case signaling may have previously occurred similar to FIG. 3 but using a location server in the NG-RAN 112 instead of or in addition to the LMF 152.

FIG. 4A illustrates the presence of a serving gNB 110-S and an anchor gNB 110-A in the NG-RAN 112, which may in some cases be the same gNB 110. The serving gNB 110-S interacts with the UE 102, while the anchor gNB 110-A maintains a connection with the AMF 154 on behalf of the UE 102. The anchor gNB 110-A represents a previous serving gNB 110 for the UE 102, e.g., from before the UE 102 entered an RRC Inactive state. For example, before entering an RRC Inactive state, the UE 102 was in a connected state with a serving gNB 110 and a serving AMF 154. At some point, the serving gNB 110 may have sent an RRC Release message with a suspend indication to the UE 102. The UE 102 would then have entered the RRC Inactive state and the serving gNB 110 may have then become the anchor gNB 110-A (though, in some cases, the anchor gNB 110-A may have both been and remained different from the last serving gNB 110, as described in 3GPP TS 38.300). After entering the RRC Inactive state, the UE 102 may move. If the UE 102 is to report a periodic or triggered event for periodic or triggered location, the movement of the UE 102 may require that the UE 102 use a different serving gNB, illustrated in FIG. 4A as the serving gNB 110-S, while an earlier serving gNB 110 serves as the anchor gNB 110-A. In some implementations, e.g., where the UE 102 has not moved significantly, the serving gNB 110-S and the anchor gNB 110-A may be the same entity.

FIG. 4A illustrates the use of LMF 152, which is in the 5GCN 150, as illustrated in FIG. 1. In some implementations, the location server may be located in the NG-RAN 112, e.g., sometimes referred to as a location server surrogate (LSS) or Location Management Component (LMC). For all stages in signaling flow 400, the gNB 110 to LMF 152 NRPPa messages are not needed with an LSS or LMC, which may be located, e.g., in the anchor gNB 110-A.

As illustrated by block 402, the UE 102 is initially in an RRC Inactive state. For example, the UE 102 may have entered the RRC Inactive state as described above. The UE 102 then has no active RRC connection with the NG-RAN 112, but still has a Non-Access Stratum (NAS) signaling connecting with the serving AMF 154 via the anchor gNB 110-A (i.e., the serving gNB 110 for the UE before the UE 102 entered the RRC Inactive stage). Thus, while in RRC Inactive state, there is a signaling connection between the AMF 154 and the anchor gNB 110-A, on behalf of the UE 102, but that signaling connection does not actively extend to the UE 102.

At stage 21 in FIG. 4A, the UE 102 detects an event for the periodic or triggered deferred MT-LR that was instigated in the UE 102 at stages 16 and 17 in FIG. 3. The event may be a periodic event or a triggered event, e.g. as described for stage 1 of FIG. 3. Immediately after (or sometime before) the event is detected, the UE 102 may determine which position method(s) will be used for the detected event from the request in stage 16 of FIG. 3. The determined position method(s) may be based on: (i) position methods included in an LPP Request Location Information message carried in the LCS Periodic-Triggered Invoke Request at stage 16; (ii) an indication of UL positioning implied by receiving an UL SRS configuration at stage 16; and/or (iii) position method(s) used for the last event report sent by UE 102. The UE 102 may also determine whether event reporting is allowed in RRC Inactive state based on: (i) an indication received at stage 16; or (ii) an indication received earlier from a previous serving gNB 110 (e.g. received when the UE 102 previously entered RRC Inactive state or received when the previous serving gNB 110 sent an UL SRS Configuration to the UE 102 for positioning of UE 102 for the last event report). When event reporting is allowed in RRC Inactive state and after the event is detected at stage 21, the UE 102 performs stages 22 and 23 for UL and/or UL-DL position methods or performs stage 23 only for DL position methods (without any UL or UL-DL position method). When event reporting is not allowed in RRC Inactive state, the UE 102 may send an RRC Resume Request to gNB 110-S to enter RRC Connected state and then reports the event using the solution for a periodic or triggered deferred MT-LR described in 3GPP TS 23.273 and 3GPP TS 38.305.

At stage 22, illustrated by the dotted box, for UL and UL-DL positioning methods, UL SRS is already configured in the anchor gNB 110-A at initiation of the periodic-triggered MT-LR, as discussed in stages 14 and 15 in FIG. 3, and optionally configured in the UE 102 (e.g. at stages 16 and 17 in FIG. 3).

At stages 22.1 and 22.2, the UE 102 performs a Random Access Channel (RACH) procedure, which terminates at the serving gNB 110-S. A four step RACH may be performed.

At stage 22.3, the UE 102 sends an RRC Resume message to the serving gNB 110-S, which includes a location event indication to trigger UL positioning. The location event indication, for example, may be a bit sequence, flag or a bit that is set in the RRC Resume message to indicate a location event was detected.

At stages 22.3a and 22.3b, the serving gNB 110-S fetches the UE context from the anchor gNB 110-A, by sending a request for the UE context to the anchor gNB 110-A and receiving a response with the UE context. The UE context includes the UL SRS Configuration(s), e.g., as received at stages 14 and 15 in FIG. 3, referred to here as the first UL SRS Configuration(s).

At stage 22.4, the serving gNB 110-S determines a second UL SRS configuration to be used by the UE 102 based on the first UL SRS Configuration(s). The second UL-SRS configuration is aligned to the serving gNB 110-S transmission and reception timing. The second UL SRS Configuration may be the same as the first UL SRS Configuration (or the same as one of the first UL SRS Configurations) or serving gNB 110-S may assign a different second UL-SRS configuration, e.g., with a different duration, periodicity or bandwidth than the first UL SRS Configuration(s). The serving gNB 110-S sends an NRPPa Positioning Information Update message, including the second UL SRS configuration to be used by the UE 102, to the LMF 152 using non-UE associated signaling. The NRPPa Positioning Information Update message sent to the LMF 152 may not go through the serving AMF 154. If the serving gNB 110-S does not have the first UL SRS Configuration (e.g. for Option C), the serving gNB 110-S may (i) send an indication to the LMF 152 to request an UL SRS Configuration from LMF 152, or (ii) send an RRC Release to the UE 102 indicating that the UE 102 should perform event reporting. For case (ii), the UE 102 may send an event report to gNB 110-S in an RRC Resume Request (e.g. as at stage 23.3) or in an RRC Resume Complete message if the UE 102 enters RRC Connected state, which the serving gNB 110-S forwards to the LMF 152. For case (ii), the serving gNB 110-S may then later receive an UL SRS Configuration from the LMF 152 which can be stored by the serving gNB 110-S (e.g. if instructed by the LMF 152) for use in stage 22 for later event reports As an alternative for stage 22.4, the serving gNB 110-A may send the NRPPa Positioning Information Update message with the second UL SRS configuration to be used by the UE 102 to the anchor gNB 110-A, and the anchor gNB 110-A may send this message, through the serving AMF 154 to the LMF 152 via UE associated signaling.

At stage 22.5, for an aperiodic (AP) or semi-persistent (SP) second UL SRS configuration, the LMF 152 may activate UL SRS by sending an NRPPa Positioning Activation Request to the serving gNB 110-S (e.g. directly or via the anchor gNB 110-A). If the second UL SRS configuration is periodic, stage 22.5 is not necessary.

At stage 22.6, the serving gNB 110-S sends the second UL SRS Configuration determined in stage 22.4 to the UE 102 as a parameter in an RRC Release message over a Message 4 (msg4) or Message B (MsgB) (e.g. ciphered according to AS ciphering retrieved from the anchor gNB 110-A). Optionally, preconfigured uplink resources (PUR) may be included at stage 22.6, which allows subsequent Resume requests from UE 102 without requiring a Random Access procedure (such as shown in stages 22.1 and 22.2) in the future. The RRC Release message may be limited in the amount of data that may be included. There are five alternative ways that the serving gNB 110-S may send the second UL SRS configuration to the UE 102 at stage 22.6, which can enable compression of signaling to fit in an RRC Release message or fallback to RRC Connected state.

In a first implementation, the second UL SRS Configuration may be included in the RRC Release message with no compression (e.g. if small enough to fit into the RRC Release message).

In a second implementation, if Option B was used at stages 14 and 16 in FIG. 3, e.g., multiple UL SRS configurations were sent by the LMF 152, the serving gNB 110-S may select one of the configurations as the second UL SRS Configuration and may indicate this to the UE 102 using an index, pointer or label in the RRC Release message that identifies the selected configuration. An additional (small) parameter may be included in the RRC Release message to indicate any new timing for the second UL SRS Configuration relative to the serving gNB 110-S timing.

In a third implementation, the serving gNB 110 may send a "delta" UL SRS configuration in the RRC Release message which includes only the differences between the first UL SRS configuration (option A) or one of the first UL SRS configurations (option B) (referred to as Config 1) and the second UL SRS configuration determined at stage 22.4 (referred to as Config 2). The delta may include new parameter values for Config 2 or a difference between a parameter value for Config 1 and a corresponding parameter value for Config 2. Parameter values which do not change may not be sent. The UE 102 would previously have received the first UL SRS configuration(s), as described earlier for Options A and B, and hence can determine the second UL SRS Configuration based on the "delta" UL SRS configuration.

In a fourth implementation, a delta UL SRS configuration may be provided as in the third implementation, but where Config 1 corresponds to the last UL SRS configuration that was sent to the UE 102 for the last invocation of stage 22.6 (or sent to the UE 102 for the first use of UL SRS by the UE 102 for option C). With this implementation, the LMF 152 does not need to support option A or option B (i.e. no UL SRS Config is sent to the UE at stage 16 in FIG. 3). This implementation may not be used for the first UE event report (e.g., the first implementation or the fifth implementation may be used instead). With the fourth implementation, the serving gNB 110-S may instruct the UE 102 to store either the second UL SRS configuration that is sent to the UE 102 at stage 22.6 (using any of the implementations) or an UL SRS configuration that is determined by the UE 102 based on the second UL SRS configuration, and may further instruct the UE 102 to discard previous UL SRS configurations, and/or may indicate that the UE 102 is allowed to report events in RRC Inactive state according to stages 22 and 23.

In a fifth implementation, the serving gNB 110-S places the UE 102 in an RRC Connected state (and establishes an RRC Connection) by sending an RRC Resume message to the UE 102. The UE 102 then returns an RRC Resume Complete. The serving gNB 110-S may also indicate a path switch to the serving AMF 154. The serving gNB 110-S then sends the second UL SRS configuration to the UE 102, e.g. in an RRC DL Information Transfer message, and may release the RRC Connection after stage 21.7 by sending an RRC Release message.

At stages 22.6 or 22.7, if an activation was sent by the LMF 152 then the serving gNB 110-S may send the activation to the UE 102 Activating UL SRS, for example, may occur at the Medium Access Control Control Element (MAC-CE) level or via Physical Downlink Control Information (DCI) (stage 22.7)—e.g. if the UE 102 expects to receive this immediately after receiving the RRC Release at stage 22.6. In an alternative, the activation may be sent at an RRC level at stage 22.6 (e.g. if there is a fixed start and stop time).

At stage 22.8, if activation was sent by the LMF 152 at stage 22.5, the serving gNB 110-S may send an NRPPa Positioning Activation Response message to the LMF 152. If activation was not sent by the LMF 152 at stage 22.5, stage 22.8 is not necessary.

At stage 22.9, and in response to stage 22.4 or stage 22.8, the LMF 152 may send NRPPa measurement request messages to a plurality of gNBs 110 in the NG-RAN 112 in parallel, such as serving gNB 110-S, and neighbor gNBs 110 (not shown in FIG. 4A), which may or may not include the anchor gNB 110-A, to measure UL SRS transmission from the UE 102 consistent with the second UL SRS configuration.

Stage 23, illustrated by the dotted box, is used for UL, DL and UL-DL position methods. Stages 23.1a, 23.1c, 23.5, 23.7 and 23.8 are omitted for DL positioning only. Stage 23.1b is omitted for UL positioning only and DL PRS measurements are not included for stages 23.3 and 23.4. If the Event report at stage 23.3 is too large for an RRC Resume Request, the UE 102 may send the Event report as part of establishing an RRC Connection and event reporting then occurs as for normal event reporting in a Connected state according to 3GPP TS 23.273.

At stage 23.1a, the UE 102 may transmit UL SRS as per the second UL SRS configuration received (or indicated) at stage 22.6. In some cases, if the second UL SRS configuration was compressed (e.g. according to the second, third or fourth implementation described above for stage 22.6), the UE 102 may need to determine the UL SRS to be transmitted based on the received second UL SRS configuration and a third UL SRS configuration stored in the UE 102. For example, if the second UL SRS configuration comprises a pointer to the third UL SRS configuration stored in the UE or comprises a delta to the third UL SRS configuration stored in the UE, the UE 102 may need to retrieve and/or calculate parameter values for a fourth UL SRS configuration, based on the second UL SRS configuration and the third UL SRS configuration, which the UE 102 transmits at stage 23.1a. In some cases (e.g. as described for the fourth implementation for stage 22.6), the UE 102 may store the fourth UL SRS configuration and may discard previously stored UL SRS configurations such as the third UL configuration.

At stage 23.1b, the UE 102 may receive DL PRS from one or more gNBs 110 and perform DL positioning measurements. The UE 102 may also or instead perform DL position measurements for other position methods determined at stage 21, e.g. such as A-GNSS or WLAN.

At stage 23.1c, the gNBs 110 that received the measurement request at stage 22.9, which may include the serving gNB 110-S and may include the anchor gNB 110-A, receive the UL SRS transmitted by the UE 102 at stage 23.1a and perform UL positioning measurements.

At stage 23.2, if a PUR configuration was not received by the UE 102 in stage 22.6 (or if stage 22.6 did not occur), the UE 102 may perform a Random Access procedure, similar to stages 22.1 and 22.2, which terminates at the serving gNB 110-S.

At stage 23.3, the UE 102 may send an RRC Resume Request message to the serving gNB 110-S that includes an event report that may contain an LPP Provide Location Information (PLI) message which may include DL PRS and/or other DL measurements obtained at stage 23.1b. The event report may indicate the type of event detected by UE 102 at stage 21, e.g. may indicate a periodic event or a particular type of triggered event. The RRC Resume Request message may further indicate the identity or address of the LMF 152.

At stage 23.4, the serving gNB 110-S may send the Event Report to the anchor gNB 110-A and the anchor gNB 110-A may send the Event Report to the LMF 152 via the serving AMF 154. The Event Report includes the LPP PLI if received at stage 23.3. There may be no need to fetch a UE context from the anchor gNB 110-A.

At stage 23.5, the gNBs 110 that performed UL SRS measurements provide an NRPPa Measurement Response, in parallel, to the LMF 152, including the UL SRS measurements obtained at stage 23.1c.

At stage 23.6, the LMF 152 may perform a position determination for UE 102 using the DL PRS measurements (and/or other DL measurements) obtained at stage 23.4 and/or the UL SRS measurements obtained at stage 23.5. The LMF may then send an event report containing the determined position for the UE 102 to external client 130 or AF 132 via GMLC 160 (in the case of external client 130) or via GMLC 160 and NEF 163 (in the case of AF 132), e.g. as described in 3GPP TS 23.273.

At stages 23.7 and 23.8, if the second UL SRS configuration is SP or AP, the LMF 152 may send an NRPPa Positioning Deactivation Request message to the anchor gNB 110-A which sends the message to the serving gNB 110-S (stage 23.7). The serving gNB 110-S sends the UL SRS Deactivation to the UE 102 in stage 23.8, e.g., at the MAC-CE level or using DCI.

At stages 23.9 and 23.10, the LMF 152 sends an Event Report Acknowledgement to the anchor gNB 110-A, which forwards it to the serving gNB 110-S (stage 23.9). The serving gNB 110-S provides an RRC Release message with the Event Report Acknowledgement to the UE 102, which terminates the procedure from the perspective of the UE 102.

As illustrated, at block 404, the UE 102 may remain in the RRC Inactive state, and the procedure may be repeated, e.g., as indicated by block 406, event detected.

The signaling flow 400 allows for the anchor gNB 110-A to remain the anchor gNB for the UE 102 after the event reporting has occurred at block 404. However, it is also possible for the serving gNB 110-S to become a new anchor gNB for the UE 102 during stage 22 or during stage 23. For example (e.g. and as described in 3GPP TS 38.300), the serving gNB 110-S may request and obtain the UE context from the initial anchor gNB 110-A (e.g. as at stage 22.3a and 22.3b), and may then perform a path switch with the serving AMF 154 for the UE 102 and send a context release indication the anchor gNB 110-A (not shown in FIG. 4A). The serving gNB 110-S then becomes the new anchor gNB 110-A for the UE 102 which avoids the need to send messages to LMF 152 and receive messages from LMF 152 via the previous anchor gNB (gNB 110-A). Becoming the new anchor gNB 110-A may add additional signaling and delay but can also reduce delay by avoiding further signaling between the serving gNB 110-S and the previous anchor gNB 110-A. In particular, if UE 102 continues to access the same serving gNB 110-S for later event reports, the reduction in delay for the later event reports may be beneficial.

The signaling flow 400, shown in FIG. 4A, may be performed for a UE 102 that is in RRC Connected state (not in RRC Inactive state) at block 402 with the following stages replaced or modified as described below.

At stages 22.1-22.3 in FIG. 4A, the UE 102 may send an RRC message to the serving gNB 110-S with a Location Event indication. The serving gNB 110-S is then the anchor gNB 110A and so already has the UE context.

At stages 22.4, 22.5, 22.8, these stages occur as shown in FIG. 4A but using UE associated signaling, e.g., with signaling sent between the serving gNB 110-S and the serving AMF 154, and between the serving AMF 154 and the serving LMF 152.

At stage 22.6, the UL SRS configuration may be sent to the UE 102 in a different RRC message.

At stage 22.7, activation of UL SRS signaling in the UE 102 may occur at the MAC-CE level or can use DCI.

At stages 23.2, 23.3, the UE 102 may send the Event Report in an RRC UL Information Transfer message (or RRC Setup Complete message if the UE 102 is in the process of establishing an RRC Connection).

At stages 23.4, 23.7. 23.9, these stages occur using UE associated signaling between the serving gNB 110-S and a serving AMF 154 (as there is no separate anchor gNB 110-A).

At stage 23.10, the Event Report Acknowledgement may be sent to the UE 102 in a RRC DL Information Transfer message or in an RRC Release message if the RRC Connection is being released.

Figure 4B:
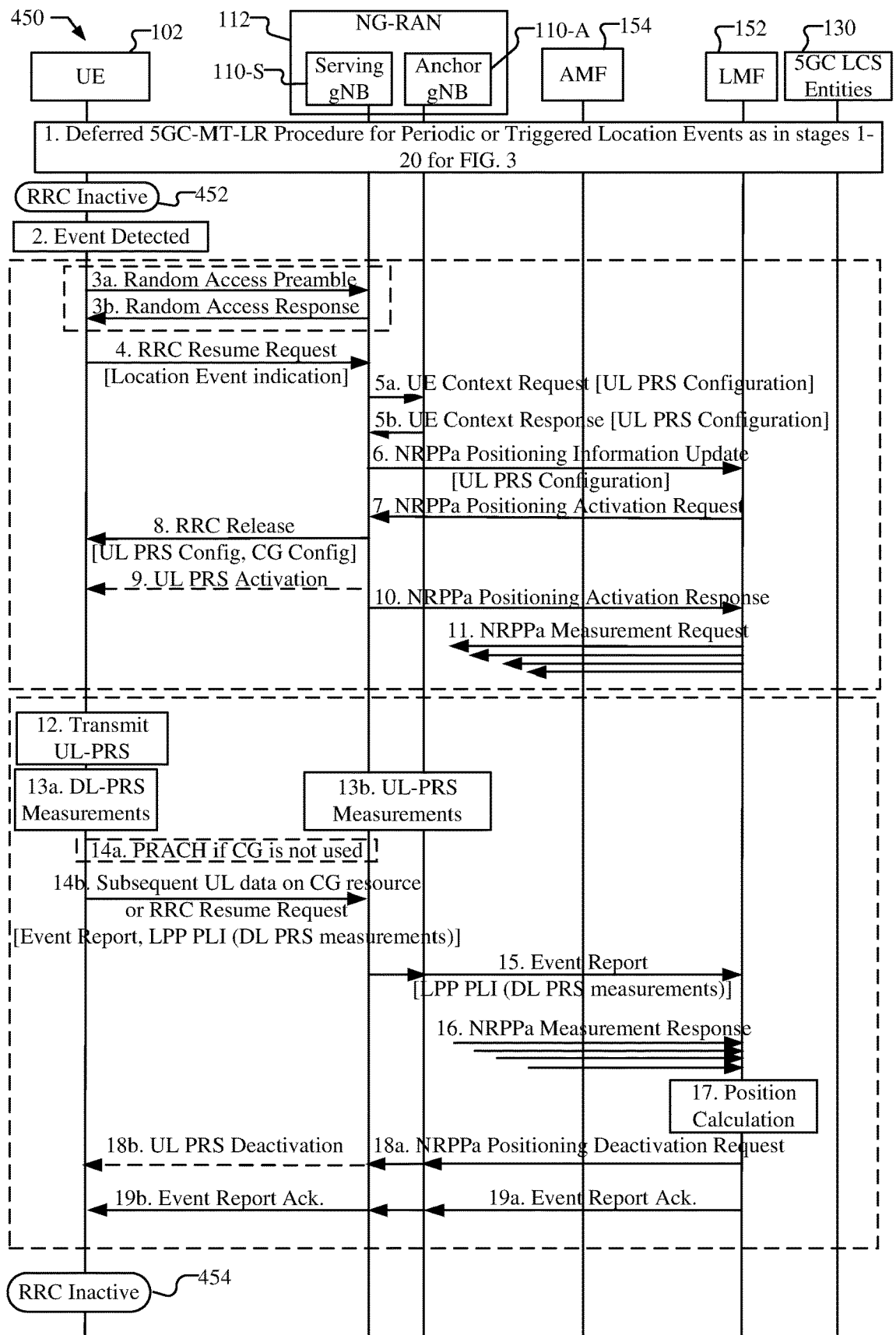
FIG. 4B shows a signaling flow that illustrates various messages sent between components of a communication system for event reporting for a deferred MT-LR request while a UE is in an RRC Inactive state.

FIG. 4B shows a signaling flow 450 that illustrates various messages sent between components of the communication system 100 depicted in FIG. 1, for event reporting for a deferred MT-LR for the UE 102 while the UE 102 is in an RRC Inactive state. Signaling flow 450 is similar to signaling flow 400 with some stages in common and illustrates possible variation for signaling flow 400 based on use of small data transmission (SDT). FIG. 4B shows a Low Power Periodic and Triggered 5GC-MT-LR Procedure using UL-DL Positioning (e.g. for Multi-cell RTT). It is understood that UL positioning (e.g. using UL-TDOA, UL-AoA) and DL positioning (e.g. using DL-TDOA, DL-AOD) would use a subset of the stages shown in FIG. 4B. FIG. 4B illustrates the presence of a serving gNB 110-S and an anchor gNB 110-A in the NG-RAN 112, which may in some cases be the same gNB 110. The serving gNB 110-S interacts with the UE 102, while the anchor gNB 110-A maintains a connection with the AMF 154 on behalf of the UE 102. The anchor gNB 110-A represents a previous serving gNB for the UE 102, e.g., from before the UE 102 entered an RRC Inactive state. For example, before entering an RRC Inactive state, the UE 102 was in a connected state with a serving gNB 110 and a serving AMF 154. At some point, the serving gNB 110 may have sent an RRC Release message with a suspend indication to the UE 102. The UE 102 would then have entered the RRC Inactive state and the serving gNB 110 may have then become the anchor gNB 110-A (though, in some cases, the anchor gNB 110-A may have both been and remained different from the last serving gNB 110, as described in 3GPP TS 38.300). After entering the RRC Inactive state, the UE 102 may move. If the UE 102 is to report a periodic or triggered event for periodic or triggered location, the movement of the UE 102 may require that the UE 102 use a different serving gNB, illustrated in FIG. 4B as the serving gNB 110-S, while an earlier serving gNB 110 serves as the anchor gNB 110-A. In some implementations, e.g., where the UE 102 has not moved significantly, the serving gNB 110-S and the anchor gNB 110-A may be the same entity.

FIG. 4B illustrates the use of LMF 152, which is in the 5GCN 150, as illustrated in FIG. 1. In some implementations, the location server may be located in the NG-RAN 112, e.g., sometimes referred to as a location server surrogate (LSS) or Location Management Component (LMC). For all stages in signaling flow 450, the gNB to LMF NRPPa messages are not needed with an LSS or LMC, which may be located, e.g., in the anchor gNB 110-A.

At stage 1 of FIG. 4B, stages 1-20 for signaling flow 300 in FIG. 3 may be performed. At stage 13 of the procedure described for FIG. 3, the LMF 152 may perform one or more positioning procedures to obtain an initial location estimate for UE 102. During this stage, the LMF 152 may request and obtain the UE positioning capabilities which may include an indication that the UE 102 can support, UL positioning, DL positioning, UL-DL positioning, or a combination thereof in RRC_INACTIVE state (e.g., which may be provided using a capability flag associated with the multi-cell RTT position method). At stages 14 and 15 of the procedure described for FIG. 3, the LMF 152 may also provide an UL-PRS configuration, or a set of alternative UL-PRS configurations to the serving gNB 110 for UE 102 via an NRPPa Positioning Information Request message. The serving gNB 110 (which may later become the anchor gNB 110-A) may then send an NRPPa Positioning Information Response message to the LMF 152 that indicates whether UL positioning can be supported for the UE in RRC_INACTIVE state. For a subsequent change of serving gNB 110, the UL-PRS configuration(s) can be sent to the new serving gNB 110 (which may then become a new anchor gNB 110-A for UE 102) as part of the transfer of a UE context to the new serving gNB 110. The serving gNB 110 then sends an RRCConnectionRelease with suspendConfig to move the UE 102 to RRC_INACTIVE state, as indicated by block 452.

At stage 2, the UE 102 monitors for occurrence of the trigger or periodic event requested during stage 1. The UE 102 determines which positioning method(s) will be used for the detected event from the request in stage 1 (e.g. based on position method(s) included in an LPP Request Location Information message carried in the LCS Periodic-Triggered Invoke Request that the UE 102 received at stage 16 of FIG. 3 as part of stage 1 in FIG. 4B). The UE 102 may also determine whether event reporting is allowed in RRC_INACTIVE state based on an indication received during stage 1.

At stage 3, when event reporting is allowed in RRC_INACTIVE state and after an event is detected, the UE 102 performs a 4 step or 2-step Random Access Channel (RACH) procedure. When event reporting is not allowed in RRC_INACTIVE state, the UE 102 may send an RRC Resume Request to enter RRC Connected state and then reports the event using the procedure in clause 6.3.1 of 3GPP TS 23.273. UL-PRS is already configured in the UE 102 and anchor gNB 110-A during stage 1.

At stage 4, the UE 102 sends a RRC Resume Request to the serving gNB 110-S. The RRC Resume Request includes an LCS Event Indication to trigger UL positioning.

At stage 5, including stages 5a and 5b, the serving gNB 110-S fetches the UE context from the anchor gNB 110-A. The UE 102 context includes the UL-PRS configuration(s) (as determined during stage 1).

At stage 6, the serving gNB 110-S determines an UL-PRS configuration based on the UE context information received at stage 5b and sends an NRPPa Positioning Information Update message to the LMF 152 via the serving AMF 154, e.g., through the anchor gNB 110-A.

If the serving gNB 110-S does not have any UL-PRS configuration information, the serving gNB 110-S may send an indication to the LMF 152 to request an UL-PRS configuration or the serving gNB 110-S may send an RRC Release to the UE 102 indicating that the UE 102 should perform normal event reporting in a connected state.

At stage 7, the LMF 152 may send a NRPPa Positioning Activation message (e.g., which may include a starting time) to the serving gNB 110-S to request UL-PRS activation in the UE 102.

At stage 8, the serving gNB 110-S provides the UL-PRS configuration to the UE 102 as part of the RRC Release message over message 4 (msg4) or message B (MsgB) (e.g., ciphered according to the AS context retrieved from the anchor gNB 110-A and/or possibly compressed as described for stage 22.6 for FIG. 4A).

The RRC Release message at stage 8 may also include a Configured Grant (CG) Configuration to enable subsequent UL data transmission by UE 102 at stage 14*b*. The UL-PRS configuration at this stage may be an index to a pre-configured UL-PRS configuration (during stage 1), or a delta-UL-PRS configuration, etc. (e.g. as described for stage 22.6 in FIG. 4A).

At stage 9, the serving gNB 110-S activates the UL-PRS transmission in the UE 102. In some implementations, this stage may also be part of stage 8.

At stage 10, the serving gNB 110-S sends a NRPPa Positioning Activation Response message to the LMF 152 when activation in the UE 102 was successful.

At stage 11, the LMF 152 sends a NRPPa Measurement Request to a group of gNBs 110 including the UL-PRS measurement configuration.

At stage 12, the UE 102 transmits UL-PRS according to the activated configuration at stages 8 and/or 9.

At stage 13, illustrated by stages 13*a* and 13*b*, the UE 102 measures DL-PRS transmitted by one or more gNBs 110 (e.g. as configured in UE 102 by LMF 152 during stage 1), and each configured gNB 110 at stage 11 measures the UL-PRS transmitted by UE 102 at stage 12.

At stage 14, illustrated by stages 14*a* and 14*b*, if CG resources are not used, the UE 102 performs a physical random access channel (PRACH) procedure at stage 14*a*. The UE 102 then sends an RRC Resume Request message to the serving gNB 110-S at stage 14*b* which includes an SS Event Report message that includes an embedded LPP Provide Location Information message containing the DL-PRS measurements. The SS Event Report message may be transferred inside an SDT message or inside a small data request (SDR) message that may each be a NAS message.

If CG resources are used, the UE 102 may send the SS Event Report at stage 14*b* together with the embedded LPP Provide Location Information message as "Subsequent UL Data on CG Resources" and stage 14*a* is not performed.

At stage 15, the serving gNB 110-S sends the SS Event Report to the anchor gNB 110-A (e.g. inside the SDT or SDR message), which provides the SS Event Report (e.g. inside the SDT or SDR message) to the serving AMF 154, which then transfers the SS Event Report to the LMF 152.

At stage 16, the gNBs 110 that performed the UL-PRS measurements at stage 13*b* each provide an NRPPa Measurement Response message to the LMF 152 including the UL-PRS measurements performed at stage 13*b*.

At stage 17, the LMF 152 performs a position determination for UE 102 using the DL-PRS measurements obtained at stage 15 and the UL-PRS measurements obtained at stage 16.

At stage 18, illustrated by stages 18*a* and 18*b*, the LMF 152 may send a NRPPa Positioning Deactivation Request message to the anchor gNB 110-A, which forwards the message to the serving gNB 110-S. The serving gNB 110-S sends the UL-PRS Deactivation to the UE 102 at stage 18*b*.

At stage 19*a*, the LMF 152 sends a SS Event Report Acknowledgement to the anchor gNB 110-A, which forwards the message to the serving gNB 110-S. The serving gNB 110-S then provides the Supplementary Services (SS) Event Report Acknowledgement to the UE 102 at stage 19*b*. The Supplementary Services (SS) Event Report Acknowledgement may be transported in an RRC Release message at stage 19*b* (e.g., if stage 14*b* was a RRC Resume Request) or in any other appropriate message (for example, a new MAC-CE message).

At block 454, the UE 102 may remain in the RRC Inactive state, and the procedure in stages 2 to 19 may be repeated. Following stage 17 (and not shown in FIG. 4B), LMF 152 may send an event report containing the determined position for the UE 102 to external client 130 or AF 132 via GMLC 160 (in the case of external client 130) or via GMLC 160 and NEF 163 (in the case of AF 132), e.g., as described in 3GPP TS 23.273.

For DL-only positioning, stages 3-12, 13*b*, 16, and 18 in FIG. 4B are not performed; for UL-only positioning, stage 13*a* is not performed and an LPP Provide Location Information message containing DL-PRS measurements is not included at stage 14. In addition, a different UE capability may be needed at stage 1 to indicate UE support (e.g., a UE capability for UL-only positioning, DL-only positioning or for each of one more position methods).

Thus, as illustrated in FIG. 4B, UL-only, DL-only, and UL-DL positioning procedures for LCS Event Reporting in RRC_INACTIVE state may be supported. With RAT-independent positioning methods, such as A-GNSS, RTK, WLAN, sensors etc., the DL-only messages in FIG. 4B, may be used. For example, for RAT-independent positioning methods, FIG. 4B may be used, without performing stages 3-12, 13*b*, 16, and 18. Additionally, as described for FIG. 4A, the signaling flow 450 allows for the anchor gNB 110-A to remain the anchor gNB for the UE 102 after the event reporting has occurred at block 454 or for the serving gNB 110-S to become a new anchor gNB for UE 102 during the procedure.

Figure 4C:
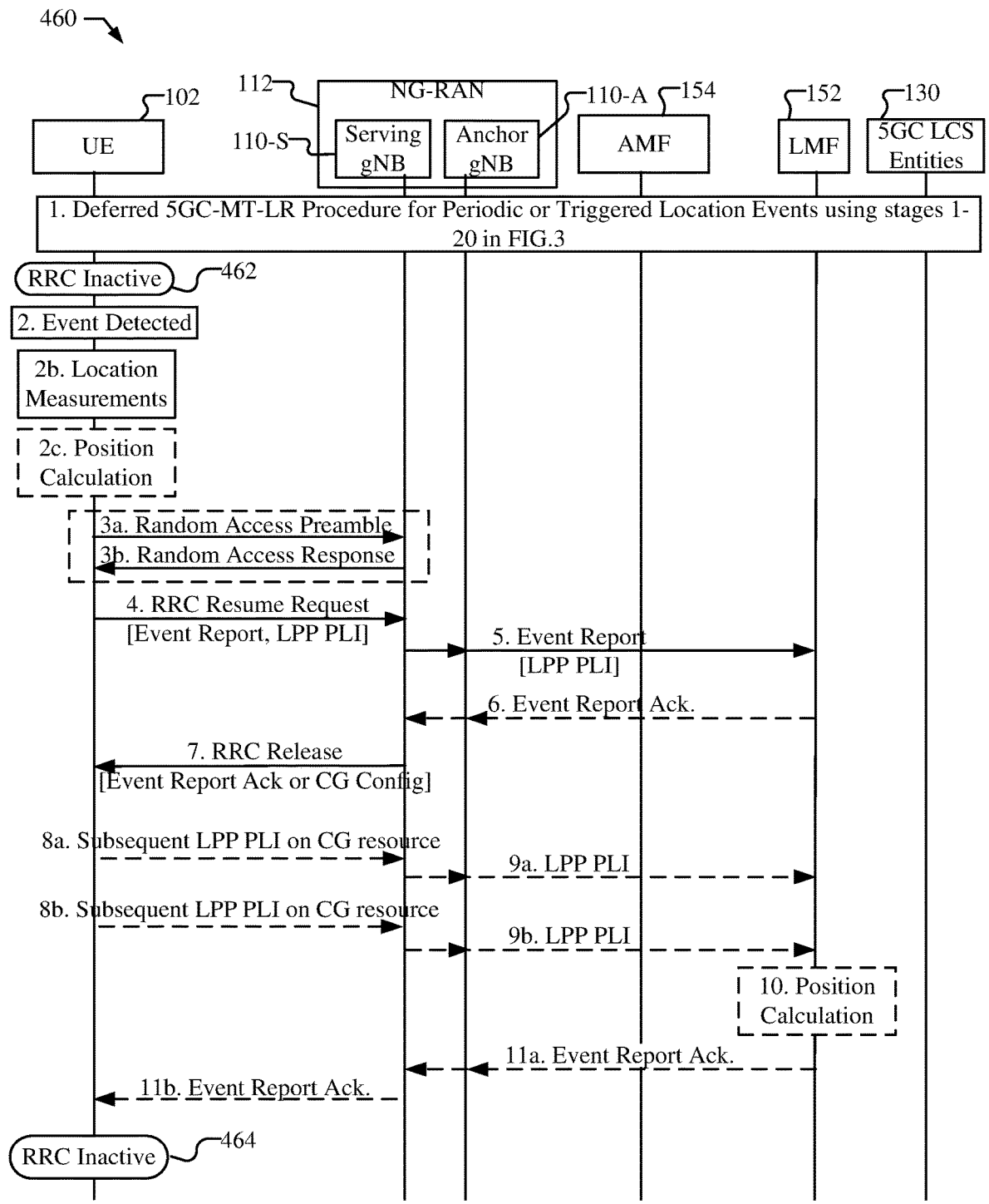
FIG. 4C shows a signaling flow that illustrates various messages sent between components of a communication system for event reporting for RAT-independent positioning methods while a UE is in an RRC Inactive state.

FIG. 4C shows a signaling flow 460, which summarizes relevant messages for a Low Power Periodic and Triggered 5GC-MT-LR Procedure for RAT-independent positioning methods such as A-GNSS, RTK, WLAN (also known as WiFi, Sensors). FIG. 4C illustrates the presence of a serving gNB 110-S and an anchor gNB 110-A in the NG-RAN 112, which may in some cases be the same gNB 110. The serving gNB 110-S interacts with the UE 102, while the anchor gNB 110-A maintains a connection with the AMF 154 on behalf of the UE 102. The anchor gNB 110-A represents a previous serving gNB for the UE 102, e.g., from before the UE 102 entered an RRC Inactive state. Processes leading to the serving gNB 110-S and the anchor gNB 110-A in FIG. 4C may be as described for FIGS. 4A and 4B.

FIG. 4C illustrates the use of LMF 152, which is in the 5GCN 150, as illustrated in FIG. 1. In some implementations, the location server may be located in the NG-RAN 112, e.g., sometimes referred to as a location server surrogate (LSS) or Location Management Component (LMC). For all stages in signaling flow 460, the gNB 110 to LMF 152 NRPPa messages are not needed with an LSS or LMC, which may be located, e.g., in the anchor gNB 110-A.

At stage 1 in FIG. 4C, stages 1-20 in FIG. 3 may be performed. The serving gNB 110 for signaling flow 300 then sends an RRC Release with a suspend indication to move the UE 102 to RRC_INACTIVE state, as indicated by block 462.

At stage 2 in FIG. 4C, the UE 102 monitors for occurrence of the trigger or periodic event requested during stage 1. The UE 102 determines which positioning method(s) will be used for the detected event from the request in stage 1 (e.g. based on position method(s) included in an LPP Request Location Information message carried in the LCS Periodic-Triggered Invoke Request during stage 1). The UE 102 may also determine whether event reporting is allowed in RRC_INACTIVE state based on an indication received during stage 1. When a periodic or triggered event is detected (or slightly before) the UE 102 performs location measurements for the determined positioning method(s) (as indicated by stage 2b) and possibly calculates its location (as indicated by stage 2c) when one or more of the determined positioning method(s) are UE based rather than UE assisted.

At stage 3, indicated by stages 3a and 3b, when event reporting is allowed in RRC_INACTIVE state and after an event is detected, the UE 102 performs a 4 step or 2-step RACH procedure. When event reporting is not allowed in RRC_INACTIVE state, the UE 102 may send an RRC Resume Request to enter RRC Connected state and may then report the event using the procedure in clause 6.3.1 of 3GPP TS 23.273.

At stage 4, the UE 102 sends a RRC Resume Request message including a Small Data Request message with an LCS Event Report including an LPP Provide Location Information (PLI) message. The RRC message sent in stage 4, as well as the embedded LPP PLI or the LCS Event Report, may include a moreMessagesOnTheWay flag. The RRC Resume Request also indicates whether the serving gNB 110-S should wait for a response from the serving AMF 154 before sending the RRC Release at stage 7 and may further indicate whether the UE 102 will send additional UL messages prior to a response from the serving AMF 154. The moreMessagesOnTheWay flag, for example, may be included when not all the location measurements obtained at stage 2b can be included in the LPP PLI message. The same indication, e.g., followed by stages corresponding to stages 8 and 9 below, may be included for DL and UL-DL NR positioning methods at stage 23.3 in FIG. 4A and stage 14b in FIG. 4B if similar circumstances arise.

At stage 5, the serving gNB 110-S sends the SS Event Report with the LPP PLI message (e.g. and including any moreMessagesOnTheWay flag) to the anchor gNB 110-A, which provides the SS Event Report to the LMF 152 (via the serving AMF 154).

At stage 6, if the moreMessagesOnTheWay flag was not provided at stage 5, the LMF 152 sends a SS Event Report Acknowledgement to the anchor gNB 110-A, which forwards the message to the serving gNB 110-S. If the moreMessagesOnTheWay flag was provided at stage 5, stage 6 is not performed and the SS Event Report Acknowledgement is sent instead at stage 11.

At stage 7, the serving gNB 110-S sends an RRC Release message to the UE 102. If stage 6 was performed, the RRC Release message includes the SS Event Report Acknowledgement. If stage 6 is not performed (which the serving gNB 110-S may determine from the indication received at stage 4) and if the moreMessagesOnTheWay flag is included at stage 4, the RRC Release message includes a CG Configuration for subsequent LPP Provide Location Information messages.

At stage 8, illustrated as stages 8a and 8b, if indicated by the moreMessagesOnTheWay flag at stage 4, the UE 102 sends additional LPP Provide Location Information (PLI) messages as "Subsequent UL Data on CG Resources" using the CG Configuration received at stage 7.

At stage 9, illustrated as stages 9a and 9b, the serving gNB 110-S sends the LPP PLI messages to the anchor gNB 110-A, which provides them to the LMF 152 (via the serving AMF 154).

At stage 10, e.g. if stage 2c was not performed, the LMF 152 calculates the UE 102 location based on the location measurements obtained by the UE 102 at stage 2b and received by the LMF 152 at stage 5 and possibly stage 9.

At stage 11, illustrated as stages 11a and 11b, if stages 8 and 9 were performed, the LMF 152 sends an SS Event Report Acknowledgement to the anchor gNB 110-A, which forwards the message to the serving gNB 110-S. The serving gNB 110-S then provides the SS Event Report Acknowledgement to the UE 102 at stage 11b. The SS Event Report Acknowledgement may be included in an RRC Release message sent to UE 102 at stage 11b (e.g., if the last LPP Provide Location Information at stage 8b was sent via an RRC Resume Request) or may be included in any other appropriate message (e.g., such as a new MAC-CE message).

At block 464, the UE 102 may remain in the RRC Inactive state, and the procedure for stages 2 to 11 may be repeated. Following stage 10 (and not shown in FIG. 4C), LMF 152 may send an event report containing the received or determined location for the UE 102 to external client 130 or AF 132 via GMLC 160 (in the case of external client 130) or via GMLC 160 and NEF 163 (in the case of AF 132), e.g. as described in 3GPP TS 23.273.

Figure 5:
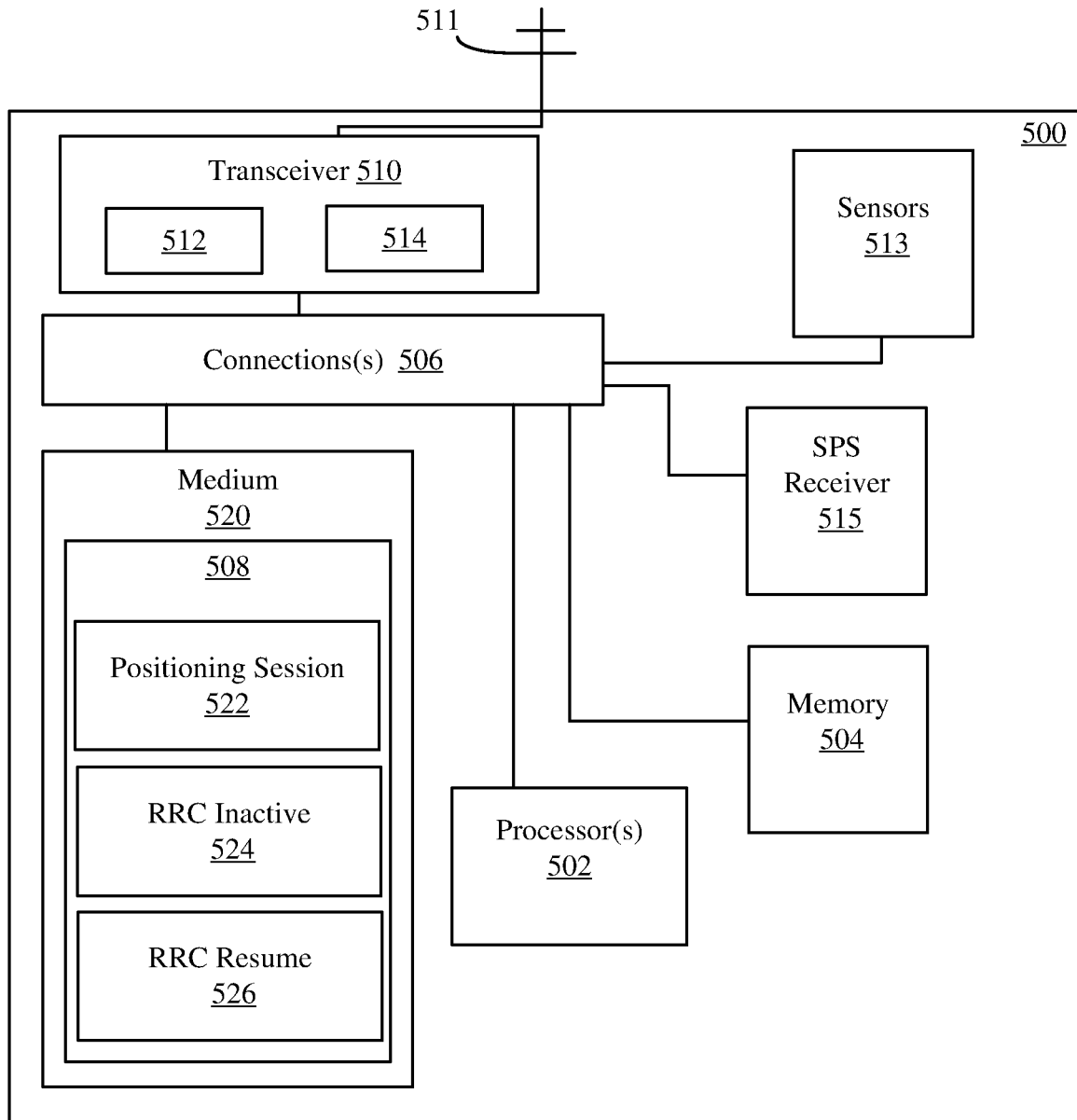
FIG. 5 shows a schematic block diagram illustrating certain exemplary features of a UE configured for event reporting for a deferred MT-LR while in an RRC Inactive state.

FIG. 5 shows a schematic block diagram illustrating certain exemplary features of a UE 500, e.g., which may be the UE 102 shown in FIG. 1, that is configured for supporting location of the UE 500 while in an RRC Inactive state, e.g., as discussed herein. The UE 500, for example, may perform the process flow shown in FIG. 8 and algorithms disclosed herein. The UE 500 may, for example, include one or more processors 502, memory 504, an external interface such as at least one wireless transceiver 510 (e.g., wireless network interface), SPS receiver 515, and one or more sensors 513, which may be operatively coupled with one or more connections 506 (e.g., buses, lines, fibers, links, etc.) to non-transitory computer readable medium 520 and memory 504. The SPS receiver 515, for example, may receive and process SPS signals from SVs 190 shown in FIG. 1. The one or more sensors 513, for example, may be an inertial measurement unit (IMU) that may include one or more accelerometers, one or more gyroscopes, a magnetometer, etc. The UE 500 may further include additional items, which are not shown, such as a user interface that may include e.g., a display, a keypad or other input device, such as virtual keypad on the display, through which a user may interface with the UE. In certain example implementations, all or part of UE 500 may take the form of a chipset, and/or the like.

The at least one wireless transceiver 510 may be a transceiver for both a WWAN communication system and a WLAN communication system, or may include separate transceivers for WWAN and WLAN. The wireless transceiver 510 may include a transmitter 512 and receiver 514 coupled to one or more antennas 511 for transmitting (e.g., on one or more uplink channels and/or one or more sidelink channels) and/or receiving (e.g., on one or more downlink channels and/or one or more sidelink channels) wireless signals and transducing signals from the wireless signals to wired (e.g., electrical and/or optical) signals and from wired (e.g., electrical and/or optical) signals to the wireless signals. Thus, the transmitter 512 may include multiple transmitters that may be discrete components or combined/integrated components, and/or the receiver 514 may include multiple receivers that may be discrete components or combined/integrated components. The wireless transceiver 510 may be configured to communicate signals (e.g., with base stations and access points and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. New Radio may use mm-wave frequencies and/or sub-6 GHz frequencies. The wireless transceiver 510 may be communicatively coupled to a transceiver interface, e.g., by optical and/or electrical connection, which may be at least partially integrated with the wireless transceiver 510.

In some embodiments, UE 500 may include antenna 511, which may be internal or external. UE antenna 511 may be used to transmit and/or receive signals processed by wireless transceiver 510. In some embodiments, UE antenna 511 may be coupled to wireless transceiver 510. In some embodiments, measurements of signals received (transmitted) by UE 500 may be performed at the point of connection of the UE antenna 511 and wireless transceiver 510. For example, the measurement point of reference for received (transmitted) RF signal measurements may be an input (output) terminal of the receiver 514 (transmitter 512) and an output (input) terminal of the UE antenna 511. In a UE 500 with multiple UE antennas 511 or antenna arrays, the antenna connector may be viewed as a virtual point representing the aggregate output (input) of multiple UE antennas. In some embodiments, UE 500 may measure received signals including signal strength and TOA measurements and the raw measurements may be processed by the one or more processors 502.

The one or more processors 502 may be implemented using a combination of hardware, firmware, and software. For example, the one or more processors 502 may be configured to perform the functions discussed herein by implementing one or more instructions or program code 508 on a non-transitory computer readable medium, such as medium 520 and/or memory 504. In some embodiments, the one or more processors 502 may represent one or more circuits configurable to perform at least a portion of a data signal computing procedure or process related to the operation of UE 500.

The medium 520 and/or memory 504 may store instructions or program code 508 that contain executable code or software instructions that when executed by the one or more processors 502 cause the one or more processors 502 to operate as a special purpose computer programmed to perform the techniques disclosed herein. As illustrated in UE 500, the medium 520 and/or memory 504 may include one or more components or modules that may be implemented by the one or more processors 502 to perform the methodologies described herein. While the components or modules are illustrated as software in medium 520 that is executable by the one or more processors 502, it should be understood that the components or modules may be stored in memory 504 or may be dedicated hardware either in the one or more processors 502 or off the processors.

A number of software modules and data tables may reside in the medium 520 and/or memory 504 and be utilized by the one or more processors 502 in order to manage both communications and the functionality described herein. It should be appreciated that the organization of the contents of the medium 520 and/or memory 504 as shown in UE 500 is merely exemplary, and as such the functionality of the modules and/or data structures may be combined, separated, and/or be structured in different ways depending upon the implementation of the UE 500.

The medium 520 and/or memory 504 may include positioning session module 522 that when implemented by the one or more processors 502 configures the one or more processors 502 to engage in a positioning session with a location server through a serving base station, via the wireless transceiver 510, including receiving location service requests, including periodic or triggered location, receiving a request for positioning capabilities, and a request of location information, such as positioning measurements, e.g., for a UE-assisted positioning process, or a position estimate, e.g., for a UE based positioning process. The one or more processors 502 are configured to send a response to the location service requests, e.g. by providing positioning capabilities and the requested location information. The one or more processors 502 may be configured to monitor for events, e.g., periodic or triggered events. The one or more processors 502 may be configured to generate and send an event report, e.g., which in some implementations may be included in an RRC Resume request. The one or more processors 502 may be further configured to receive assistance data and other information, e.g., for receiving and measuring DL PRS and for transmitting UL SRS. For example, the one or more processors 502 may be configured to receive one or more UL SRS configurations, which may be provided in an RRC message, such as an RRC Release message, such as described in stage 22.6 of FIG. 4A, stage 8 of FIG. 4B and stage 7 of FIG. 4C. The UL SRS configuration may be compressed if provided in an RRC Release message, e.g., as a difference to or as a pointer to an SRS configuration stored in the UE (e.g., in memory medium 520 and/or memory 504) and the one or more processors 502 may be configured to determining the UL SRS configuration based on compression, and may store the UL SRS configuration (e.g., in memory medium 520 and/or memory 504) and disclosure previous SRS configurations. The one or more processors 502 may be configured to receive activation of UL SRS, e.g., in an RRC message, such as the RRC Release message, such as described in stage 22.6 of FIG. 4A, stage 8 of FIG. 4B and stage 7 of FIG. 4C, or at the MAC-CE level or DCI. The one or more processors 502 may be configured to perform the positioning related procedures, such as transmitting UL SRS, and/or receiving and measuring DL PRS, for positioning measurements such as, e.g., Rx-Tx, AOA, AOD, TOA, RSRP, etc. The one or more processors 502 may be configured to generate and send position location information, e.g., including the DL PRS measurements and/or a position estimate if generated, to an LMF, e.g., which in some implementations may be included in an RRC Resume request.

The medium 520 and/or memory 504 may include an RRC Inactive module 524 that when implemented by the one or more processors 502 configures the one or more processors 502 to send and receive messages with a gNB to enter an RRC Inactive state.

The medium 520 and/or memory 504 may include an RRC Resume module 526 that when implemented by the one or more processors 502 configures the one or more processors 502 send and receive messages related to RRC Resume Requests to and from a gNB. For example, the one or more processors 502 may be configured to send an RRC Resume Request message to a serving gNB, and may be configured to include positioning related messages for an LMF in the RRC Resume Request messages, such as an indication of an event, e.g., event report messages for periodic or triggered events, and/or position location information, e.g., including DL PRS measurements and/or a position estimate if generated. The one or more processors 502 may be configured to receive an RRC Release message from a serving gNB, and may be configured to receive in the RRC Release message an UL SRS configuration, which may be compressed, and in some implementations, the RRC Release message may further include a PUR configuration. The one or more processors 502 may be configured to receive an RRC Release message from a serving gNB, and may be configured to receive in the RRC Release message an event report acknowledgement from the serving gNB, which was sent to the gNB by the LMF.

The methodologies described herein may be implemented by various means depending upon the application. For example, these methodologies may be implemented in hardware, firmware, software, or any combination thereof. For a hardware implementation, the one or more processors 502 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 520 or memory 504 that is connected to and executed by the one or more processors 502. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 508 on a non-transitory computer readable medium, such as medium 520 and/or memory 504. Examples include computer readable media encoded with a data structure and computer readable media encoded with a computer program code 508. For example, the non-transitory computer readable medium including program code 508 stored thereon may include program code 508 to support location of the UE in a RRC Inactive state in a manner consistent with disclosed embodiments. Non-transitory computer readable medium 520 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 508 in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media.

In addition to storage on computer readable medium 520, instructions and/or data may be provided as signals on transmission media included in a communication apparatus. For example, a communication apparatus may include a wireless transceiver 510 having signals indicative of instructions and data. The instructions and data are configured to cause one or more processors to implement the functions outlined in the claims. That is, the communication apparatus includes transmission media with signals indicative of information to perform disclosed functions.

Memory 504 may represent any data storage mechanism. Memory 504 may include, for example, a primary memory and/or a secondary memory. Primary memory may include, for example, a random access memory, read only memory, etc. While illustrated in this example as being separate from one or more processors 502, it should be understood that all or part of a primary memory may be provided within or otherwise co-located/coupled with the one or more processors 502. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 520. As such, in certain example implementations, the methods and/or apparatuses presented herein may take the form in whole or part of a computer readable medium 520 that may include computer implementable program code 508 stored thereon, which if executed by one or more processors 502 may be operatively enabled to perform all or portions of the example operations as described herein. Computer readable medium 520 may be a part of memory 504.

Figure 6:
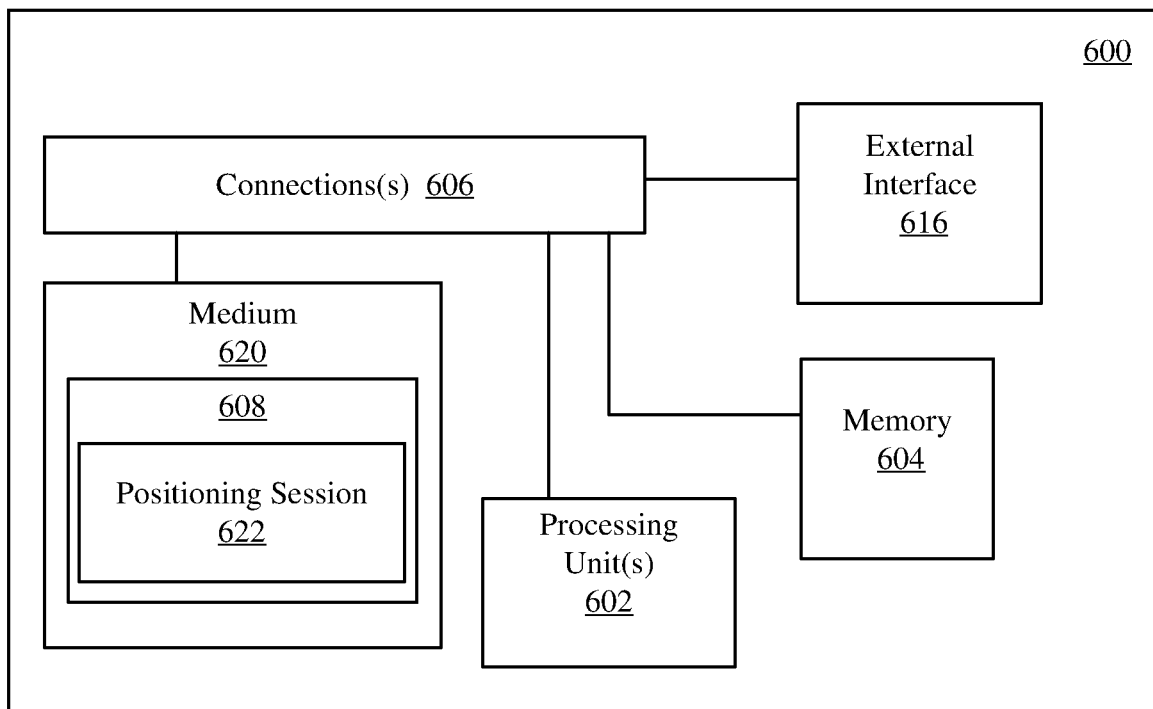
FIG. 6 shows a schematic block diagram illustrating certain exemplary features of a location server that is configured for UE event reporting for a deferred MT-LR while in an RRC Inactive state.

FIG. 6 shows a schematic block diagram illustrating certain exemplary features of a location server 600, e.g., the LMF 152, shown in FIG. 1 or an LMC or LSS located in NG-RAN 112, that is configured to support positioning of a UE (e.g. a UE 102) in an RRC Inactive state, as discussed herein. The location server 600 may perform the process flow, e.g., shown in FIG. 10 and algorithms disclosed herein. Location server 600 may, for example, include one or more processors 602, memory 604, an external interface 616 (e.g., wireline or wireless network interface to base stations and/or entities in the core network), which may be operatively coupled with one or more connections 606 (e.g., buses, lines, fibers, links, etc.) to non-transitory computer readable medium 620 and memory 604. In certain example implementations, all or part of location server 600 may take the form of a chipset, and/or the like.

The one or more processors 602 may be implemented using a combination of hardware, firmware, and software. For example, the one or more processors 602 may be configured to perform the functions discussed herein by implementing one or more instructions or program code 608 on a non-transitory computer readable medium, such as medium 620 and/or memory 604. In some embodiments, the one or more processors 602 may represent one or more circuits configurable to perform at least a portion of a data signal computing procedure or process related to the operation of location server 600.

The medium 620 and/or memory 604 may store instructions or program code 608 that contain executable code or software instructions that when executed by the one or more processors 602 cause the one or more processors 602 to operate as a special purpose computer programmed to perform the techniques disclosed herein. As illustrated in location server 600, the medium 620 and/or memory 604 may include one or more components or modules that may be implemented by the one or more processors 602 to perform the methodologies described herein. While the components or modules are illustrated as software in medium 620 that is executable by the one or more processors 602, it should be understood that the components or modules may be stored in memory 604 or may be dedicated hardware either in the one or more processors 602 or off the processors.

A number of software modules and data tables may reside in the medium 620 and/or memory 604 and be utilized by the one or more processors 602 in order to manage both communications and the functionality described herein. It should be appreciated that the organization of the contents of the medium 620 and/or memory 604 as shown in location server 600 is merely exemplary, and as such the functionality of the modules and/or data structures may be combined, separated, and/or be structured in different ways depending upon the implementation of the location server 600.

The medium 620 and/or memory 604 may include a positioning session module 622 that when implemented by the one or more processors 602 configures the one or more processors 602 to engage in a positioning session with a UE through a serving base station via the external interface 616, e.g., as discussed herein, including sending location service requests, such as a request for positioning capabilities, and a request of location information, such as positioning measurements, e.g., for a UE-assisted positioning process, or a position estimate, e.g., for a UE based positioning process. The one or more processors 602 are configured to receive responses to the location service requests, e.g. including receiving positioning capabilities and the requested location information from a UE. The one or more processors 402 may be configured to send and receive messages for a periodic location session. The one or more processors 602 maybe further configured to send assistance data. The one or more processors 602 may be further configured to determine a position estimate for the UE based on received positioning measurements, which as Rx-Tx, AOA, TOA, RSRP, etc., or other types of measurements, such as using WiFi or SPS measurements.

The methodologies described herein may be implemented by various means depending upon the application. For example, these methodologies may be implemented in hardware, firmware, software, or any combination thereof. For a hardware implementation, the one or more processors 602 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 620 or memory 604 that is connected to and executed by the one or more processors 602. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 608 on a non-transitory computer readable medium, such as medium 620 and/or memory 604. Examples include computer readable media encoded with a data structure and computer readable media encoded with a computer program code 608. For example, the non-transitory computer readable medium including program code 608 stored thereon may include program code 608 to support suspension of an RRC connection between the UE and a base station during a positioning session in a manner consistent with disclosed embodiments. Non-transitory computer readable medium 620 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 608 in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media.

In addition to storage on computer readable medium 620, instructions and/or data may be provided as signals on transmission media included in a communication apparatus. For example, a communication apparatus may include an external interface 616 having signals indicative of instructions and data. The instructions and data are configured to cause one or more processors to implement the functions outlined in the claims. That is, the communication apparatus includes transmission media with signals indicative of information to perform disclosed functions.

Memory 604 may represent any data storage mechanism. Memory 604 may include, for example, a primary memory and/or a secondary memory. Primary memory may include, for example, a random access memory, read only memory, etc. While illustrated in this example as being separate from one or more processors 602, it should be understood that all or part of a primary memory may be provided within or otherwise co-located/coupled with the one or more processors 602. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 620. As such, in certain example implementations, the methods and/or apparatuses presented herein may take the form in whole or part of a computer readable medium 620 that may include computer implementable program code 608 stored thereon, which if executed by one or more processors 602 may be operatively enabled to perform all or portions of the example operations as described herein. Computer readable medium 620 may be a part of memory 604.

Figure 7:
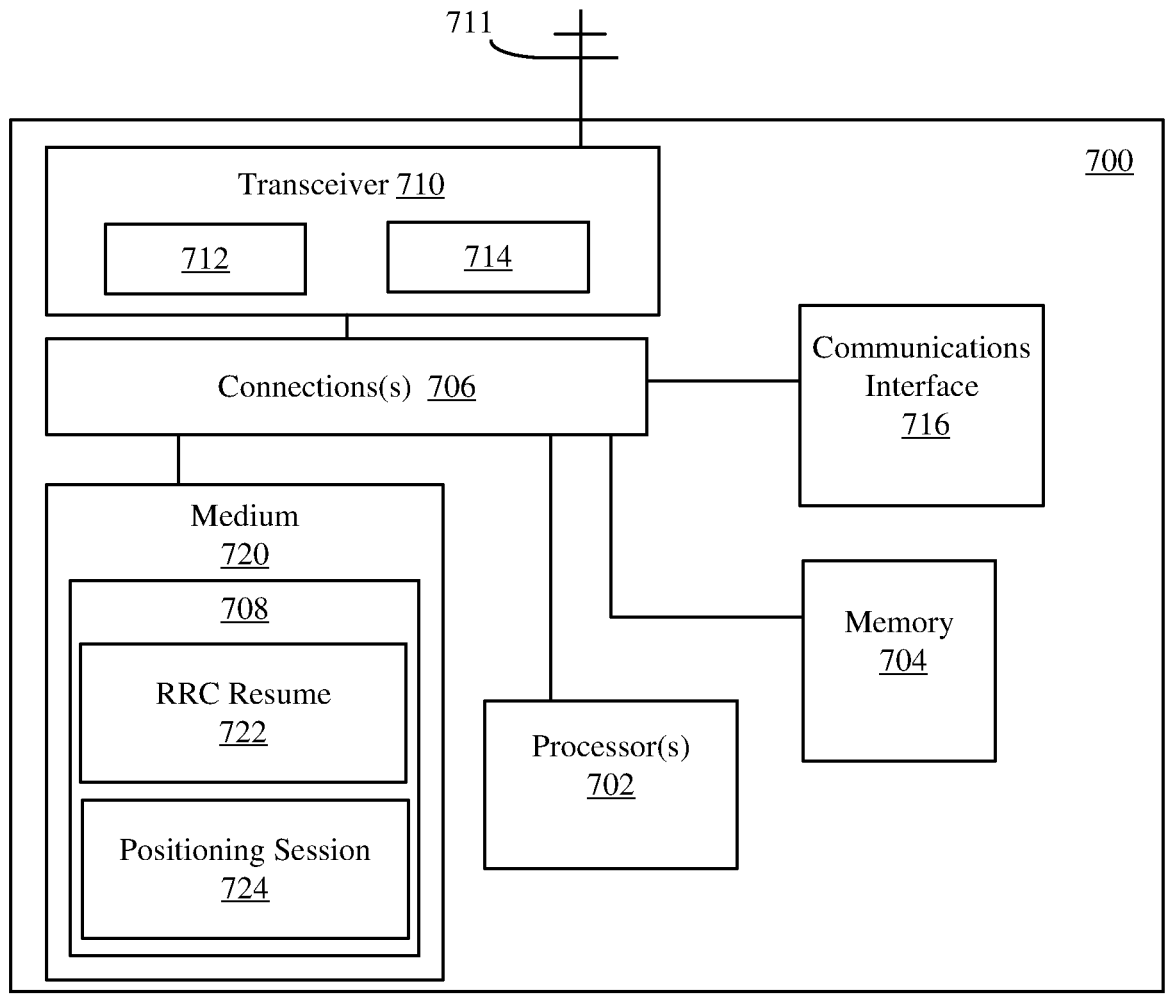
FIG. 7 shows a schematic block diagram illustrating certain exemplary features of a base station that is configured for UE event reporting for a deferred MT-LR while in an RRC Inactive state.

FIG. 7 shows a schematic block diagram illustrating certain exemplary features of a base station 700, e.g., a gNB 110 in FIG. 1, enabled to support location of a UE (e.g. a UE 102) in an RRC Inactive state, as discussed herein. The base station 700 may be an eNB, a gNB 110 or an ng-eNB 114. The base station 700 may perform the process flow, e.g., shown in FIG. 9 and algorithms disclosed herein. Base station 700 may, for example, include one or more processors 702, memory 704, an external interface, which may include a transceiver 710 (e.g., wireless network interface) and a communications interface 716 (e.g., wireline or wireless network interface to other base stations and/or entities in the core network such as a location server directly or via one or more intervening entities), which may be operatively coupled with one or more connections 706 (e.g., buses, lines, fibers, links, etc.) to non-transitory computer readable medium 720 and memory 704. The base station 700 may further include additional items, which are not shown, such as a user interface that may include e.g., a display, a keypad or other input device, such as virtual keypad on the display, through which a user may interface with the base station. In certain example implementations, all or part of base station 700 may take the form of a chipset, and/or the like. Transceiver 710 may, for example, include a transmitter 712 enabled to transmit one or more signals over one or more types of wireless communication networks and a receiver 714 to receive one or more signals transmitted over the one or more types of wireless communication networks. The communications interface 716 may be a wired or wireless transceiver capable of connecting to other base stations in the RAN or network entities, such as a location server, e.g., LMF 152 or SLP 162 through various entities such as AMF 154 or UPF 158, shown in FIG. 1.

In some embodiments, base station 700 may include antenna 711, which may be internal or external. Antenna 711 may be used to transmit and/or receive signals processed by transceiver 710. In some embodiments, antenna 711 may be coupled to transceiver 710. In some embodiments, measurements of signals received (transmitted) by base station 700 may be performed at the point of connection of the antenna 711 and transceiver 710. For example, the measurement point of reference for received (transmitted) RF signal measurements may be an input (output) terminal of the receiver 714 (transmitter 712) and an output (input) terminal of the antenna 711. In a base station 700 with multiple antennas 711 or antenna arrays, the antenna connector may be viewed as a virtual point representing the aggregate output (input) of multiple antennas. In some embodiments, base station 700 may measure received signals including signal strength and TOA measurements and the raw measurements may be processed by the one or more processors 702.

The one or more processors 702 may be implemented using a combination of hardware, firmware, and software. For example, the one or more processors 702 may be configured to perform the functions discussed herein by implementing one or more instructions or program code 708 on a non-transitory computer readable medium, such as medium 720 and/or memory 704. In some embodiments, the one or more processors 702 may represent one or more circuits configurable to perform at least a portion of a data signal computing procedure or process related to the operation of base station 700.

The medium 720 and/or memory 704 may store instructions or program code 708 that contain executable code or software instructions that when executed by the one or more processors 702 cause the one or more processors 702 to operate as a special purpose computer programmed to perform the techniques disclosed herein. As illustrated in base station 700, the medium 720 and/or memory 704 may include one or more components or modules that may be implemented by the one or more processors 702 to perform the methodologies described herein. While the components or modules are illustrated as software in medium 720 that is executable by the one or more processors 702, it should be understood that the components or modules may be stored in memory 704 or may be dedicated hardware either in the one or more processors 702 or off the processors. A number of software modules and data tables may reside in the medium 720 and/or memory 704 and be utilized by the one or more processors 702 in order to manage both communications and the functionality described herein. It should be appreciated that the organization of the contents of the medium 720 and/or memory 704 as shown in base station 700 is merely exemplary, and as such the functionality of the modules and/or data structures may be combined, separated, and/or be structured in different ways depending upon the implementation of the base station 700.

The medium 720 and/or memory 704 may include a RRC Resume module 722 that when implemented by the one or more processors 702 configures the one or more processors 702 to send and receive messages related to RRC Resume Requests from and to the UE. The one or more processors 702 may be configured to receive an RRC Resume Request message from the UE while the UE is in an RRC Inactive state, via the transceiver 710. The RRC Resume Request message may include an indication of an event, e.g., a periodic or triggered event, detected by the UE. The RRC Resume Request message may include an event report and may include position location information, such as DL PRS measurements and/or a position estimate from the UE. The one or more processors 702 may be configured to send an RRC Release message from the UE, wherein the UE remains in the RRC Inactive state, via the transceiver 710. The RRC Release message, for example, may include an event report acknowledgement from an LMF as part of positioning of the UE. The RRC Release message, for example, may include an UL SRS configuration, which in some implementations, may be compressed. The RRC Release message may include a CG configuration for the UE to send remaining location measurements to the gNB in subsequent messages, e.g., when not all the location measurements are included in the event report message.

The medium 720 and/or memory 704 may include a positioning session module 724 that when implemented by the one or more processors 702 configures the one or more processors 702 to engage in a positioning session with a UE and a location server (e.g., LMF), via the external interface (transceiver 710 and communications interface 716). For example, the one or more processors 702 may be configured to receive an indication of an event detected by the UE, e.g., in a received RRC Resume message, and to send an indication of the event to an LMF, via the external interface. The indication of the event sent to the LMF may include a selected UL SRS configuration for the UE. The one or more processors 702, for example, may be configured to obtain UE context from an anchor gNB, via the external interface, in order to send the indication of the event to the LMF. The indication of the event may be an event report message. Moreover, the one or more processors 702 may be configured to provide position location information received from the UE in a RRC Resume message to the LMF. The one or more processors 702 may be configured to receive one or more UL SRS configurations from the LMF as part of positioning of the UE, via the external interface. The one or more processor 702 may be configured to determine a second UL SRS configuration based on a received UL SRS configuration, wherein the second UL SRS configuration may be provided to the UE, e.g., in a RRC Release message or just before or after the RRC Release message. The one or more processor 702 may be configured to compress the second UL SRS configuration, e.g., as a difference to a third SRS configuration stored in the UE or as a pointer to a third UL SRS configuration stored in the UE.

The methodologies described herein may be implemented by various means depending upon the application. For example, these methodologies may be implemented in hardware, firmware, software, or any combination thereof. For a hardware implementation, the one or more processors 702 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 720 or memory 704 that is connected to and executed by the one or more processors 702. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 708 on a non-transitory computer readable medium, such as medium 720 and/or memory 704. Examples include computer readable media encoded with a data structure and computer readable media encoded with a computer program code 708. For example, the non-transitory computer readable medium including program code 708 stored thereon may include program code 708 to support suspension of an RRC connection between the UE and a base station during a positioning session in a manner consistent with disclosed embodiments. Non-transitory computer readable medium 720 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 708 in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media.

In addition to storage on computer readable medium 720, instructions and/or data may be provided as signals on transmission media included in a communication apparatus. For example, a communication apparatus may include a transceiver 710 having signals indicative of instructions and data. The instructions and data are configured to cause one or more processors to implement the functions outlined in the claims. That is, the communication apparatus includes transmission media with signals indicative of information to perform disclosed functions.

Memory 704 may represent any data storage mechanism. Memory 704 may include, for example, a primary memory and/or a secondary memory. Primary memory may include, for example, a random access memory, read only memory, etc. While illustrated in this example as being separate from one or more processors 702, it should be understood that all or part of a primary memory may be provided within or otherwise co-located/coupled with the one or more processors 702. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 720. As such, in certain example implementations, the methods and/or apparatuses presented herein may take the form in whole or part of a computer readable medium 720 that may include computer implementable program code 708 stored thereon, which if executed by one or more processors 702 may be operatively enabled to perform all or portions of the example operations as described herein. Computer readable medium 720 may be a part of memory 704.

Figure 8:
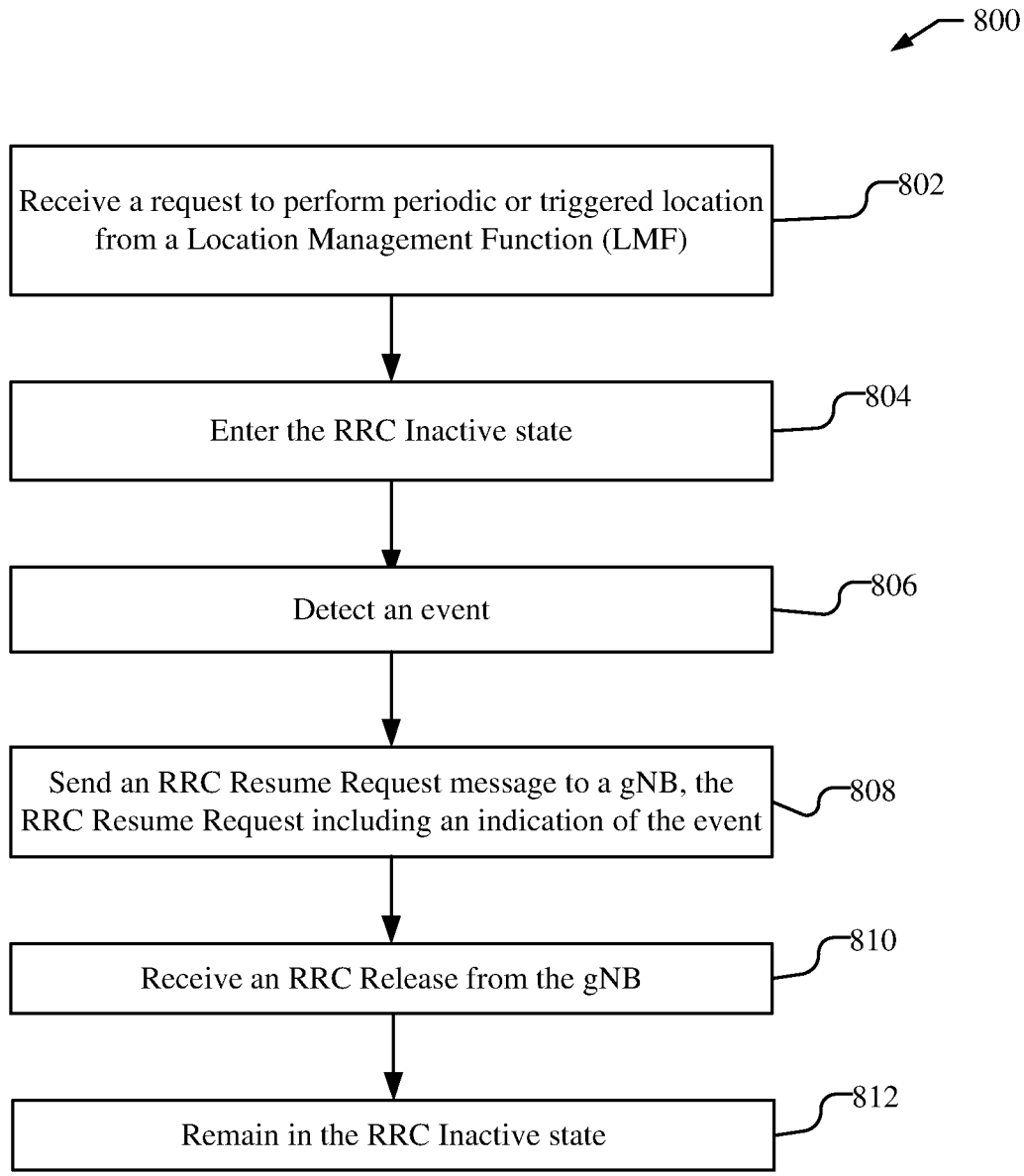
FIG. 8 shows a flowchart for an exemplary method for supporting location services for a UE performed by the UE.

FIG. 8 shows a flowchart for an exemplary method 800 for supporting location of a User Equipment (UE) in a Radio Resource Control (RRC) Inactive state, performed by the UE, such as the UE 102 shown in FIG. 1, in a manner consistent with disclosed implementations.

At block 802, the UE receives a request to perform periodic or triggered location from a Location Management Function (e.g. an LMF 152), e.g., as discussed at stage 16 of FIG. 3. A means for receiving a request to perform periodic or triggered location from a Location Management Function (LMF) may include, e.g., the wireless transceiver 510 and one or more processors 502 with dedicated hardware or implementing executable code or software instructions in memory 504 and/or medium 520 in UE 500, such as the positioning session module 522, shown in FIG. 5.

At block 804, the UE enters the RRC Inactive state, e.g., as discussed at block 402 of FIG. 4A, block 452 of FIG. 4B, and block 462 of FIG. 4C. A means for entering the RRC Inactive state may include, e.g., the wireless transceiver 510 and one or more processors 502 with dedicated hardware or implementing executable code or software instructions in memory 504 and/or medium 520 in UE 500, such as the RRC Inactive module 524, shown in FIG. 5.

At block 806, the UE detects an event, e.g., as discussed at stage 21 of FIG. 4A, stage 2 of FIG. 4B, and stage 2 of FIG. 4C. A means for detecting an event may include, e.g., the wireless transceiver 510 and one or more processors 502 with dedicated hardware or implementing executable code or software instructions in memory 504 and/or medium 520 in UE 500, such as the positioning session module 522, shown in FIG. 5.

At block 808, the UE sends an RRC Resume Request message to a gNB (e.g. a gNB 110), the RRC Resume Request including an indication of the event, e.g., as discussed at stages 22.3 and 23.3 of FIG. 4A, stages 4 and 14*b* of FIG. 4B, and stage 4 of FIG. 4C. A means for sending an RRC Resume Request message to a gNB, the RRC Resume Request including an indication of the event may include, e.g., the wireless transceiver 510 and one or more processors 502 with dedicated hardware or implementing executable code or software instructions in memory 504 and/or medium 520 in UE 500, such as the positioning session module 522 and RRC Resume module 526, shown in FIG. 5.

At block 810, the UE receives an RRC Release from the gNB, e.g., as discussed at stages 22.6 and 23.10 of FIG. 4A, stages 8 and 19b of FIG. 4B, and stages 7 and 11b of FIG. 4C. A means for receiving an RRC Release from the gNB may include, e.g., the wireless transceiver 510 and one or more processors 502 with dedicated hardware or implementing executable code or software instructions in memory 504 and/or medium 520 in UE 500, such as the RRC Resume module 526, shown in FIG. 5.

At block 812, the UE remains in the RRC Inactive state, e.g., as discussed at block 404 of FIG. 4A, block 454 of FIG. 4B, and block 464 of FIG. 4C. A means for remaining in the RRC Inactive state may include, e.g., the wireless transceiver 510 and one or more processors 502 with dedicated hardware or implementing executable code or software instructions in memory 504 and/or medium 520 in UE 500, such as the RRC Inactive module 524, shown in FIG. 5.

In some implementations, the indication of the event may comprise an event report message, wherein the event report message is forwarded from the gNB to the LMF, e.g., as discussed at stages 23.3 and 23.4 of FIG. 4A, stages 14b and 15 of FIG. 4B, and stages 4 and 5 of FIG. 4C. The UE may further receive an event report acknowledgement from the gNB, the event report acknowledgement included in the RRC Release, the event report acknowledgement sent to the gNB by the LMF, e.g., as discussed at stages 23.9 and 23.10 of FIG. 4A, stages 19a and 19b of FIG. 4B, and stages 6, 7, 11a and 11b of FIG. 4C. A means for receiving an event report acknowledgement from the gNB, the event report acknowledgement included in the RRC Release, the event report acknowledgement sent to the gNB by the LMF may include, e.g., the wireless transceiver 510 and one or more processors 502 with dedicated hardware or implementing executable code or software instructions in memory 504 and/or medium 520 in UE 500, such as the positioning session module 522 and the RRC resume module 526, shown in FIG. 5.

In a further implementation, the UE may further obtain downlink (DL) measurements of DL signals, which may be DL positioning reference signals (PRS) transmitted by a plurality of gNBs, or DL signals transmitted WiFi APs or GNSS SVs 190, e.g., as discussed at stage 23.1.b of FIG. 4A, stage 13a of FIG. 4B and stage 2b of FIG. 4C. A means for obtaining downlink (DL) measurements of DL signals may include, e.g., the wireless transceiver 510 and one or more processors 502 with dedicated hardware or implementing executable code or software instructions in memory 504 and/or medium 520 in UE 500, such as the positioning session module 522, shown in FIG. 5. The UE may include the DL measurements in the event report message, e.g., as discussed at stage 23.3 of FIG. 4A, stage 14b of FIG. 4B, and stage 4 of FIG. 4C. A means for including the DL measurements in the event report message may include, e.g., the wireless transceiver 510 and one or more processors 502 with dedicated hardware or implementing executable code or software instructions in memory 504 and/or medium 520 in UE 500, such as the positioning session module 522 and RRC Resume module 526, shown in FIG. 5.

In some implementations, the UE may receive a first uplink (UL) sounding reference signal (SRS) configuration from the gNB, the first UL SRS configuration either received in the RRC Release or received just before or just after receiving the RRC Release, e.g., as discussed at stage 22.6 of FIG. 4A and stage 8 of FIG. 4B. A means for receiving a first uplink (UL) sounding reference signal (SRS) configuration from the gNB, the first UL SRS configuration either received in the RRC Release or received just before or just after receiving the RRC Release may include, e.g., the wireless transceiver 510 and one or more processors 502 with dedicated hardware or implementing executable code or software instructions in memory 504 and/or medium 520 in UE 500, such as the positioning session module 522 and RRC Resume module 526, shown in FIG. 5. The UE may further transmit UL SRS signals based on the first UL SRS configuration, wherein UL measurements are obtained by a plurality of gNBs based on the transmitted UL SRS signals and sent to the LMF, wherein a location of the UE is determined based at least in part on the UL measurements, e.g., as discussed at stages 23.1a, 23.1c, 23.5, and 23.6 of FIG. 4A, and at stages 12, 13b, 16, 17 of FIG. 4B. A means for transmitting UL SRS signals based on the first UL SRS configuration, wherein UL measurements are obtained by a plurality of gNBs based on the transmitted UL SRS signals and sent to the LMF, wherein a location of the UE is determined based at least in part on the UL measurements may include, e.g., the wireless transceiver 510 and one or more processors 502 with dedicated hardware or implementing executable code or software instructions in memory 504 and/or medium 520 in UE 500, such as the positioning session module 522 and RRC Resume module 526, shown in FIG. 5.

In a further implementation, the first UL SRS configuration may be compressed, wherein the first UL SRS configuration may comprise either differences to a second SRS configuration stored in the UE or a pointer to a second UL SRS configuration stored in the UE, e.g., as discussed in stage 22.6 of FIG. 4A and stage 8 of FIG. 4B. The UE may further determine a third UL SRS configuration based on the first UL SRS configuration and the second UL SRS configuration, e.g., as discussed at stage 23.1a of FIG. 4A. A means for determining a third UL SRS configuration based on the first UL SRS configuration and the second UL SRS configuration may include, e.g., the one or more processors 502 with dedicated hardware or implementing executable code or software instructions in memory 504 and/or medium 520 in UE 500, such as the positioning session module 522, shown in FIG. 5. The UE may further transmit the UL SRS based on the third UL SRS configuration, e.g., as discussed at stage 23.1a of FIG. 4A. A means for transmitting the UL SRS based on the third UL SRS configuration may include, e.g., the wireless transceiver 510 and one or more processors 502 with dedicated hardware or implementing executable code or software instructions in memory 504 and/or medium 520 in UE 500, such as the positioning session module 522, shown in FIG. 5. In some implementations, the UE may store the third UL SRS configuration and discard the second UL SRS configuration, e.g., as discussed at stages 22.6 and 23.1a of FIG. 4A. For example, the UE may receive the second UL SRS configuration from the gNB or from the LMF in the request to perform periodic or triggered location, e.g., as discussed at stage 16 of FIG. 3.

In some implementations, the UE may provide positioning capabilities to a serving gNB or the LMF or both, the positioning capabilities indicating support for at least one of uplink positioning, downlink positioning, uplink and downlink positioning, or a combination thereof while in the RRC Inactive state, e.g., as discussed at stage 13 of FIG. 3 and stage 1 of FIG. 4B. A means for providing positioning capabilities to a serving gNB or the LMF or both, the positioning capabilities indicating support for at least one of uplink positioning, downlink positioning, uplink and downlink positioning, or a combination thereof while in the RRC Inactive state may include, e.g., the wireless transceiver 510 and one or more processors 502 with dedicated hardware or implementing executable code or software instructions in memory 504 and/or medium 520 in UE 500, such as the positioning session module 522, shown in FIG. 5.

In some implementations, the UE may perform location measurements that are Radio Access Technology (RAT)-independent while in the RRC Inactive state, e.g., as at stage 2b in FIG. 4C. A means for performing location measurements that are Radio Access Technology (RAT)-independent while in an RRC Inactive state may include, e.g., the wireless transceiver 510 and one or more processors 502 with dedicated hardware or implementing executable code or software instructions in memory 504 and/or medium 520 in UE 500, such as the positioning session module 522, shown in FIG. 5.

In one implementation, the indication of the event comprises an event report message that includes location measurements performed by the UE, wherein the RRC Resume Request includes an indication of whether all the location measurements are included in the event report message, e.g., as discussed at stage 4 of FIG. 4C. For example, in some implementations, the RRC Resume Request may include an indication of whether the gNB should wait for a response from a serving Access and Mobility Management Function (AMF) for the UE before sending the RRC Release. In one example, the RRC Release may include either (i) an event report acknowledgement when the RRC Resume Request indicates that all the location measurements are included in the event report message, or (ii) a Configured Grant (CG) configuration when the RRC Resume Request indicates that not all the location measurements are included in the event report message, where the CG configuration is for the UE to send remaining location measurements to the gNB in subsequent messages, e.g., as discussed at stage 7 of FIG. 4C. The RRC Release, for example, may include the CG configuration, and the UE may send the remaining location measurements to the gNB in one or more messages using the CG configuration, e.g., as discussed at stages 8a, 8b of FIG. 4C, and receive an event report acknowledgment from the gNB, the event report acknowledgement sent to the gNB by the LMF, e.g., as discussed at stages 11a and 11b of FIG. 4C. The event report acknowledgement, for example, may be included in a second RRC Release. A means for sending the remaining location measurements to the gNB in one or more messages using the CG configuration may include, e.g., the wireless transceiver 510 and one or more processors 502 with dedicated hardware or implementing executable code or software instructions in memory 504 and/or medium 520 in UE 500, such as the positioning session module 522, shown in FIG. 5. A means for receiving an event report acknowledgment from the gNB, the event report acknowledgement sent to the gNB by the LMF may include, e.g., the wireless transceiver 510 and one or more processors 502 with dedicated hardware or implementing executable code or software instructions in memory 504 and/or medium 520 in UE 500, such as the positioning session module 522, shown in FIG. 5.

Figure 9:
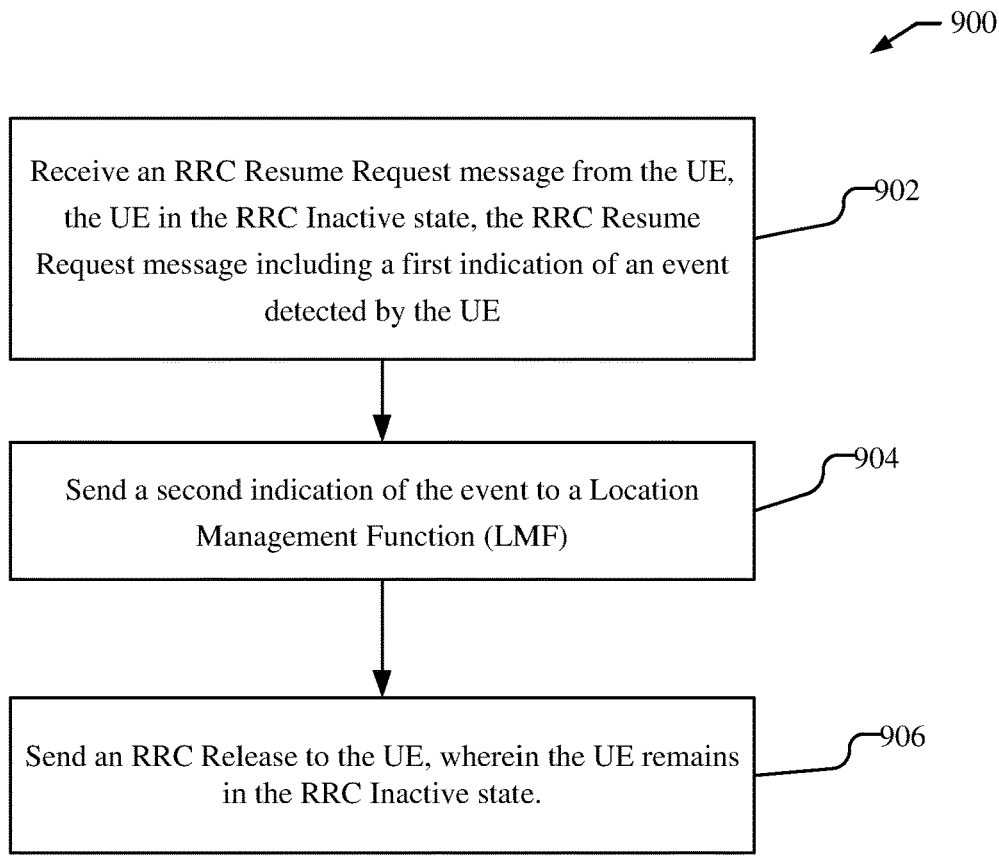
FIG. 9 shows a flowchart for an exemplary method for supporting location services for a UE performed by a base station.

FIG. 9 shows a flowchart for an exemplary method 900 for supporting location of a User Equipment (e.g. a UE 102) in a Radio Resource Control (RRC) Inactive state, performed by a gNB, such as gNB 110 shown in FIG. 1, in a manner consistent with disclosed implementations.

At block 902, the gNB receives an RRC Resume Request message from the UE, the UE in the RRC Inactive state, the RRC Resume Request including a first indication of an event detected by the UE, e.g., as discussed at stages 22.3 and 23.3 of FIG. 4A, stages 4 and 14b of FIG. 4B, and stage 4 of FIG. 4C. A means for receiving an RRC Resume Request message from the UE, the UE in the RRC Inactive state, the RRC Resume Request message including a first indication of an event detected by the UE may include, e.g., the wireless transceiver 710 and one or more processors 702 with dedicated hardware or implementing executable code or software instructions in memory 704 and/or medium 720 in base station 700, such as the RRC Resume module 722, shown in FIG. 7.

At block 904, the gNB sends a second indication of the event to a Location Management Function (e.g. LMF 152), e.g., as discussed at stages 22.4 and 23.4 of FIG. 4A, stages 6 and 15 of FIG. 4B, and stage 5 of FIG. 4C. A means for the gNB sending a second indication of the event to a Location Management Function (LMF) may include, e.g., the external interface 716 and one or more processors 702 with dedicated hardware or implementing executable code or software instructions in memory 704 and/or medium 720 in base station 700, such as the positioning session module 724, shown in FIG. 7

At block 906, the gNB sends an RRC Release to the UE, wherein the UE remains in the RRC Inactive state, e.g., as discussed at stage 22.6 and 23.10 of FIG. 4A, stages 8 and 19b of FIG. 4B, and stages 7 and 11b of FIG. 4C. A means for sending an RRC Release to the UE, wherein the UE remains in the RRC Inactive state may include, e.g., the wireless transceiver 710 and one or more processors 702 with dedicated hardware or implementing executable code or software instructions in memory 704 and/or medium 720 in base station 700, such as the RRC Resume module 722, shown in FIG. 7

In some implementations, the first indication of the event and the second indication of the event may comprise an event report message, e.g., as discussed at stages 23.3 and 23.4 of FIG. 4A, stages 14b and 15 of FIG. 4B, and stages 4 and 5 of FIG. 4C. The gNB may receive an event report acknowledgement from the LMF, e.g., as discussed at stage 23.9 of FIG. 4A, stage 19a of FIG. 4B, and stages 6 and 11a of FIG. 4C. A means for receiving an event report acknowledgement from the LMF may include, e.g., the wireless transceiver 710 or external interface 716 and one or more processors 702 with dedicated hardware or implementing executable code or software instructions in memory 704 and/or medium 720 in base station 700, such as the positioning session module 724, shown in FIG. 7. The gNB may include the event report acknowledgement to the UE in the RRC Release, e.g., as discussed at stage 23.10 of FIG. 4A, stage 19b of FIG. 4B, and stage 11b of FIG. 4C. A means for including the event report acknowledgement to the UE in the RRC Release may include, e.g., the wireless transceiver 710 or external interface 716 and one or more processors 702 with dedicated hardware or implementing executable code or software instructions in memory 704 and/or medium 720 in base station 700, such as the RRC Resume module 722, shown in FIG. 7.

In some implementations, the gNB may receive a first UL Sounding Resource Signal (SRS) configuration from the LMF, e.g., as discussed at stage 14 of FIG. 3. A means for receiving a first UL sounding resource signal (SRS) configuration from the LMF may include, e.g., the wireless transceiver 710 or external interface 716 and one or more processors 702 with dedicated hardware or implementing executable code or software instructions in memory 704 and/or medium 720 in base station 700, such as the positioning session module 724, shown in FIG. 7. The gNB may determine a second UL SRS configuration based on the first UL SRS configuration, e.g., as discussed at stage 22.4 of FIG. 4A, stage 6 of FIG. 4B. A means for determining a second UL SRS configuration based on the first UL SRS configuration may include, e.g., the one or more processors 702 with dedicated hardware or implementing executable code or software instructions in memory 704 and/or medium 720 in base station 700, such as the positioning session module 724, shown in FIG. 7. The gNB may send the second UL SRS configuration to the UE. The second UL SRS configuration, for example, may be either sent in the RRC Release or sent just before or just after sending the RRC Release. The UE may then transmit UL SRS signals based on the second UL SRS configuration, wherein a plurality of gNBs obtain UL measurements based on the transmitted UL SRS signals and send the UL measurements to the LMF, wherein the LMF obtains a location of the UE based at least in part on the UL measurements, e.g., as discussed at stages 22.6, 23.1a, 23.1c, 23.5, and 23.6 of FIG. 4A, stages 8, 12, 13b, 16, and 17 of FIG. 4B. A means for sending the second UL SRS configuration to the UE may include, e.g., the wireless transceiver 710 and one or more processors 702 with dedicated hardware or implementing executable code or software instructions in memory 704 and/or medium 720 in base station 700, such as the RRC Resume module 722 and positioning session module 724, shown in FIG. 7. In some implementations, the gNB may receive UL SRS signals from the UE and may obtain UL measurements based on the received UL SRS signals, e.g., as discussed at stages 23.1a and 23.1c, of FIG. 4A, stages 12 and 13b of FIG. 4B. The gNB may send the UL measurements to the LMF, e.g., as discussed at stage 23.5 of FIG. 4A, and stage 16 of FIG. 4B. A means for receiving UL SRS signals from the UE may include, e.g., the wireless transceiver 710 and one or more processors 702 with dedicated hardware or implementing executable code or software instructions in memory 704 and/or medium 720 in base station 700, such as the positioning session module 724, shown in FIG. 7. A means for obtaining UL measurements based on the received UL SRS signals may include, e.g., the wireless transceiver 710 and one or more processors 702 with dedicated hardware or implementing executable code or software instructions in memory 704 and/or medium 720 in base station 700, such as the positioning session module 724, shown in FIG. 7. A means for sending the UL measurements to the LMF may include, e.g., the wireless transceiver 710 and one or more processors 702 with dedicated hardware or implementing executable code or software instructions in memory 704 and/or medium 720 in base station 700, such as the positioning session module 724, shown in FIG. 7.

The gNB may send the second UL SRS configuration to the UE. The second UL SRS configuration, for example, may be either sent in the RRC Release or sent just before or just after sending the RRC Release. The UE may then transmit UL SRS signals based on the second UL SRS configuration, wherein a plurality of gNBs obtain UL measurements based on the transmitted UL SRS signals and send the UL measurements to the LMF, wherein the LMF obtains a location of the UE based at least in part on the UL measurements, e.g., as discussed at stages 22.6, 23.1a, 23.1c, 23.5, and 23.6 of FIG. 4A, stages 8, 12, 13b, 16, and 17 of FIG. 4B. A means for sending the second UL SRS configuration to the UE, wherein the UE transmits UL SRS signals based on the second UL SRS configuration, wherein a plurality of gNBs obtain UL measurements based on the transmitted UL SRS signals and send the UL measurements to the LMF, wherein the LMF obtains a location of the UE based at least in part on the UL measurements may include, e.g., the wireless transceiver 710 and one or more processors 702 with dedicated hardware or implementing executable code or software instructions in memory 704 and/or medium 720 in base station 700, such as the RRC Resume module 722 and positioning session module 724, shown in FIG. 7.

In a further implementations, the gNB may compress the second UL SRS configuration by including in the second UL SRS configuration either differences to a third SRS configuration stored in the UE or a pointer to the third UL SRS configuration stored in the UE, e.g., as discussed at stage 22.6 of FIG. 4A. A means for compressing the second UL SRS configuration by including in the second UL SRS configuration either differences to a third SRS configuration stored in the UE or a pointer to the third UL SRS configuration stored in the UE may include, e.g., the one or more processors 702 with dedicated hardware or implementing executable code or software instructions in memory 704 and/or medium 720 in base station 700, such as the positioning session module 724, shown in FIG. 7. The gNB may further send the third UL SRS configuration to the UE for a previous event report, e.g., as discussed at stage 22.6 of FIG. 4A, stage 8 of FIG. 4B, and stage 7 of FIG. 4C. A means for sending the third UL SRS configuration to the UE for a previous event report may include, e.g., the wireless transceiver 710 or external interface 716 and one or more processors 702 with dedicated hardware or implementing executable code or software instructions in memory 704 and/or medium 720 in base station 700, such as the RRC Resume module 722 and positioning session module 724, shown in FIG. 7.

In a further implementations, the second indication of the event may comprise the second UL SRS configuration, e.g., as discussed at stage 22.4 of FIG. 4A, stage 6 of FIG. 4B.

In a further implementation, the first UL SRS configuration is received from the LMF as part of positioning of the UE, the positioning of the UE occurring prior to event reporting by the UE or occurring in association with a first event report from the UE, e.g., as discussed at stage 14 of FIG. 3 for Option C.

In one implementation, the gNB may receive positioning capabilities for the UE (e.g. from the UE or from the LMF) indicating support for at least one of uplink positioning, downlink positioning, uplink and downlink positioning, or a combination thereof while in an RRC Inactive state, e.g., as at stage 14 of FIG. 3. A means for receiving positioning capabilities for the UE indicating support for at least one of uplink positioning, downlink positioning, uplink and downlink positioning, or a combination thereof while in an RRC Inactive state may include, e.g., the wireless transceiver 710 and one or more processors 702 with dedicated hardware or implementing executable code or software instructions in memory 704 and/or medium 720 in base station 700, such as the positioning session module 724, shown in FIG. 7.

In one implementation, the UE performs location measurements that are Radio Access Technology (RAT)-independent while in the RRC Inactive state, e.g., as discussed in reference to stage 2b in FIG. 4C.

In one implementation, the first indication of the event and the second indication of the event comprise an event report message that includes location measurements performed by the UE, wherein the RRC Resume Request includes an indication of whether all the location measurements are included in the event report message, e.g., as discussed at stage 4 of FIG. 4C.

In one implementation, the RRC Resume Request includes an indication of whether the gNB should wait for a response from a serving Access and Mobility Management Function (AMF) for the UE before sending the RRC Release to the UE, e.g., as discussed at stage 4 of FIG. 4C.

In one implementation, the event report message includes the indication of whether all of the location measurements are included in the event report message, e.g., as discussed at stages 4 and 5 of FIG. 4C. The gNB may receive an event report acknowledgement from the LMF when the indication indicates that all the location measurements are included in the event report message, and may then include the event report acknowledgement in the RRC Release, e.g., as discussed at stages 6 and 7 of FIG. 4C. A means for receiving an event report acknowledgement from the LMF when the indication indicates that all the location measurements are included in the event report message, and including the event report acknowledgement in the RRC Release, may include, e.g., the wireless transceiver 710 and one or more processors 702 with dedicated hardware or implementing executable code or software instructions in memory 704 and/or medium 720 in base station 700, such as the positioning session module 724, shown in FIG. 7. A means for including the event report acknowledgement in the RRC Release may include, e.g., the wireless transceiver 710 and one or more processors 702 with dedicated hardware or implementing executable code or software instructions in memory 704 and/or medium 720 in base station 700, such as the RRC Resume module 722, shown in FIG. 7.

In one implementation, the gNB may include a Configured Grant (CG) configuration in the RRC Release when the indication indicates that not all the location measurements are included in the event report message, wherein the CG configuration is for the UE to send remaining location measurements to the gNB in subsequent messages, e.g., as discussed at stage 7 of FIG. 4C. A means for including a Configured Grant (CG) configuration in the RRC Release when the indication indicates that not all the location measurements are included in the event report message, wherein the CG configuration is for the UE to send remaining location measurements to the gNB in subsequent messages may include, e.g., the wireless transceiver 710 and one or more processors 702 with dedicated hardware or implementing executable code or software instructions in memory 704 and/or medium 720 in base station 700, such as the RRC Resume module 722, shown in FIG. 7. For example, where the RRC Release comprises the CG configuration, the gNB may receive the remaining location measurements in one or more messages from the UE using the CG configuration, e.g., as discussed at stages 8a, 8b of FIG. 4C, where the gNB may then send the remaining location measurements to the LMF, e.g., as discussed at stages 9a, and 9b of FIG. 4C, and may then receive an event report acknowledgment from the LMF, e.g., as discussed at stage 11a of FIG. 4C, and may send the event report acknowledgement to the UE (e.g. by including the event report acknowledgement in a second RRC Release), e.g., as discussed at stage 11b of FIG. 4C. A means for receiving the remaining location measurements in one or more messages from the UE using the CG configuration may include, e.g., the wireless transceiver 710 and one or more processors 702 with dedicated hardware or implementing executable code or software instructions in memory 704 and/or medium 720 in base station 700, such as the positioning session module 724, shown in FIG. 7. A means for sending the remaining location measurements to the LMF may include, e.g., the wireless transceiver 710 and one or more processors 702 with dedicated hardware or implementing executable code or software instructions in memory 704 and/or medium 720 in base station 700, such as the positioning session module 724, shown in FIG. 7. A means for receiving an event report acknowledgment from the LMF may include, e.g., the wireless transceiver 710 and one or more processors 702 with dedicated hardware or implementing executable code or software instructions in memory 704 and/or medium 720 in base station 700, such as the positioning session module 724, shown in FIG. 7. A means for sending the event report acknowledgement to the UE may include, e.g., the wireless transceiver 710 and one or more processors 702 with dedicated hardware or implementing executable code or software instructions in memory 704 and/or medium 720 in base station 700, such as the positioning session module 724, shown in FIG. 7.

Figure 10:
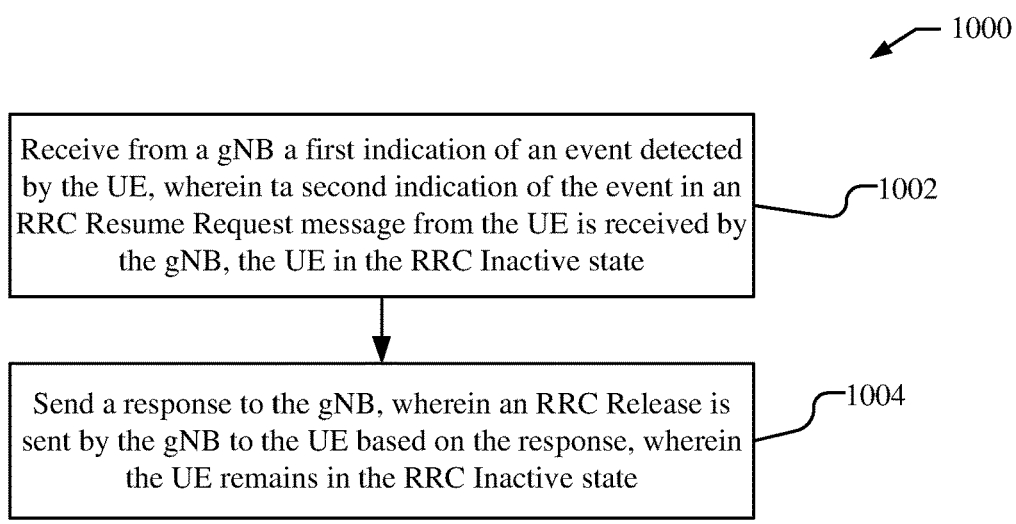
FIG. 10 shows a flowchart for an exemplary method for supporting location services for a UE performed by a location server.

FIG. 10 shows a flowchart for an exemplary method 1000 for supporting location of a User Equipment (e.g. a UE 102) in a Radio Resource Control (RRC) Inactive state, performed by a Location Management Function (LMF), such as LMF 152 shown in FIG. 1, in a manner consistent with disclosed implementations.

At block 1002, the LMF receives from a gNodeB (gNB) a first indication of an event detected by the UE, wherein a second indication of the event in an RRC Resume Request message from the UE is received by the gNB, the UE in the RRC Inactive state, e.g., as discussed at stage 23.4 of FIG. 4A, stage 15 of FIG. 4B, and stage 5 of FIG. 4C. A means for receiving from a gNodeB (gNB) a first indication of an event detected by the UE, wherein a second indication of the event in an RRC Resume Request message from the UE is received by the gNB, the UE in the RRC Inactive state may include, e.g., the external interface 616 and one or more processors 602 with dedicated hardware or implementing executable code or software instructions in memory 604 and/or medium 620 in location server 600, such as the positioning session module 622, shown in FIG. 6.

At block 1004, the LMF sends a response to the gNB, wherein an RRC Release is sent by the gNB to the UE based on the response, wherein the UE remains in the RRC Inactive state, e.g., as discussed at stages 23.9 and 23.10 of FIG. 4A, stages 19a and 19b of FIG. 4B, and stages 11a and 11b of FIG. 4C. A means for sending a response to the gNB, wherein an RRC Release is sent by the gNB to the UE based on the response, wherein the UE remains in the RRC Inactive state may include, e.g., the external interface 616 and one or more processors 602 with dedicated hardware or implementing executable code or software instructions in memory 604 and/or medium 620 in location server 600, such as the positioning session module 622, shown in FIG. 6.

In one implementation, the first indication of the event and the second indication of the event may comprise an event report message, and the response comprises an event report acknowledgment, where the gNB includes the event report acknowledgment in the RRC Release.

In one implementation, the LMF may send one or more uplink (UL) sounding resource signal (SRS) configurations to the gNB, e.g., as discussed at stage 14 of FIG. 3. A means for sending one or more uplink (UL) sounding resource signal (SRS) configurations to the gNB may include, e.g., the external interface 616 and one or more processors 602 with dedicated hardware or implementing executable code or software instructions in memory 604 and/or medium 620 in location server 600, such as the positioning session module 622, shown in FIG. 6.

In one implementation, the first indication of the event may comprise an UL SRS configuration, the UL SRS configuration determined by the gNB based on the one or more UL SRS configurations, e.g., as discussed at stage 22.4 of FIG. 4A, stage 6 of FIG. 4B.

In one implementation, the LMF may send a request for UL measurements to a plurality of gNBs, the request for UL measurements based on the UL SRS configuration, e.g., as discussed at stage 22.9 of FIG. 4A, stage 11 of FIG. 4B. A means for sending a request for UL measurements to a plurality of gNBs, the request for UL measurements based on the UL SRS configuration may include, e.g., the external interface 616 and one or more processors 602 with dedicated hardware or implementing executable code or software instructions in memory 604 and/or medium 620 in location server 600, such as the positioning session module 622, shown in FIG. 6. The LMF may receive the UL measurements from the plurality of gNBs, the UL measurements obtained by the plurality of gNBs based on UL SRS transmitted by the UE based on the UL SRS configuration, e.g., as discussed at stage 23.5 of FIG. 4A, stage 16 of FIG. 4B. A means for receiving the UL measurements from the plurality of gNBs, the UL measurements obtained by the plurality of gNBs based on UL SRS transmitted by the UE based on the UL SRS configuration may include, e.g., the external interface 616 and one or more processors 602 with dedicated hardware or implementing executable code or software instructions in memory 604 and/or medium 620 in location server 600, such as the positioning session module 622, shown in FIG. 6. The LMF may determine a location of the UE based at least in part on the UL measurements, e.g., as discussed at stage 23.6 of FIG. 4A, stage 17 of FIG. 4B. A means for determining a location of the UE based at least in part on the UL measurements may include, e.g., the external interface 616 and one or more processors 602 with dedicated hardware or implementing executable code or software instructions in memory 604 and/or medium 620 in location server 600, such as the positioning session module 622, shown in FIG. 6.

In one implementation, the LMF may receive position location information obtained by the UE with the first indication of the event detected by the UE; and, e.g., as discussed at stage 23.4 of FIG. 4A, stage 15 of FIG. 4B, and stage 5 of FIG. 4C. A means for receiving position location information from the UE with the first indication of the event detected by the UE may include, e.g., the external interface 616 and one or more processors 602 with dedicated hardware or implementing executable code or software instructions in memory 604 and/or medium 620 in location server 600, such as the positioning session module 622, shown in FIG. 6. The LMF may determine a location of the UE based at least in part on the position location information, e.g., as discussed at stage 23.6 of FIG. 4A, stage 17 of FIG. 4B, and stage 10 of FIG. 4C. A means for determining a location of the UE based at least in part on the position location information may include, e.g., the external interface 616 and one or more processors 602 with dedicated hardware or implementing executable code or software instructions in memory 604 and/or medium 620 in location server 600, such as the positioning session module 622, shown in FIG. 6.

In one implementation, the location measurements that are Radio Access Technology (RAT)-independent are performed by the UE while in the RRC Inactive state, e.g., as discussed in reference to FIG. 4C.

In one implementation, the event report message includes location measurements performed by the UE, wherein the RRC Resume Request includes an indication of whether all the location measurements are included in the event report message, e.g., as discussed at stages 4 and 5 of FIG. 4C.

In one implementation, the first indication of the event received from the gNB includes the indication of whether all of the location measurements are included in the event report message, e.g., as discussed at stages 4 and 5 of FIG. 4C. The LMF may send the event report acknowledgement, for example, to the gNB when the first indication of the event indicates that all the location measurements are included in the event report message, e.g., as discussed at stage 6 of FIG. 4C. A means for sending the event report acknowledgement, for example, to the gNB when the first indication of the event indicates that all the location measurements are included in the event report message may include, e.g., the external interface 616 and one or more processors 602 with dedicated hardware or implementing executable code or software instructions in memory 604 and/or medium 620 in location server 600, such as the positioning session module 622, shown in FIG. 6. The first indication of the event may indicate that all the location measurements are not included in the event report message, and the LMF may receive the remaining location measurements from the gNB in one or more messages sent by the UE to the gNB using a Configured Grant (CG) configuration, e.g., as discussed at stages 4, 5, 7, 8, 9 of FIG. 4C, and the LMF may send the event report acknowledgement to the gNB after receiving a final message from the gNB with the remaining location measurements, e.g., as discussed at stage 11*a* of FIG. 4C. A means for receiving the remaining location measurements from the gNB in one or more messages sent by the UE using a Configured Grant (CG) configuration may include, e.g., the external interface 616 and one or more processors 602 with dedicated hardware or implementing executable code or software instructions in memory 604 and/or medium 620 in location server 600, such as the positioning session module 622, shown in FIG. 6. A means for sending the event report acknowledgement to the gNB after receiving a final message from the gNB with the remaining location measurements may include, e.g., the external interface 616 and one or more processors 602 with dedicated hardware or implementing executable code or software instructions in memory 604 and/or medium 620 in location server 600, such as the positioning session module 622, shown in FIG. 6.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In view of this description embodiments may include different combinations of features. Implementation examples are described in the following numbered clauses:

Clause 1. A method performed by a User Equipment (UE) for supporting location of the UE in a Radio Resource Control (RRC) Inactive state, comprising: receiving a request to perform periodic or triggered location from a Location Management Function (LMF); entering the RRC Inactive state; detecting an event; sending an RRC Resume Request message to a gNodeB (gNB), the RRC Resume Request including an indication of the event; receiving an RRC Release from the gNB; and remaining in the RRC Inactive state.

Clause 2. The method of clause 1, wherein the indication of the event comprises an event report message, wherein the event report message is forwarded from the gNB to the LMF and further comprising: receiving an event report acknowledgement from the gNB, the event report acknowledgement included in the RRC Release, the event report acknowledgement sent to the gNB by the LMF.

Clause 3. The method of clause 2, further comprising: obtaining downlink (DL) measurements of DL signals; and including the DL measurements in the event report message.

Clause 4. The method of clause 3, wherein the DL signals comprise DL positioning reference signals (PRS) transmitted by a plurality of gNBs.

Clause 5. The method of any of clauses 1-4, further comprising: receiving a first uplink (UL) sounding reference signal (SRS) configuration from the gNB, the first UL SRS configuration received in the RRC Release; and transmitting UL SRS signals based on the first UL SRS configuration, wherein UL measurements are obtained by a plurality of gNBs based on the transmitted UL SRS signals and sent to the LMF, wherein a location of the UE is determined based at least in part on the UL measurements.

Clause 6. The method of clause 5, wherein the first UL SRS configuration is compressed, wherein the first UL SRS configuration comprises either differences to a second SRS configuration stored in the UE or a pointer to a second UL SRS configuration stored in the UE and further comprising: determining a third UL SRS configuration based on the first UL SRS configuration and the second UL SRS configuration; and transmitting the UL SRS based on the third UL SRS configuration.

Clause 7. The method of clause 6, wherein the UE stores the third UL SRS configuration and discards the second UL SRS configuration.

Clause 8. The method of clause 6, wherein the UE receives the second UL SRS configuration from the gNB or from the LMF in the request to perform periodic or triggered location.

Clause 9. The method of any of clauses 1-8, further comprising providing positioning capabilities to a serving gNB, the LMF or both, the positioning capabilities indicating support for at least one of uplink positioning, downlink positioning, uplink and downlink positioning, or a combination thereof while in the RRC Inactive state.

Clause 10. The method of any of clauses 1-9, further comprising performing location measurements that are Radio Access Technology (RAT)-independent while in the RRC Inactive state.

Clause 11. The method of any of clauses 1-10, wherein the indication of the event comprises an event report message that includes location measurements performed by the UE, wherein the RRC Resume Request includes an indication of whether all the location measurements are included in the event report message.

Clause 12. The method of clause 11, wherein the RRC Resume Request includes an indication of whether the gNB should wait for a response from a serving Access and Mobility Management Function (AMF) for the UE before sending the RRC Release.

Clause 13. The method of clause 11, wherein the RRC Release includes an event report acknowledgement when the RRC Resume Request indicates that all the location measurements are included in the event report message or a Configured Grant (CG) configuration when the RRC Resume Request indicates that not all the location measurements are included in the event report message, wherein the CG configuration is for the UE to send remaining location measurements to the gNB in subsequent messages.

Clause 14. The method of clause 13, wherein the RRC Release comprises the CG configuration, the method further comprising: sending the remaining location measurements to the gNB in one or more messages using the CG configuration; and receiving an event report acknowledgment from the gNB, the event report acknowledgement sent to the gNB by the LMF.

Clause 15. The method of clause 13, wherein the event report acknowledgement is included in a second RRC Release.

Clause 16. A User Equipment (UE) configured for supporting location in a Radio Resource Control (RRC) Inactive state, comprising: a wireless transceiver configured to wirelessly communicate with entities in a wireless network; at least one memory; at least one processor coupled to the wireless transceiver and the at least one memory, wherein the at least one processor is configured to: receive, via the wireless transceiver, a request to perform periodic or triggered location from a Location Management Function (LMF); enter the RRC Inactive state; detect an event; send, via the wireless transceiver, an RRC Resume Request message to a gNodeB (gNB), the RRC Resume Request including an indication of the event; receive, via the wireless transceiver, an RRC Release from the gNB; and remain in the RRC Inactive state.

Clause 17. The UE of clause 16, wherein the indication of the event comprises an event report message, wherein the event report message is forwarded from the gNB to the LMF and the at least one processor is further configured to: receive, via the wireless transceiver, an event report acknowledgement from the gNB, the event report acknowledgement included in the RRC Release, the event report acknowledgement sent to the gNB by the LMF.

Clause 18. The UE of clause 17, wherein the at least one processor is further configured to: obtain, via the wireless transceiver, downlink (DL) measurements of DL signals; and include the DL measurements in the event report message.

Clause 19. The UE of clause 18, wherein the DL signals comprise DL positioning reference signals (PRS) transmitted by a plurality of gNBs.

Clause 20. The UE of any of clauses 16-19, wherein the at least one processor is further configured to: receive, via the wireless transceiver, a first uplink (UL) sounding reference signal (SRS) configuration from the gNB, the first UL SRS configuration either received in the RRC Release or received just before or just after receiving the RRC Release; and transmit, via the wireless transceiver, UL SRS signals based on the first UL SRS configuration, wherein UL measurements are obtained by a plurality of gNBs based on the transmitted UL SRS signals and sent to the LMF, wherein a location of the UE is determined based at least in part on the UL measurements.

Clause 21. The UE of clause 20, wherein the first UL SRS configuration is compressed, wherein the first UL SRS configuration comprises either differences to a second SRS configuration stored in the UE or a pointer to a second UL SRS configuration stored in the UE and the at least one processor is further configured to: determine a third UL SRS configuration based on the first UL SRS configuration and the second UL SRS configuration; and transmit, via the wireless transceiver, the UL SRS based on the third UL SRS configuration.

Clause 22. The UE of clause 21, wherein the UE stores the third UL SRS configuration and discards the second UL SRS configuration.

Clause 23. The UE of clause 21, wherein the UE receives the second UL SRS configuration from the gNB or from the LMF in the request to perform periodic or triggered location.

Clause 24. The UE of any of clauses 16-23, wherein the at least one processor is further configured to provide positioning capabilities, via the wireless transceiver, to a serving gNB, the LMF or both, the positioning capabilities indicating support for at least one of uplink positioning, downlink positioning, uplink and downlink positioning, or a combination thereof while in the RRC Inactive state.

Clause 25. The UE of any of clauses 16-24, wherein the at least one processor is further configured to perform location measurements that are Radio Access Technology (RAT)-independent while in the RRC Inactive state.

Clause 26. The UE of any of clauses 16-25, wherein the indication of the event comprises an event report message that includes location measurements performed by the UE, wherein the RRC Resume Request includes an indication of whether all the location measurements are included in the event report message.

Clause 27. The UE of clause 26, wherein the RRC Resume Request includes an indication of whether the gNB should wait for a response from a serving Access and Mobility Management Function (AMF) for the UE before sending the RRC Release.

Clause 28. The UE of clause 26, wherein the RRC Release includes an event report acknowledgement when the RRC Resume Request indicates that all the location measurements are included in the event report message or a Configured Grant (CG) configuration when the RRC Resume Request indicates that not all the location measurements are included in the event report message, wherein the CG configuration is for the UE to send remaining location measurements to the gNB in subsequent messages.

Clause 29. The UE of clause 28, wherein the RRC Release comprises the CG configuration, wherein the at least one processor is further configured to: send, via the wireless transceiver, the remaining location measurements to the gNB in one or more messages using the CG configuration; and receive, via the wireless transceiver, an event report acknowledgment from the gNB, the event report acknowledgement sent to the gNB by the LMF.

Clause 30. The UE of clause 28, wherein the event report acknowledgement is included in a second RRC Release.

Clause 31. A User Equipment (UE) configured for supporting location of the UE in a Radio Resource Control (RRC) Inactive state, comprising: means for receiving a request to perform periodic or triggered location from a Location Management Function (LMF); means for entering the RRC Inactive state; means for detecting an event; means for sending an RRC Resume Request message to a gNodeB (gNB), the RRC Resume Request including an indication of the event; means for receiving an RRC Release from the gNB; and means for remaining in the RRC Inactive state.

Clause 32. The UE of clause 31, wherein the indication of the event comprises an event report message, wherein the event report message is forwarded from the gNB to the LMF and further comprising: means for receiving an event report acknowledgement from the gNB, the event report acknowledgement included in the RRC Release, the event report acknowledgement sent to the gNB by the LMF.

Clause 33. The UE of clause 32, further comprising: means for obtaining downlink (DL) measurements of DL signals; and means for including the DL measurements in the event report message.

Clause 34. The UE of clause 33, wherein the DL signals comprise DL positioning reference signals (PRS) transmitted by a plurality of gNBs.

Clause 35. The UE of any of clauses 31-34, further comprising: means for receiving a first uplink (UL) sounding reference signal (SRS) configuration from the gNB, the first UL SRS configuration received in the RRC Release; and means for transmitting UL SRS signals based on the first UL SRS configuration, wherein UL measurements are obtained by a plurality of gNBs based on the transmitted UL SRS signals and sent to the LMF, wherein a location of the UE is determined based at least in part on the UL measurements.

Clause 36. The UE of clause 35, wherein the first UL SRS configuration is compressed, wherein the first UL SRS configuration comprises either differences to a second SRS configuration stored in the UE or a pointer to a second UL SRS configuration stored in the UE and further comprising: means for determining a third UL SRS configuration based on the first UL SRS configuration and the second UL SRS configuration; and means for transmitting the UL SRS based on the third UL SRS configuration.

Clause 37. The UE of clause 36, wherein the UE stores the third UL SRS configuration and discards the second UL SRS configuration.

Clause 38. The UE of clause 36, wherein the UE receives the second UL SRS configuration from the gNB or from the LMF in the request to perform periodic or triggered location.

Clause 39. The UE of any of clauses 31-38, further comprising means for providing positioning capabilities to a serving gNB, the LMF or both, the positioning capabilities indicating support for at least one of uplink positioning, downlink positioning, uplink and downlink positioning, or a combination thereof while in the RRC Inactive state.

Clause 40. The UE of any of clauses 31-39, further comprising means for performing location measurements that are Radio Access Technology (RAT)-independent while in the RRC Inactive state.

Clause 41. The UE of any of clauses 31-40, wherein the indication of the event comprises an event report message that includes location measurements performed by the UE, wherein the RRC Resume Request includes an indication of whether all the location measurements are included in the event report message.

Clause 42. The UE of clause 41, wherein the RRC Resume Request includes an indication of whether the gNB should wait for a response from a serving Access and Mobility Management Function (AMF) for the UE before sending the RRC Release.

Clause 43. The UE of clause 41, wherein the RRC Release includes an event report acknowledgement when the RRC Resume Request indicates that all the location measurements are included in the event report message or a Configured Grant (CG) configuration when the RRC Resume Request indicates that not all the location measurements are included in the event report message, wherein the CG configuration is for the UE to send remaining location measurements to the gNB in subsequent messages.

Clause 44. The UE of clause 43, wherein the RRC Release comprises the CG configuration, the method further comprising: means for sending the remaining location measurements to the gNB in one or more messages using the CG configuration; and means for receiving an event report acknowledgment from the gNB, the event report acknowledgement sent to the gNB by the LMF.

Clause 45. The UE of clause 43, wherein the event report acknowledgement is included in a second RRC Release.

Clause 46. A non-transitory storage medium including program code stored thereon, the program code is operable to configure at least one processor in a User Equipment (UE) configured for supporting location in a Radio Resource Control (RRC) Inactive state, the program code comprising instructions to: receive a request to perform periodic or triggered location from a Location Management Function (LMF); enter the RRC Inactive state; detect an event; send an RRC Resume Request message to a gNodeB (gNB), the RRC Resume Request including an indication of the event; receive an RRC Release from the gNB; and remain in the RRC Inactive state.

Clause 47. The non-transitory storage medium of clause 46, erein the indication of the event comprises an event report message, wherein the event report message is forwarded from the gNB to the LMF and the program code further comprises instructions to: receive an event report acknowledgement from the gNB, the event report acknowledgement included in the RRC Release, the event report acknowledgement sent to the gNB by the LMF.

Clause 48. The non-transitory storage medium of clause 47, wherein the program code further comprises instructions to: obtain downlink (DL) measurements of DL signals; and include the DL measurements in the event report message.

Clause 49. The non-transitory storage medium of clause 48, wherein the DL signals comprise DL positioning reference signals (PRS) transmitted by a plurality of gNBs.

Clause 50. The non-transitory storage medium of any of clauses 46-49, wherein the program code further comprises instructions to: receive a first uplink (UL) sounding reference signal (SRS) configuration from the gNB, the first UL SRS configuration either received in the RRC Release or received just before or just after receiving the RRC Release; and transmit UL SRS signals based on the first UL SRS configuration, wherein UL measurements are obtained by a plurality of gNBs based on the transmitted UL SRS signals and sent to the LMF, wherein a location of the UE is determined based at least in part on the UL measurements.

Clause 51. The non-transitory storage medium of clause 50, wherein the first UL SRS configuration is compressed, wherein the first UL SRS configuration comprises either differences to a second SRS configuration stored in the UE or a pointer to a second UL SRS configuration stored in the UE and the program code further comprises instructions to: determine a third UL SRS configuration based on the first UL SRS configuration and the second UL SRS configuration; and transmit the UL SRS based on the third UL SRS configuration.

Clause 52. The non-transitory storage medium of clause 51, wherein the UE stores the third UL SRS configuration and discards the second UL SRS configuration.

Clause 53. The non-transitory storage medium of clause 51, wherein the UE receives the second UL SRS configuration from the gNB or from the LMF in the request to perform periodic or triggered location.

Clause 54. The non-transitory storage medium of any of clauses 46-53, wherein the program code further comprises instructions to provide positioning capabilities to a serving gNB, the LMF or both, the positioning capabilities indicating support for at least one of uplink positioning, downlink positioning, uplink and downlink positioning, or a combination thereof while in the RRC Inactive state.

Clause 55. The non-transitory storage medium of any of clauses 46-54, wherein the program code further comprises instructions to perform location measurements that are Radio Access Technology (RAT)-independent while in the RRC Inactive state.

Clause 56. The non-transitory storage medium of any of clauses 46-55, wherein the indication of the event comprises an event report message that includes location measurements performed by the UE, wherein the RRC Resume Request includes an indication of whether all the location measurements are included in the event report message.

Clause 57. The non-transitory storage medium of clause 56, wherein the RRC Resume Request includes an indication of whether the gNB should wait for a response from a serving Access and Mobility Management Function (AMF) for the UE before sending the RRC Release.

Clause 58. The non-transitory storage medium of clause 56, wherein the RRC Release includes an event report acknowledgement when the RRC Resume Request indicates that all the location measurements are included in the event report message or a Configured Grant (CG) configuration when the RRC Resume Request indicates that not all the location measurements are included in the event report message, wherein the CG configuration is for the UE to send remaining location measurements to the gNB in subsequent messages.

Clause 59. The non-transitory storage medium of clause 58, wherein the RRC Release comprises the CG configuration, wherein the program code further comprises instructions to: send the remaining location measurements to the gNB in one or more messages using the CG configuration; and receive an event report acknowledgment from the gNB, the event report acknowledgement sent to the gNB by the LMF.

Clause 60. The non-transitory storage medium of clause 58, wherein the event report acknowledgement is included in a second RRC Release.

Clause 61. A method performed by a gNodeB (gNB) for supporting location of a User Equipment (UE) in a Radio Resource Control (RRC) Inactive state, comprising: receiving an RRC Resume Request message from the UE, the UE in the RRC Inactive state, the RRC Resume Request including a first indication of an event detected by the UE; sending a second indication of the event to a Location Management Function (LMF); and sending an RRC Release to the UE, wherein the UE remains in the RRC Inactive state.

Clause 62. The method of clause 61, wherein the first indication of the event and the second indication of the event comprise an event report message, and further comprising: receiving an event report acknowledgement from the LMF; and including the event report acknowledgement to the UE in the RRC Release.

Clause 63. The method of any of clauses 61-62, further comprising: receiving a first uplink (UL) sounding resource signal (SRS) configuration from the LMF; determining a second UL SRS configuration based on the first UL SRS configuration; sending the second UL SRS configuration to the UE.

Clause 64. The method of clause 63, further comprising: receiving UL SRS signals from the UE; obtaining UL measurements based on the received UL SRS signals; and sending the UL measurements to the LMF.

Clause 65. The method of clause 63, further comprising compressing the second UL SRS configuration by including in the second UL SRS configuration either differences to a third SRS configuration stored in the UE or a pointer to the third UL SRS configuration stored in the UE.

Clause 66. The method of clause 65, further comprising: sending the third UL SRS configuration to the UE for a previous event report.

Clause 67. The method of clause 63, wherein the second indication of the event comprises the second UL SRS configuration.

Clause 68. The method of clause 63, wherein the first UL SRS configuration is received from the LMF as part of positioning of the UE, the positioning of the UE occurring prior to event reporting by the UE or occurring in association with a first event report from the UE.

Clause 69. The method of any of clauses 61-68, further comprising receiving positioning capabilities for the UE indicating support for at least one of uplink positioning, downlink positioning, uplink and downlink positioning, or a combination thereof while in the RRC Inactive state.

Clause 70. The method of any of clauses 61-69, wherein location measurements that are Radio Access Technology (RAT)-independent are performed by the UE while in the RRC Inactive state.

Clause 71. The method of any of clauses 61-70, wherein the first indication of the event and the second indication of the event comprise an event report message that includes location measurements performed by the UE, wherein the RRC Resume Request includes an indication of whether all the location measurements are included in the event report message.

Clause 72. The method of clause 71, wherein the RRC Resume Request includes an indication of whether the gNB should wait for a response from a serving Access and Mobility Management Function (AMF) for the UE before sending the RRC Release to the UE.

Clause 73. The method of clause 71, wherein the event report message includes the indication of whether all of the location measurements are included in the event report message.

Clause 74. The method of clause 73, further comprising: receiving an event report acknowledgement from the LMF when the indication indicates that all the location measurements are included in the event report message; and including the event report acknowledgement in the RRC Release.

Clause 75. The method of clause 73, further comprising including a Configured Grant (CG) configuration in the RRC Release when the indication indicates that not all the location measurements are included in the event report message, wherein the CG configuration is for the UE to send remaining location measurements to the gNB in subsequent messages.

Clause 76. The method of clause 75, further comprising: receiving the remaining location measurements in one or more messages from the UE using the CG configuration; sending the remaining location measurements to the LMF; receiving an event report acknowledgment from the LMF; and sending the event report acknowledgement to the UE.

Clause 77. The method of clause 76, further comprising including the event report acknowledgement in a second RRC Release.

Clause 78. A gNodeB (gNB) configured for supporting location of a User Equipment (UE) in a Radio Resource Control (RRC) Inactive state, comprising: an external interface configured to wirelessly communicate with entities in a wireless network; at least one memory; at least one processor coupled to the external interface and the at least one memory, wherein the at least one processor is configured to: receive, via the external interface, an RRC Resume Request message from the UE, the UE in the RRC Inactive state, the RRC Resume Request including a first indication of an event detected by the UE; send, via the external interface, a second indication of the event to a Location Management Function (LMF); and send, via the external interface, an RRC Release to the UE, wherein the UE remains in the RRC Inactive state.

Clause 79. The gNB of clause 78, wherein the first indication of the event and the second indication of the event comprise an event report message, and wherein the at least one processor is further configured to: receive, via the external interface, an event report acknowledgement from the LMF; and include, via the external interface, the event report acknowledgement to the UE in the RRC Release.

Clause 80. The gNB of any of clauses 78-79, wherein the at least one processor is further configured to: receive, via the external interface, a first uplink (UL) sounding resource signal (SRS) configuration from the LMF; determine a second UL SRS configuration based on the first UL SRS configuration; send, via the external interface, the second UL SRS configuration to the UE.

Clause 81. The gNB of clause 80, wherein the at least one processor is further configured to: receive UL SRS signals from the UE; obtain UL measurements based on the received UL SRS signals; and send the UL measurements to the LMF.

Clause 82. The gNB of clause 80, wherein the at least one processor is further configured to compress the second UL SRS configuration including in the second UL SRS configuration either differences to a third SRS configuration stored in the UE or a pointer to the third UL SRS configuration stored in the UE.

Clause 83. The gNB of clause 82, wherein the at least one processor is further configured to: send, via the external interface, the third UL SRS configuration to the UE for a previous event report.

Clause 84. The gNB of clause 80, wherein the second indication of the event comprises the second UL SRS configuration.

Clause 85. The gNB of clause 80, wherein the first UL SRS configuration is received from the LMF as part of positioning of the UE, the positioning of the UE occurring prior to event reporting by the UE or occurring in association with a first event report from the UE.

Clause 86. The gNB of any of clauses 78-85, wherein the at least one processor is further configured to receive, via the external interface, positioning capabilities for the UE indicating support for at least one of uplink positioning, downlink positioning, uplink and downlink positioning, or a combination thereof while in the RRC Inactive state.

Clause 87. The gNB of any of clauses 78-86, wherein location measurements that are Radio Access Technology (RAT)-independent are performed by the UE while in the RRC Inactive state.

Clause 88. The gNB of any of clauses 78-87, wherein the first indication of the event and the second indication of the event comprise an event report message that includes location measurements performed by the UE, wherein the RRC Resume Request includes an indication of whether all the location measurements are included in the event report message.

Clause 89. The gNB of clause 88, wherein the RRC Resume Request includes an indication of whether the gNB should wait for a response from a serving Access and Mobility Management Function (AMF) for the UE before sending the RRC Release to the UE.

Clause 90. The gNB of clause 88, wherein the event report message includes the indication of whether all of the location measurements are included in the event report message.

Clause 91. The gNB of clause 90, wherein the at least one processor is further configured to: receive, via the external interface, an event report acknowledgement from the LMF when the indication indicates that all the location measurements are included in the event report message; and include the event report acknowledgement in the RRC Release.

Clause 92. The gNB of clause 90, further comprising including a Configured Grant (CG) configuration in the RRC Release when the indication indicates that not all the location measurements are included in the event report message, wherein the CG configuration is for the UE to send remaining location measurements to the gNB in subsequent messages.

Clause 93. The gNB of clause 92, wherein the at least one processor is further configured to: receive, via the external interface, the remaining location measurements in one or more messages from the UE using the CG configuration; send, via the external interface, the remaining location measurements to the LMF; receive, via the external interface, an event report acknowledgment from the LMF; and send, via the external interface, the event report acknowledgement to the UE.

Clause 94. The gNB of clause 93, further comprising including the event report acknowledgement in a second RRC Release.

Clause 95. A gNodeB (gNB) configured for supporting location of a User Equipment (UE) in a Radio Resource Control (RRC) Inactive state, comprising: means for receiving an RRC Resume Request message from the UE, the UE in the RRC Inactive state, the RRC Resume Request including a first indication of an event detected by the UE; means for sending a second indication of the event to a Location Management Function (LMF); and means for sending an RRC Release to the UE, wherein the UE remains in the RRC Inactive state.

Clause 96. The gNB of clause 95, wherein the first indication of the event and the second indication of the event comprise an event report message, and further comprising: means for receiving an event report acknowledgement from the LMF; and means for including the event report acknowledgement to the UE in the RRC Release.

Clause 97. The gNB of any of clauses 95-96, further comprising: means for receiving a first uplink (UL) sounding resource signal (SRS) configuration from the LMF; means for determining a second UL SRS configuration based on the first UL SRS configuration; means for sending the second UL SRS configuration to the UE.

Clause 98. The gNB of clause 97, further comprising: means for receiving UL SRS signals from the UE; means for obtaining UL measurements based on the received UL SRS signals; and means for sending the UL measurements to the LMF.

Clause 99. The gNB of clause 97, further comprising means for compressing the second UL SRS configuration by including in the second UL SRS configuration either differences to a third SRS configuration stored in the UE or a pointer to the third UL SRS configuration stored in the UE.

Clause 100. The gNB of clause 98, further comprising: means for sending the third UL SRS configuration to the UE for a previous event report.

Clause 101. The gNB of clause 97, wherein the second indication of the event comprises the second UL SRS configuration.

Clause 102. The gNB of clause 97, wherein the first UL SRS configuration is received from the LMF as part of positioning of the UE, the positioning of the UE occurring prior to event reporting by the UE or occurring in association with a first event report from the UE.

Clause 103. The gNB of any of clauses 95-102, further comprising means for receiving positioning capabilities for the UE indicating support for at least one of uplink positioning, downlink positioning, uplink and downlink positioning, or a combination thereof while in the RRC Inactive state.

Clause 104. The gNB of any of clauses 95-103, wherein location measurements that are Radio Access Technology (RAT)-independent are performed by the UE while in the RRC Inactive state.

Clause 105. The gNB of any of clauses 95-104, wherein the first indication of the event and the second indication of the event comprise an event report message that includes location measurements performed by the UE, wherein the RRC Resume Request includes an indication of whether all the location measurements are included in the event report message.

Clause 106. The gNB of clause 105, wherein the RRC Resume Request includes an indication of whether the gNB should wait for a response from a serving Access and Mobility Management Function (AMF) for the UE before sending the RRC Release to the UE.

Clause 107. The gNB of clause 105, wherein the event report message includes the indication of whether all of the location measurements are included in the event report message.

Clause 108. The gNB of clause 107, further comprising: means for receiving an event report acknowledgement from the LMF when the indication indicates that all the location measurements are included in the event report message; and means for including the event report acknowledgement in the RRC Release.

Clause 109. The gNB of clause 107, further comprising including a Configured Grant (CG) configuration in the RRC Release when the indication indicates that not all the location measurements are included in the event report message, wherein the CG configuration is for the UE to send remaining location measurements to the gNB in subsequent messages.

Clause 110. The gNB of clause 109, further comprising: means for receiving the remaining location measurements in one or more messages from the UE using the CG configuration; means for sending the remaining location measurements to the LMF; means for receiving an event report acknowledgment from the LMF; and means for sending the event report acknowledgement to the UE.

Clause 111. The gNB of clause 110, further comprising means for including the event report acknowledgement in a second RRC Release.

Clause 112. A non-transitory storage medium including program code stored thereon, the program code is operable to configure at least one processor in a gNodeB (gNB) configured for supporting location of a User Equipment (UE) in a Radio Resource Control (RRC) Inactive state, the program code comprising instructions to: receive an RRC Resume Request message from the UE, the UE in the RRC Inactive state, the RRC Resume Request including a first indication of an event detected by the UE; send a second indication of the event to a Location Management Function (LMF); and send an RRC Release to the UE, wherein the UE remains in the RRC Inactive state.

Clause 113. The non-transitory storage medium of clause 112, wherein the first indication of the event and the second indication of the event comprise an event report message, and wherein the program code further comprises instructions to: receive an event report acknowledgement from the LMF; and include the event report acknowledgement to the UE in the RRC Release.

Clause 114. The non-transitory storage medium of any of clauses 112-113, wherein the program code further comprises instructions to: receive a first uplink (UL)

sounding resource signal (SRS) configuration from the LMF; determine a second UL SRS configuration based on the first UL SRS configuration; send the second UL SRS configuration to the UE.

Clause 115. The non-transitory storage medium of clause 114, wherein the program code further comprises instructions to: receive UL SRS signals from the UE; obtain UL measurements based on the received UL SRS signals; and send the UL measurements to the LMF.

Clause 116. The non-transitory storage medium of clause 114, wherein the program code further comprises instructions to compress the second UL SRS configuration including in the second UL SRS configuration either differences to a third SRS configuration stored in the UE or a pointer to the third UL SRS configuration stored in the UE.

Clause 117. The non-transitory storage medium of clause 116, wherein the program code further comprises instructions to: send the third UL SRS configuration to the UE for a previous event report.

Clause 118. The non-transitory storage medium of clause 114, wherein the second indication of the event comprises the second UL SRS configuration.

Clause 119. The non-transitory storage medium of clause 114, wherein the first UL SRS configuration is received from the LMF as part of positioning of the UE, the positioning of the UE occurring prior to event reporting by the UE or occurring in association with a first event report from the UE.

Clause 120. The non-transitory storage medium of any of clauses 112-119, wherein the program code further comprises instructions to receive positioning capabilities for the UE indicating support for at least one of uplink positioning, downlink positioning, uplink and downlink positioning, or a combination thereof while in the RRC Inactive state.

Clause 121. The non-transitory storage medium of any of clauses 112-120, wherein location measurements that are Radio Access Technology (RAT)-independent are performed by the UE while in the RRC Inactive state.

Clause 122. The non-transitory storage medium of any of clauses 112-121, wherein the first indication of the event and the second indication of the event comprise an event report message that includes location measurements performed by the UE, wherein the RRC Resume Request includes an indication of whether all the location measurements are included in the event report message.

Clause 123. The non-transitory storage medium of clause 122, wherein the RRC Resume Request includes an indication of whether the gNB should wait for a response from a serving Access and Mobility Management Function (AMF) for the UE before sending the RRC Release to the UE.

Clause 124. The non-transitory storage medium of clause 122, wherein the event report message includes the indication of whether all of the location measurements are included in the event report message.

Clause 125. The non-transitory storage medium of clause 124, wherein the program code further comprises instructions to: receive an event report acknowledgement from the LMF when the indication indicates that all the location measurements are included in the event report message; and include the event report acknowledgement in the RRC Release.

Clause 126. The non-transitory storage medium of clause 124, further comprising including a Configured Grant (CG) configuration in the RRC Release when the indication indicates that not all the location measurements are included in the event report message, wherein the CG configuration is for the UE to send remaining location measurements to the gNB in subsequent messages.

Clause 127. The non-transitory storage medium of clause 126, wherein the program code further comprises instructions to: receive the remaining location measurements in one or more messages from the UE using the CG configuration; send the remaining location measurements to the LMF; receive an event report acknowledgment from the LMF; and send the event report acknowledgement to the UE.

Clause 128. The non-transitory storage medium of clause 127, further comprising including the event report acknowledgement in a second RRC Release.

Clause 129. A method performed by a Location Management Function (LMF) for supporting location of a User Equipment (UE) in a Radio Resource Control (RRC) Inactive state, comprising: receiving from a gNodeB (gNB) a first indication of an event detected by the UE, wherein a second indication of the event in an RRC Resume Request message from the UE is received by the gNB, the UE in the RRC Inactive state; and sending a response to the gNB, wherein an RRC Release is sent by the gNB to the UE based on the response, wherein the UE remains in the RRC Inactive state.

Clause 130. The method of clause 129, wherein the first indication of the event and the second indication of the event comprise an event report message, wherein the response comprises an event report acknowledgment, wherein the gNB includes the event report acknowledgment in the RRC Release.

Clause 131. The method of any of clauses 129-130, further comprising: sending one or more uplink (UL) sounding resource signal (SRS) configurations to the gNB.

Clause 132. The method of clause 131, wherein the first indication of the event comprises an UL SRS configuration, the UL SRS configuration determined by the gNB based on the one or more UL SRS configurations.

Clause 133. The method of clause 132, further comprising: sending a request for UL measurements to a plurality of gNB s, the request for UL measurements based on the UL SRS configuration; receiving the UL measurements from the plurality of gNBs, the UL measurements obtained by the plurality of gNBs based on UL SRS transmitted by the UE based on the UL SRS configuration; and determining a location of the UE based at least in part on the UL measurements.

Clause 134. The method of clause 130, further comprising: receiving position location information obtained by the UE with the first indication of the event detected by the UE; and determining a location of the UE based at least in part on the position location information.

Clause 135. The method of clause 130, wherein the location measurements that are Radio Access Technology (RAT)-independent are performed by the UE while in the RRC Inactive state.

Clause 136. The method of clause 130, wherein the event report message includes location measurements performed by the UE, wherein the RRC Resume Request includes an indication of whether all the location measurements are included in the event report message.

Clause 137. The method of clause 136, wherein the first indication of the event received from the gNB includes the indication of whether all of the location measurements are included in the event report message.

Clause 138. The method of clause 137, further comprising sending the event report acknowledgement to the gNB when the first indication of the event indicates that all the location measurements are included in the event report message.

Clause 139. The method of clause 137, wherein the first indication of the event indicates that all the location measurements are not included in the event report message, the method further comprising: receiving remaining location measurements from the gNB in one or more messages sent by the UE to the gNB using a Configured Grant (CG) configuration; and sending the event report acknowledgement to the gNB after receiving a final message from the gNB with the remaining location measurements.

Clause 140. A Location Management Function (LMF) configured for supporting location of a User Equipment (UE) in a Radio Resource Control (RRC) Inactive state, comprising: an external interface configured to wirelessly communicate with entities in a wireless network; at least one memory; at least one processor coupled to the external interface and the at least one memory, wherein the at least one processor is configured to: receive, via the external interface, from a gNodeB (gNB) a first indication of an event detected by the UE, wherein a second indication of the event in an RRC Resume Request message from the UE is received by the gNB, the UE in the RRC Inactive state; and send, via the external interface, a response to the gNB, wherein an RRC Release is sent by the gNB to the UE based on the response, wherein the UE remains in the RRC Inactive state.

Clause 141. The LMF of clause 140, wherein the first indication of the event and the second indication of the event comprise an event report message, wherein the response comprises an event report acknowledgment, wherein the gNB includes the event report acknowledgment in the RRC Release.

Clause 142. The LMF of any of clauses 140-141, wherein the at least one processor is further configured to: send, via the external interface, one or more uplink (UL) sounding resource signal (SRS) configurations to the gNB.

Clause 143. The LMF of clause 142, wherein the first indication of the event comprises an UL SRS configuration, the UL SRS configuration determined by the gNB based on the one or more UL SRS configurations Clause 144. The LMF of clause 143, wherein the at least one processor is further configured to: send, via the external interface, a request for UL measurements to a plurality of gNBs, the request for UL measurements based on the UL SRS configuration; receive, via the external interface, UL measurements from the plurality of gNBs, the UL measurements obtained by the plurality of gNBs based on UL SRS transmitted by the UE based on the UL SRS configuration; and determine a location of the UE based at least in part on the UL measurements.

Clause 145. The LMF of clause 141, wherein the at least one processor is further configured to: receive, via the external interface, position location information obtained by the UE with the first indication of the event detected by the UE; and determine a location of the UE based at least in part on the position location information.

Clause 146. The LMF of clause 141, wherein the location measurements that are Radio Access Technology (RAT)-independent are performed by the UE while in the RRC Inactive state.

Clause 147. The LMF of clause 141, wherein the event report message includes location measurements performed by the UE, wherein the RRC Resume Request includes an indication of whether all the location measurements are included in the event report message.

Clause 148. The LMF of clause 147, wherein the first indication of the event received from the gNB includes the indication of whether all of the location measurements are included in the event report message.

Clause 149. The LMF of clause 148, further comprising sending the event report acknowledgement to the gNB when the first indication of the event indicates that all the location measurements are included in the event report message.

Clause 150. The LMF of clause 148, wherein the first indication of the event indicates that all the location measurements are not included in the event report message, wherein the at least one processor is further configured to: receive, via the external interface, remaining location measurements from the gNB in one or more messages sent by the UE using a Configured Grant (CG) configuration; and sending the event report acknowledgement to the gNB after receiving a final message from the gNB with the remaining location measurements.

Clause 151. A Location Management Function (LMF) configured for supporting location of a User Equipment (UE) in a Radio Resource Control (RRC) Inactive state, comprising: means for receiving from a gNodeB (gNB) a first indication of an event detected by the UE, wherein a second indication of the event in an RRC Resume Request message from the UE is received by the gNB, the UE in the RRC Inactive state; and means for sending a response to the gNB, wherein an RRC Release is sent by the gNB to the UE based on the response, wherein the UE remains in the RRC Inactive state.

Clause 152. The LMF of clause 151, wherein the first indication of the event and the second indication of the event comprise an event report message, wherein the response comprises an event report acknowledgment, wherein the gNB includes the event report acknowledgment in the RRC Release.

Clause 153. The LMF of any of clauses 151-152, further comprising: means for sending one or more uplink (UL) sounding resource signal (SRS) configurations to the gNB.

Clause 154. The LMF of clause 153, wherein the first indication of the event comprises an UL SRS configuration, the UL SRS configuration determined by the gNB based on the one or more UL SRS configurations.

Clause 155. The LMF of clause 154, further comprising: means for sending a request for UL measurements to a plurality of gNBs, the request for UL measurements based on the UL SRS configuration; means for receiving the UL measurements from the plurality of gNBs, the UL measurements obtained by the plurality of gNBs based on UL SRS transmitted by the UE based on the UL SRS configuration; and means for determining a location of the UE based at least in part on the UL measurements.

Clause 156. The LMF of clause 152, further comprising: means for receiving position location information obtained by the UE with the first indication of the event detected by the UE; and means for determining a location of the UE based at least in part on the position location information.

Clause 157. The LMF of clause 152, wherein the location measurements that are Radio Access Technology (RAT)-independent are performed by the UE while in the RRC Inactive state.

Clause 158. The LMF of clause 152, wherein the event report message includes location measurements performed by the UE, wherein the RRC Resume Request includes an indication of whether all the location measurements are included in the event report message.

Clause 159. The LMF of clause 158, wherein the first indication of the event received from the gNB includes the indication of whether all of the location measurements are included in the event report message.

Clause 160. The LMF of clause 159, further comprising means for sending the event report acknowledgement to the gNB when the first indication of the event indicates that all the location measurements are included in the event report message.

Clause 161. The LMF of clause 159, wherein the first indication of the event indicates that all the location measurements are not included in the event report message, the method further comprising: means for receiving remaining location measurements from the gNB in one or more messages sent by the UE to the gNB using a Configured Grant (CG) configuration; and means for sending the event report acknowledgement to the gNB after receiving a final message from the gNB with the remaining location measurements.

Clause 162. A non-transitory storage medium including program code stored thereon, the program code is operable to configure at least one processor in a Location Management Function (LMF) for supporting location of a User Equipment (UE) in a Radio Resource Control (RRC) Inactive state, the program code comprising instructions to: receive from a gNodeB (gNB) a first indication of an event detected by the UE, wherein a second indication of the event in an RRC Resume Request message from the UE is received by the gNB, the UE in the RRC Inactive state; and send a response to the gNB, wherein an RRC Release is sent by the gNB to the UE based on the response, wherein the UE remains in the RRC Inactive state.

Clause 163. The non-transitory storage medium of clause 162, wherein the first indication of the event and the second indication of the event comprise an event report message, wherein the response comprises an event report acknowledgment, wherein the gNB includes the event report acknowledgment in the RRC Release.

Clause 164. The non-transitory storage medium of any of clauses 162-163, wherein the program code further comprises instructions to: send one or more uplink (UL) sounding resource signal (SRS) configurations to the gNB.

Clause 165. The non-transitory storage medium of clause 164, wherein the first indication of the event comprises an UL SRS configuration, the UL SRS configuration determined by the gNB based on the one or more UL SRS configurations Clause 166. The non-transitory storage medium of clause 165, wherein the program code further comprises instructions to: send a request for UL measurements to a plurality of gNB s, the request for UL measurements based on the UL SRS configuration; receive UL measurements from the plurality of gNBs, the UL measurements obtained by the plurality of gNBs based on UL SRS transmitted by the UE based on the UL SRS configuration; and determine a location of the UE based at least in part on the UL measurements.

Clause 167. The non-transitory storage medium of clause 163, wherein the program code further comprises instructions to: receive position location information obtained by the UE with the first indication of the event detected by the UE; and determine a location of the UE based at least in part on the position location information.

Clause 168. The non-transitory storage medium of clause 163, wherein the location measurements that are Radio Access Technology (RAT)-independent are performed by the UE while in the RRC Inactive state.

Clause 169. The non-transitory storage medium of clause 163, wherein the event report message includes location measurements performed by the UE, wherein the RRC Resume Request includes an indication of whether all the location measurements are included in the event report message.

Clause 170. The non-transitory storage medium of clause 169, wherein the first indication of the event received from the gNB includes the indication of whether all of the location measurements are included in the event report message.

Clause 171. The non-transitory storage medium of clause 169, further comprising sending the event report acknowledgement to the gNB when the first indication of the event indicates that all the location measurements are included in the event report message.

Clause 172. The non-transitory storage medium of clause 169, wherein the first indication of the event indicates that all the location measurements are not included in the event report message, wherein the program code further comprises instructions to: receive remaining location measurements from the gNB in one or more messages sent by the UE using a Configured Grant (CG) configuration; and sending the event report acknowledgement to the gNB after receiving a final message from the gNB with the remaining location measurements.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method performed by a User Equipment (UE) for supporting location of the UE in a Radio Resource Control (RRC) Inactive state, comprising:
receiving a request to perform periodic or triggered location from a Location Management Function (LMF);
subsequent to receiving the request to perform periodic or triggered location, entering the RRC Inactive state;

while in the RRC Inactive state:
(i) detecting an event;
(ii) sending an RRC Resume Request message to a gNodeB (gNB), the RRC Resume Request including an indication of the event, wherein the indication of the event comprises an event report message that includes downlink positioning reference signal measurements; and
(iii) subsequent to sending the RRC Resume Request message, receiving an RRC Release from the gNB; and
remaining in the RRC Inactive state after receiving the RRC Release.

2. The method of claim 1, wherein the event report message is forwarded from the gNB to the LMF and further comprising:
receiving an event report acknowledgement from the gNB, the event report acknowledgement included in the RRC Release, the event report acknowledgement sent to the gNB by the LMF.

3. The method of claim 1, further comprising:
receiving a first uplink (UL) sounding reference signal (SRS) configuration from the gNB, the first UL SRS configuration received in the RRC Release; and
transmitting UL SRS signals based on the first UL SRS configuration, wherein UL measurements are obtained by a plurality of gNBs based on the transmitted UL SRS signals and sent to the LMF, wherein a location of the UE is determined based at least in part on the UL measurements.

4. The method of claim 3, wherein the first UL SRS configuration is compressed, wherein the first UL SRS configuration comprises either differences to a second SRS configuration stored in the UE or a pointer to a second UL SRS configuration stored in the UE and further comprising:
determining a third UL SRS configuration based on the first UL SRS configuration and the second UL SRS configuration; and
transmitting the UL SRS based on the third UL SRS configuration.

5. The method of claim 1, further comprising providing positioning capabilities to a serving gNB, the LMF or both, the positioning capabilities indicating support for at least one of uplink positioning, downlink positioning, uplink and downlink positioning, or a combination thereof while in the RRC Inactive state.

6. The method of claim 1, further comprising performing location measurements that are Radio Access Technology (RAT)-independent while in the RRC Inactive state.

7. The method of claim 1, wherein the RRC Resume Request includes an indication of whether all the downlink positioning reference signal measurements are included in the event report message.

8. The method of claim 7, wherein the RRC Resume Request includes an indication of whether the gNB should wait for a response from a serving Access and Mobility Management Function (AMF) for the UE before sending the RRC Release.

9. The method of claim 7, wherein the RRC Release includes an event report acknowledgement when the RRC Resume Request indicates that all the downlink positioning reference signal measurements are included in the event report message or a Configured Grant (CG) configuration when the RRC Resume Request indicates that not all the downlink positioning reference signal measurements are included in the event report message, wherein the CG configuration is for the UE to send remaining downlink positioning reference signal measurements to the gNB in subsequent messages.

10. A User Equipment (UE) configured for supporting location in a Radio Resource Control (RRC) Inactive state, comprising:
a wireless transceiver configured to wirelessly communicate with entities in a wireless network;
at least one memory;
at least one processor coupled to the wireless transceiver and the at least one memory, wherein the at least one processor is configured to:
receive, via the wireless transceiver, a request to perform periodic or triggered location from a Location Management Function (LMF);
subsequent to receiving the request to perform periodic or triggered location, enter the RRC Inactive state;
while in the RRC Inactive state:
(i) detect an event;
(ii) send, via the wireless transceiver, an RRC Resume Request message to a gNodeB (gNB), the RRC Resume Request including an indication of the event, wherein the indication of the event comprises an event report message that includes downlink positioning reference signal measurements; and
(iii) subsequent to sending the RRC Resume Request message, receive, via the wireless transceiver, an RRC Release from the gNB; and
remain in the RRC Inactive state after receiving the RRC Release.

11. The UE of claim 10, wherein the event report message is forwarded from the gNB to the LMF and the at least one processor is further configured to:
receive, via the wireless transceiver, an event report acknowledgement from the gNB, the event report acknowledgement included in the RRC Release, the event report acknowledgement sent to the gNB by the LMF.

12. The UE of claim 10, wherein the at least one processor is further configured to:
receive, via the wireless transceiver, a first uplink (UL) sounding reference signal (SRS) configuration from the gNB, the first UL SRS configuration either received in the RRC Release or received just before or just after receiving the RRC Release; and
transmit, via the wireless transceiver, UL SRS signals based on the first UL SRS configuration, wherein UL measurements are obtained by a plurality of gNBs based on the transmitted UL SRS signals and sent to the LMF, wherein a location of the UE is determined based at least in part on the UL measurements.

13. The UE of claim 12, wherein the first UL SRS configuration is compressed, wherein the first UL SRS configuration comprises either differences to a second SRS configuration stored in the UE or a pointer to a second UL SRS configuration stored in the UE and the at least one processor is further configured to:
determine a third UL SRS configuration based on the first UL SRS configuration and the second UL SRS configuration; and
transmit, via the wireless transceiver, the UL SRS based on the third UL SRS configuration.

14. The UE of claim 10, wherein the at least one processor is further configured to provide positioning capabilities, via the wireless transceiver, to a serving gNB, the LMF or both, the positioning capabilities indicating support for at least one of uplink positioning, downlink positioning, uplink and downlink positioning, or a combination thereof while in the RRC Inactive state.

15. The UE of claim 10, wherein the at least one processor is further configured to perform location measurements that are Radio Access Technology (RAT)-independent while in the RRC Inactive state.

16. The UE of claim 10, wherein the RRC Resume Request includes an indication of whether all the downlink positioning reference signal measurements are included in the event report message.

17. The UE of claim 16, wherein the RRC Resume Request includes an indication of whether the gNB should wait for a response from a serving Access and Mobility Management Function (AMF) for the UE before sending the RRC Release.

18. The UE of claim 16, wherein the RRC Release includes an event report acknowledgement when the RRC Resume Request indicates that all the downlink positioning reference signal measurements are included in the event report message or a Configured Grant (CG) configuration when the RRC Resume Request indicates that not all the downlink positioning reference signal measurements are included in the event report message, wherein the CG configuration is for the UE to send remaining downlink positioning reference signal measurements to the gNB in subsequent messages.

19. A method performed by a gNodeB (gNB) for supporting location of a User Equipment (UE) in a Radio Resource Control (RRC) Inactive state, comprising:
receiving an RRC Resume Request message from the UE, the UE in the RRC Inactive state, the RRC Resume Request message including a first indication of an event detected by the UE, wherein the first indication of the event comprises a supplementary services event report message that includes location measurements obtained by the UE;
sending a second indication of the event to a Location Management Function (LMF) while the UE is in the RRC Inactive state; and
sending an RRC Release to the UE, wherein the UE remains in the RRC Inactive state after receiving the RRC Release.

20. The method of claim 19, wherein the second indication of the event comprises the supplementary services event report message, and further comprising:
receiving an event report acknowledgement from the LMF; and
including the event report acknowledgement to the UE in the RRC Release.

21. The method of claim 19, further comprising:
receiving a first uplink (UL) sounding resource signal (SRS) configuration from the LMF;
determining a second UL SRS configuration based on the first UL SRS configuration; and
sending the second UL SRS configuration to the UE.

22. The method of claim 21, further comprising:
receiving UL SRS signals from the UE;
obtaining UL measurements based on the received UL SRS signals; and
sending the UL measurements to the LMF.

23. The method of claim 19, further comprising receiving positioning capabilities for the UE indicating support for at least one of uplink positioning, downlink positioning, uplink and downlink positioning, or a combination thereof while in the RRC Inactive state.

24. The method of claim 19, wherein location measurements that are Radio Access Technology (RAT)-independent are performed by the UE while in the RRC Inactive state.

25. The method of claim 19, wherein the second indication of the event comprises the supplementary services event report message that includes the location measurements obtained by the UE, wherein the RRC Resume Request message includes an indication of whether all the location measurements are included in the supplementary services event report message.

26. The method of claim 25, wherein the RRC Resume Request message includes an indication of whether the gNB should wait for a response from a serving Access and Mobility Management Function (AMF) for the UE before sending the RRC Release to the UE.

27. The method of claim 25, wherein the supplementary services event report message includes the indication of whether all of the location measurements are included in the supplementary services event report message.

28. A gNodeB (gNB) configured for supporting location of a User Equipment (UE) in a Radio Resource Control (RRC) Inactive state, comprising:
an external interface configured to wirelessly communicate with entities in a wireless network;
at least one memory;
at least one processor coupled to the external interface and the at least one memory, wherein the at least one processor is configured to:
receive, via the external interface, an RRC Resume Request message from the UE, the UE in the RRC Inactive state, the RRC Resume Request message including a first indication of an event detected by the UE, wherein the first indication of the event comprises a supplementary services event report message that includes location measurements obtained by the UE;
send, via the external interface, a second indication of the event to a Location Management Function (LMF) while the UE is in the RRC Inactive state; and
send, via the external interface, an RRC Release to the UE, wherein the UE remains in the RRC Inactive state after receiving the RRC Release.

29. The gNB of claim 28, wherein the second indication of the event comprises the supplementary services event report message, and wherein the at least one processor is further configured to:
receive, via the external interface, an event report acknowledgement from the LMF; and
include, via the external interface, the event report acknowledgement to the UE in the RRC Release.

30. The gNB of claim 28, wherein the at least one processor is further configured to:
receive, via the external interface, a first uplink (UL) sounding resource signal (SRS) configuration from the LMF;
determine a second UL SRS configuration based on the first UL SRS configuration; and
send, via the external interface, the second UL SRS configuration to the UE.

31. The gNB of claim 30, wherein the at least one processor is further configured to:
receive, via the external interface, UL SRS signals from the UE;
obtain UL measurements based on the received UL SRS signals; and
send, via the external interface, the UL measurements to the LMF.

32. The gNB of claim 30, wherein the second indication of the event comprises the second UL SRS configuration.

33. The gNB of claim 30, wherein the first UL SRS configuration is received from the LMF as part of positioning of the UE, the positioning of the UE occurring prior to event reporting by the UE or occurring in association with a first event report from the UE.

34. The gNB of claim 28, wherein the at least one processor is further configured to receive, via the external interface, positioning capabilities for the UE indicating support for at least one of uplink positioning, downlink positioning, uplink and downlink positioning, or a combination thereof while in the RRC Inactive state.

35. The gNB of claim 28, wherein location measurements that are Radio Access Technology (RAT)-independent are performed by the UE while in the RRC Inactive state.

36. The gNB of claim 28, wherein the second indication of the event comprises the supplementary services event report message that includes the location measurements obtained by the UE, wherein the RRC Resume Request message includes an indication of whether all the location measurements are included in the supplementary services event report message.

37. The gNB of claim 36, wherein the RRC Resume Request message includes an indication of whether the gNB should wait for a response from a serving Access and Mobility Management Function (AMF) for the UE before sending the RRC Release to the UE.

38. The gNB of claim 36, wherein the supplementary services event report message includes the indication of whether all of the location measurements are included in the supplementary services event report message.

39. A method performed by a Location Management Function (LMF) for supporting location of a User Equipment (UE) in a Radio Resource Control (RRC) Inactive state, comprising:
receiving from a gNodeB (gNB) a first indication of an event detected by the UE, wherein a second indication of the event in an RRC Resume Request message from the UE is received by the gNB while the UE is in the RRC Inactive state, the second indication of the event comprising a supplementary services event report message that includes location measurements obtained by the UE; and
sending a response to the gNB while the UE is in the RRC Inactive state, wherein an RRC Release is sent by the gNB to the UE based on the response, wherein the UE remains in the RRC Inactive state after receiving the RRC Release.

40. The method of claim 39, wherein the first indication of the event comprises the supplementary services event report message, wherein the response comprises an event report acknowledgment, wherein the gNB includes the event report acknowledgment in the RRC Release.

41. The method of claim 40, further comprising:
receiving position location information obtained by the UE with the first indication of the event detected by the UE; and
determining a location of the UE based at least in part on the position location information.

42. The method of claim 40, wherein the location measurements are Radio Access Technology (RAT)-independent and are performed by the UE while in the RRC Inactive state.

43. The method of claim 40, wherein the RRC Resume Request includes an indication of whether all the location measurements are included in the event report message.

44. The method of claim 39, further comprising:
sending one or more uplink (UL) sounding resource signal (SRS) configurations to the gNB.

45. A Location Management Function (LMF) configured for supporting location of a User Equipment (UE) in a Radio Resource Control (RRC) Inactive state, comprising:
an external interface configured to wirelessly communicate with entities in a wireless network;
at least one memory;
at least one processor coupled to the external interface and the at least one memory, wherein the at least one processor is configured to:
receive, via the external interface, from a gNodeB (gNB) a first indication of an event detected by the UE, wherein a second indication of the event in an RRC Resume Request message from the UE is received by the gNB while the UE is in the RRC Inactive state, the second indication of the event comprising a supplementary services event report message that includes location measurements obtained by the UE; and
send, via the external interface, a response to the gNB while the UE is in the RRC Inactive state, wherein an RRC Release is sent by the gNB to the UE based on the response, wherein the UE remains in the RRC Inactive state after receiving the RRC Release.

46. The LMF of claim 45, wherein the first indication of the event comprises the supplementary services event report message, wherein the response comprises an event report acknowledgment, wherein the gNB includes the event report acknowledgment in the RRC Release.

47. The LMF of claim 45, wherein the at least one processor is further configured to:
send, via the external interface, one or more uplink (UL) sounding resource signal (SRS) configurations to the gNB.

48. The LMF of claim 46, wherein the at least one processor is further configured to:
receive, via the external interface, position location information obtained by the UE with the first indication of the event detected by the UE; and
determine a location of the UE based at least in part on the position location information.

49. The LMF of claim 46, wherein location measurements are Radio Access Technology (RAT)-independent and are performed by the UE while in the RRC Inactive state.

50. The LMF of claim 46, wherein the RRC Resume Request includes an indication of whether all the location measurements are included in the event report message.

* * * * *